(12) United States Patent
Cink et al.

(10) Patent No.: US 10,098,275 B2
(45) Date of Patent: Oct. 16, 2018

(54) MANAGEMENT SYSTEM AND METHOD FOR MANAGING SOIL TREATMENT SYSTEMS

(71) Applicant: BASF Agro B.V., Arnhem (NL)

(72) Inventors: James H. Cink, Wake Forest, NC (US); Kenneth S. Brown, Research Triangle Park, NC (US); Richard A. Warriner, Wake Forest, NC (US); Jeffrey Douglas Vannoy, Fuquay-Varina, NC (US)

(73) Assignee: BASF Agro B.V., Amhem (NL)

( * ) Notice: Subject to any disclaimer, the term of this patent is extended or adjusted under 35 U.S.C. 154(b) by 267 days.

(21) Appl. No.: 14/912,818

(22) PCT Filed: Aug. 14, 2014

(86) PCT No.: PCT/IB2014/063928
§ 371 (c)(1),
(2) Date: Feb. 18, 2016

(87) PCT Pub. No.: WO2015/025253
PCT Pub. Date: Feb. 26, 2015

(65) Prior Publication Data
US 2016/0198625 A1    Jul. 14, 2016

Related U.S. Application Data

(60) Provisional application No. 61/868,399, filed on Aug. 21, 2013.

(51) Int. Cl.
*A01C 21/00* (2006.01)
*A01C 23/02* (2006.01)
(Continued)

(52) U.S. Cl.
CPC .......... *A01C 23/026* (2013.01); *A01C 21/00* (2013.01); *A01C 23/02* (2013.01); *A01M 1/245* (2013.01);
(Continued)

(58) Field of Classification Search
CPC ......... A01C 21/00; A01C 23/02; A01C 23/00; A01C 23/026; A01C 23/023;
(Continued)

(56) References Cited

U.S. PATENT DOCUMENTS 5,033,397 A    7/1991   Colburn, Jr.
2002/0040300 A1   4/2002   Ell
(Continued)

FOREIGN PATENT DOCUMENTS

JP    2005174008 A    6/2005
WO    0195217    12/2001
WO    2011106420 A1    9/2011

OTHER PUBLICATIONS

International Search Report and Written Opinion for PCT/IB2014/063928 dated Jan. 7, 2015, 13 pgs.

*Primary Examiner* — Christopher J Novosad
(74) *Attorney, Agent, or Firm* — Armstrong Teasdale LLP

(57) ABSTRACT

In a system (10) for managing a soil treatment business, an injection apparatus (12) is operable to inject soil treatment under high pressure down into soil. A control system (92) is associated with the injection apparatus (12) and is configured to collect data during operation of the injection apparatus (12). A data management system (801) is configured to receive the data collected by the injection apparatus (12) control system (92). The data management system (801) generally comprises a database for storing the collected data, with the data management system being accessible by the business for reviewing the collected data.

20 Claims, 69 Drawing Sheets

(51) Int. Cl.
    *A01M 1/24*     (2006.01)
    *A01M 17/00*     (2006.01)
    *A01M 21/04*     (2006.01)
    *A01M 25/00*     (2006.01)
    *G06Q 10/06*     (2012.01)
    *G06Q 30/04*     (2012.01)
    *G06Q 30/06*     (2012.01)

(52) U.S. Cl.
    CPC ........ *A01M 17/002* (2013.01); *A01M 21/043* (2013.01); *A01M 25/006* (2013.01); *G06Q 10/0639* (2013.01); *G06Q 30/04* (2013.01); *G06Q 30/0645* (2013.01); *A01M 2200/01* (2013.01)

(58) Field of Classification Search
    CPC .......... A01M 1/245; A01M 1/24; A01M 1/00; A01M 17/002; A01M 17/00; A01M 21/043; A01M 21/04; A01M 21/00; A01M 25/006; A01M 25/00; A01M 2200/01; A01M 2200/00; G06Q 10/0639; G06Q 10/063; G06Q 10/06; G06Q 10/00; G06Q 30/04; G06Q 30/00; G06Q 30/0645; G06Q 30/06
    See application file for complete search history.

(56) References Cited

U.S. PATENT DOCUMENTS

| | | |
|---|---|---|
| 2007/0150295 A1 | 6/2007 | Dawson et al. |
| 2011/0203162 A1 | 8/2011 | Cink et al. |

FIG. 52B

BASF Soil Injection — LogOff

Units

Drag a column header and drop it here to group by that column

| Date Assigned ▽ | Last Application ▽ | Total Injections ▽ | Total Run Time ▽ | Next Scheduled PM ▽ | Battery ▽ | Firmware Vers ▽ | Telem |
|---|---|---|---|---|---|---|---|
| /01/1900 | 01/18/2013 | 1006 | 0 | 1/1/1900 12:00:00 AM | 0 | | |
| /01/1900 | 08/07/2013 | 1511 | 326 | 1/1/1900 12:00:00 AM | 0 | | |
| /01/1900 | 07/29/2013 | 800 | 242 | 1/1/1900 12:00:00 AM | 0 | | |
| /01/1900 | 01/01/1900 | 0 | 0 | 1/1/1900 12:00:00 AM | 0 | | |

Displaying items 1 - 8 of

- Soil Injector Unit >
- Details
- Work Order
- Activity >
- Treatment >
- History Detail
- Technician Unit >
- Setup/Assignment
- PMP >
- Administrator
- Central
- PMP Summary
- Management
- Report
- BASF Sales
- Summary >
- Orders
- Invoice
- Comparison
- Summary
- Location 15
- Visibility Report
- Repairs >
- Maintenance >
- Help >

FIG. 53

BASF Soil Injection                    LogOff

Work Orders for THP000002
Go To Field Unit List
View Treatments

| | Location Number | Work Order Number | Address | City | State | Zip | Linear Footage | Transmitted |
|---|---|---|---|---|---|---|---|---|
| Print | 1 | WOT123456780 | 5558 Federal Ave | Memphis | TN | | 100 | No |
| Print | 2 | WOT123456781 | 5558 Federal Ave | Memphis | TN | | 100 | No |
| Print | 3 | WOT123456782 | 5558 Federal Ave | Memphis | TN | | 100 | No |
| Print | 4 | WOT123456783 | 5558 Federal Ave | Memphis | TN | | 100 | No |
| Print | 5 | WOT123456784 | 5558 Federal Ave | Memphis | TN | | 100 | No |
| Print | 6 | WOT123456785 | 5558 Federal Ave | Memphis | TN | | 100 | No |
| Print | 7 | WOT123456786 | 5558 Federal Ave | Memphis | TN | | 100 | No |
| Print | 8 | WOT123456787 | 5558 Federal Ave | Memphis | TN | | 100 | No |
| Print | 9 | WOT123456788 | 5558 Federal Ave | Memphis | TN | | 100 | No |

Soil Injector Unit
Details
Work Order
Activity
Treatment
History Detail
Technician Unit
Setup/Assignment
PMP
Administrator
Central
PMP Summary
Management
Report
BASF Sales
Summary
Orders
Invoice
Comparison
Summary
Location 15
Visibility Report
Repairs
Maintenance
Help

FIG. 54A

BASF Soil Injection — LogOff

Soil Injector Unit
Details
Work Order
Activity
Treatment
History Detail
Technician Unit
Setup/Assignment
PMP Administrator
Central
PMP Summary
Management Report
BASF Sales Summary
Orders
Invoice
Comparison Summary
Location 15
Visibility Report
Repairs
Maintenance
Help Application History for THP000002
Go To Field Unit List
[Export to Excel]

Drag a column header and drop it here to group by that column

| Address | City | State | Linear Foo | Latitude | Longitude | Application | Date Stamp | Product | Soil Setting | Injection T | Injection V |
|---|---|---|---|---|---|---|---|---|---|---|---|
| 5558 Federal Ave | Memphis | TN | 200 | 35.003... | -89.878... | 334 | 11/15/... 12:00:00 AM | XXXX... | 2 | 0.15 | 0.1 |
| 5558 Federal Ave | Memphis | TN | 200 | 35.003... | -89.878... | 333 | 11/15/... 12:00:00 AM | XXXX... | 0 | 0 | 0 |
| 5558 Federal Ave | Memphis | TN | 200 | 35.003... | -89.878... | 335 | 11/16/... 12:00:00 AM | XXXX... | 2 | 0.15 | 0.1 |
| 5558 Federal Ave | Memphis | TN | -1 | 35.003... | -89.877... | 339 | 11/16/... 12:00:00 AM | XXXX... | 2 | 0.15 | 0.1 |
| 5558 Federal Ave | Memphis | TN | -1 | 35.003... | -89.878... | 343 | 11/16/... 12:00:00 AM | XXXX... | 2 | 0.15 | 0.1 |
| 5558 Federal Ave | Memphis | TN | -1 | 35.003... | -89.878... | 341 | 11/16/... 12:00:00 AM | XXXX... | 2 | 0.15 | 0.1 |
| 5558 Federal Ave | Memphis | TN | -1 | 35.003... | -89.878... | 342 | 11/16/... 12:00:00 AM | XXXX... | 2 | 0.15 | 0.1 |

1 2 3

Displaying items 1 - 25 of 67

BASF Soil Injection                    LogOff

| | Soil Injector Unit |
|---|---|
| | Details |
| | Work Order |
| | Activity |
| | Treatment |
| | History Detail |
| | Technician Unit |
| | Setup/Assignment |
| | PMP |
| | Administrator |
| | Central |
| | PMP Summary |
| | Management |
| | Report |
| | BASF Sales |
| | Summary |
| | Orders |
| | Invoice |
| | Comparison |
| | Summary |
| | Location 15 |
| | Visibility Report |
| | Repairs |
| | Maintenance |
| | Help |

Please search for a unit
Enter anything you know about the unit (Asset ID, technician assigned to unit, etc.):

[THP000008]
[Search] Cancel

| | BASF Customer ID | Asset ID | Assigned To | Date Assigned | Last Application | Total Inject |
|---|---|---|---|---|---|---|
| Select | | THP000008 | Santa Claus | 01/01/1900 | 08/07/2013 | 1511 |
| | | 1 | | | | |

Displaying items 1 - 1 of 1

FIG. 56

BASF Soil Injection      LogOff

Summary of Treatments By Site
Please select a PMP: Terminix

[Export to Excel]

Drag a column header and drop it here to group by that column

| | Soil Injector Unit Details | | | | | | | | | | |
|---|---|---|---|---|---|---|---|---|---|---|---|
| Asset | Work | Address | City | State | Linear Foo | Latitude | Longitude | Application | Date Stam | Product | Soil Setting | Inj |

| Asset | Work | Address | City | State | Linear Foo | Latitude | Longitude | Application | Date Stam | Product | Soil Setting | Inj |
|---|---|---|---|---|---|---|---|---|---|---|---|---|
| | W... | 5558 Federal Ave | Memphis | TN | 200 | 35.003... | -89.878... | 334 | 11/15/... 12:00:00 AM | XXXX... | 2 | 0.1 |
| | W... | 5558 Federal Ave | Memphis | TN | 200 | 35.003... | -89.878... | 333 | 11/15/... 12:00:00 AM | XXXX... | 0 | 0 |
| | W... | 5558 Federal Ave | Memphis | TN | 200 | 35.003... | -89.878... | 335 | 11/16/... 12:00:00 AM | XXXX... | 2 | 0.1 |
| | W... | 5558 Federal Ave | Memphis | TN | -1 | 35.003... | -89.877... | 339 | 11/16/... 12:00:00 AM | XXXX... | 2 | 0.1 |
| | W... | 5558 Federal Ave | Memphis | TN | -1 | 35.003... | -89.878... | 343 | 11/16/... 12:00:00 AM | XXXX... | 2 | 0.1 |
| | W... | 5558 Federal Ave | Memphis | TN | -1 | 35.003... | -89.878... | 341 | 11/16/... 12:00:00 AM | XXXX... | 2 | 0.1 |
| | W... | 5558 Federal Ave | Memphis | TN | -1 | 35.003... | -89.878... | 342 | 11/16/... 12:00:00 AM | XXXX... | 2 | 0.1 |

1 2 3 4 5 6 7 8 9 10...     Displaying items 1 - 25 of 781

Side menu:
- Soil Injector Unit Details
- Work Order
- Activity
- Treatment
- History Detail
- Technician Unit
- Setup/Assignment
- PMP Administrator
- Central PMP Summary
- Management Report
- BASF Sales Summary
- Orders
- Invoice Comparison Summary
- Location 15 Visibility Report
- Repairs
- Maintenance
- Help

BASF Soil Injection LogOff

Change Unit Tech Assignment Wizard
Search: [THP000008] [Search]

| Friendly Name | BASF Customer Id | Asset Id |
|---|---|---|
| null | | THP000008 |

Please select a technician to assign unit to:

[Assign]

Soil Injector Unit
Details
Work Order
Activity
Treatment
History Detail
Technician Unit
Setup/Assignment
PMP
Administrator
Central
PMP Summary
Management
Report
BASF Sales
Summary
Orders
Invoice
Comparison
Summary
Location 15
Visibility Report
Repairs
Maintenance
Help

FIG. 59

BASF Soil Injection      LogOff

Soil Injector Unit Details
Work Order Activity
Treatment History Detail
Technician Unit Setup/Assignment
PMP Administrator
Central
PMP Summary
Management Report
BASF Sales Summary
Orders
Invoice Comparison Summary
Location 15 Visibility Report
Repairs
Maintenance
Help Please select a PMP: Terminix PMP Information:

PMP Information:

| | |
|---|---|
| Name | Terminix |
| Address | 2651 EAST 14TH ST |
| City | YUMA |
| State | AZ |
| Zip | 85365 |
| EBID | |

Date Created

[Update PMP Info]

PMP Users

Add New User

| Name | Role | |
|---|---|---|
| santac | Technician | Edit |
| pmpadmin | PMP Admin | Edit |
| branchoffice | Branch Office | Edit |

Displaying items 1 - 3 of 3

Event Notifications:

| Username | Event | Addresses |
|---|---|---|
| No records to display | | |

Units

| Name | Active Since | Assigned To | Lease His |
|---|---|---|---|
| THP000002 | 11/27/2012 11:32:23 AM | Santa Claus | View |
| THP000008 | 4/8/2013 11:18:20 AM | Santa Claus | View |
| THP000009 | 4/22/2013 11:19:38 AM | | View |
| THP000010 | 5/20/2013 4:29:03 PM | | View |
| THP000011 | 5/24/2013 11:41:28 AM | | View |
| THP000012 | 5/24/2013 11:54:05 AM | | View |
| THP000013 | 5/24/2013 11:54:09 AM | | View |
| THP000014 | 5/24/2013 11:54:13 AM | | View |

FIG. 60

BASF Soil Injection                                    LogOff

| | |
|---|---|
| Address | 2651 EAST 14TH ST |
| City | YUMA |
| State | AZ |
| Zip | 85365 |
| EBID | |
| Date Created | |

Update PMP Info

PMP Users

Add New User

| Name | Role | | Assigned To ▽ | Lease History ▽ |
|---|---|---|---|---|
| santac | Technician | | nta Claus | View |
| pmpadmin | PMP Admin | | | View |
| branchoffice | Branch Office | Edit | nta Claus | View |

◎ ∘ ∘ 1 2 3 ▷ ▷|

Lease History for Unit THP000002 [X]

| Bill Date ▽ | Bill Period ▽ | Lease Month ▽ | Remaining Months ▽ |
|---|---|---|---|
| 12/11/2012 9:36:20 AM | Dec 1 2012 12:00 AM - Jan 1 2013 12:00 AM | 12:2012 | 34 |

◎ ∘ ∘ 1 2 3 ▷ ▷|    Displaying items 1 - 1 of 1

THP000009  4/22/2013  11:19:38 AM
THP000010  5/20/2013  4:29:03 PM

Soil Injector Unit Details
Work Order
Activity
Treatment
History Detail
Technician Unit
Setup/Assignment
PMP Administrator
Central
PMP Summary
Management Report
BASF Sales Summary
Orders
Invoice Comparison
Summary
Location 15
Visibility Report
Repairs
Maintenance
Help

BASF Soil Injection    LogOff

| | |
|---|---|
| PMP Administrator | |
| Central | Address | 2651 EAST 14TH ST |
| PMP Summary | City | YUMA |
| Management Report | State | AZ |
| BASF Sales Summary | Zip | 85365 |

Manage units for branchoffice

Units user can have access to.

| Asset Id | Wireless Id | Controller Id | Injector Id | Base Unit Id |
|---|---|---|---|---|
| THP000008 | 5338210... | 4007 | 3007 | 1004 |

◎ ○ ○ 1 2 3 ▷ ▷|    Displaying items 1 - 1 of 1

↑ ↓

Units user has access to.

| Asset Id | Wireless Id | Controller Id | Injector Id | Base Unit Id |
|---|---|---|---|---|
| THP000002 | 5662269... | 1234 | 1234 | 1234 |

◎ ○ ○ 1 2 3 ▷ ▷|    Displaying items 1 - 1 of 1

THP000009  4/22/2013  11:19:38 AM    View
THP000010  5/20/2013  4:29:03 PM     View

FIG. 63

BASF Soil Injection — LogOff

| | |
|---|---|
| PMP | |
| Administrator | |
| Central | |
| PMP Summary | Address: 2651 EAST 14TH ST |
| Management Report | City: YUMA |
| BASF Sales Summary | State: AZ |
| | Zip: 85365 |

Manage units for santac

Units user can have access to.

| Asset Id | Wireless Id | Controller Id | Injector Id | Base Unit Id |
|---|---|---|---|---|
| THP000008 | 5338210... | 4007 | 3007 | 1004 |

Displaying items 1 - 1 of 1    ⦿ ∘ 1 2 3 ▷ ▷|

[↑] [↓]

Units user has access to.

| Asset Id | Wireless Id | Controller Id | Injector Id | Base Unit Id |
|---|---|---|---|---|
| THP000002 | 5662269... | 1234 | 1234 | 1234 |
| THP000006 | 5669999... | 209482 | 20439820 | 290842 |

Displaying items 1 - 2 of 2    ⦿ ∘ 1 2 3 ▷ ▷|

THP000009  4/22/2013  11:19:38 AM      View

THP000010  5/20/2013  4:29:03 PM       View

FIG. 64A

BASF Soil Injection                                                                LogOff

| | | | | | | | | | | | | |
|---|---|---|---|---|---|---|---|---|---|---|---|---|
| Soil Injector Unit Details | PMP Summary Management Report | | | | | | | | | | | |
| Work Order Activity | Please select a PMP: Terminix | | | | | | | | | | | |
| Treatment History Detail | Drag a column header and drop it here to group by that column | | | | | | | | | | | [Export to Excel] |
| Technician Unit Setup/Assignment | Date Range | Total Linear Feet Treated | Average Linear Feet Treated Per Site | Total HT Inspections | Average HT Inspections Per Site | Total SA Gallons | Average SA Gallons Per Site | Total Ounces Of Terminator Applied | Average Ounces Of Terminator Applied Per Site | Total Sites Treated | Average Sites Treated Per Day |
| PMP Administrator | 21 Jan to 20 Feb | 2600 | 23.01 | 10036 | 88.81 | 690.60 | 6.11 | 8,796.80 | 0.00 | 113 | 6.28 |
| Central PMP Summary | 21 Feb to 20 Mar | 400 | 100.00 | 221 | 55.25 | 13.00 | 3.25 | 55.30 | 0.00 | 4 | 0.22 |
| Management Report | 21 Mar to 20 Apr | 0 | 0.00 | 0 | 0.00 | 0.00 | 0.00 | 0.00 | 0.00 | 0 | 0.00 |
| BASF Sales Summary | 21 Apr to 20 May | 0 | 0.00 | 0 | 0.00 | 0.00 | 0.00 | 0.00 | 0.00 | 0 | 0.00 |
| Orders Invoice | 21 Jun to 20 Jul | 0 | 0.00 | 0 | 0.00 | 0.00 | 0.00 | 0.00 | 0.00 | 0 | 0.00 |
| Comparison Summary | 21 Jul to 20 Aug | 0 | 0.00 | 0 | 0.00 | 0.00 | 0.00 | 0.00 | 0.00 | 0 | 0.00 |
| Location 15 Visibility Report | 21 Aug to 20 Sep | 0 | 0.00 | 0 | 0.00 | 0.00 | 0.00 | 0.00 | 0.00 | 0 | 0.00 |
| Repairs Maintenance | 21 Sep to 20 Oct | 0 | 0.00 | 0 | 0.00 | 0.00 | 0.00 | 0.00 | 0.00 | 0 | 0.00 |
| Help | 21 Oct to 20 Nov | 2593 | 123.48 | 3214 | 153.05 | 116.50 | 5.55 | 5,225.90 | 0.00 | 21 | 1.05 |
| | 1 | | | | | | | | | Displaying items 1 - 12 of 12 | |

FIG. 64B

BASF Soil Injection    LogOff

PMP Summary Management Report
Please select a PMP: Terminix ▼
Drag a column header and drop it here to group by that column

| | Average Linear Feet Treated Per Site | Total HT Inspections | Average HT Inspections Per Site | Total SA Gallons | Average SA Gallons Per Site | Total Ounces Of Terminator Applied | Average Ounces Of Terminator Applied Per Site | Total Sites Treated | Average Sites Treated Per Day | Average Time Per Site | Total Hours of Use |
|---|---|---|---|---|---|---|---|---|---|---|---|
| tal near et eated | 23.01 | 10036 | 88.81 | 690.60 | 6.11 | 8,796.80 | 0.00 | 113 | 6.28 | 11.54 | 1,304.00 |
| 00 | 100.00 | 221 | 55.25 | 13.00 | 3.25 | 55.30 | 0.00 | 4 | 0.22 | 0.00 | 0.22 |
| 0 | 0.00 | 0 | 0.00 | 0.00 | 0.00 | 0.00 | 0.00 | 0 | 0.00 | 0.00 | 0.00 |
| | 0.00 | 0 | 0.00 | 0.00 | 0.00 | 0.00 | 0.00 | 0 | 0.00 | 0.00 | 0.00 |
| | 0.00 | 0 | 0.00 | 0.00 | 0.00 | 0.00 | 0.00 | 0 | 0.00 | 0.00 | 0.00 |
| | 0.00 | 0 | 0.00 | 0.00 | 0.00 | 0.00 | 0.00 | 0 | 0.00 | 0.00 | 0.00 |

Export to Excel

Displaying items 1 - 12 of 12

Sidebar:
- Soil Injector Unit Details
- Work Order Activity
- Treatment History Detail
- Technician Unit
- Setup/Assignment
- PMP Administrator Central
- PMP Summary Management Report
- BASF Sales Summary
- Orders
- Invoice Comparison Summary
- Location 15 Visibility Report
- Repairs
- Maintenance
- Help

FIG. 65

BASF Soil Injection                                   LogOff

| | | | | | | | | | |
|---|---|---|---|---|---|---|---|---|---|
| Soil Injector Unit Details | BASF Sales Summary Report | | | | | | | | |
| Work Order Activity | Please select a PMP: Terminix | | | | | | | | |
| Treatment | Drag a column header and drop it here to group by that column | | | | | | | | Export to Excel |
| History Detail Technician Unit | Company Name | Total HP Units | Base Lease Dollars Billed… | Total Linear Feet Treated YTD | Operational Use Fees Billed YTD | Termidor HP Ounces Applied YTD | Termidor HP Billed At Agency Price YTD | Total Revenue Billed | Average Billing Per Site | Average Billing Per Linear… | Average Jobs Treated Per Day |
| Setup/Assignment PMP Administrator Central | Terminix | 8 | $0.00 | 24418 | $24,418.00 | 836.3 | $0.00 | $0.00 | $0.00 | $0.00 | 0 |
| PMP Summary Management Report BASF Sales Summary Orders Invoice Comparison Summary Location 15 Visibility Report Repairs Maintenance Help | 1 | | | | | | | | Displaying items 1 - 1 of 1 | |

*Disclaimer: The figures mentioned in the report are just an estimate*

FIG. 66

BASF Soil Injection                                           LogOff

Invoice Comparison Summary Report
Select a Technician: [Santa Claus]          Select a Billing Period: [21 Jan to 20 Feb]
[Export to Excel]

Drag a column header and drop it here to group by that column

| EBID | Date of Service | Customer Name | GPS | Linear Feet | Billing Period | Operation Usage | Work O Number |
|---|---|---|---|---|---|---|---|
| | 11/16/2012 | Terminix | -89.878512,35.003728 | 275 | 21 Jan to 20 Feb | 275 | WO... |
| | 12/10/2012 | Terminix | -89.878512,35.003728 | 275 | 21 Jan to 20 Feb | 275 | WO... |
| | 12/10/2012 | Terminix | -89.878512,35.003728 | 275 | 21 Jan to 20 Feb | 275 | WO... |

1                                                                   Displaying items 1 - 3 of 3

Sidebar:
Soil Injector Unit Details
Work Order
Activity
Treatment
History Detail
Technician Unit
Setup/Assignment
PMP Administrator
Central
PMP Summary
Management Report
BASF Sales Summary
Orders
Invoice Comparison Summary
Location 15
Visibility Report
Repairs
Maintenance
Help

FIG. 67

BASF Soil Injection                                      LogOff

Soil Injector Unit
Details
Work Order
Activity
Treatment
History Detail
Technician Unit
Setup/Assignment
PMP
Administrator
Central
PMP Summary
Management
Report
BASF Sales
Summary
Orders
Invoice
Comparison
Summary
Location 15
Visibility Report
Repairs
Maintenance
Help Repair Summary Report
Please search for a unit.
Asset Id: [          ]                    [Export to Excel]

| | Asset Id | RMA | Repair Status | Repair Type | Repair Time | Completed | Notes | Diagnosis |
|---|---|---|---|---|---|---|---|---|
| Update | THP000002 | 1 | Working | Software | 30 minutes | 30 minutes | Test | Test Diag |
| Cancel | | | | | | | | |
| Edit | THP000004 | 2 | Received | | | true | | |
| Edit | THP000002 | 3 | Completed | User Error | 60 minutes | true | Done | |
| Edit | THP000007 | 4 | Completed | | | true | | |
| Edit | THP000004 | 5 | Completed | Mechanical | 15 minutes | true | Test | |

FIG. 68

BASF Soil Injection                LogOff

Soil Injector Unit Details
Work Order
Activity
Treatment
History Detail
Technician Unit
Setup/Assignment
PMP
Administrator Central
PMP Summary
Management Report
BASF Sales Summary
Orders
Invoice
Comparison Summary
Location 15
Visibility Report
Repairs
Maintenance
Help Completion History Report
[Export to Excel]
Asset Id:

| Asset Id | Component | Last Maintenance Usage | Next Maintenance Usage | Last Maintenance Date | Next Maintenance Date |
|---|---|---|---|---|---|
| Asset Id: THP000002 | | | | | |
| THP000002 | Pressure Regulator | | 100 hrs of usage | done on 6/12/2013 | due on 6/12/2014 |
| THP000002 | Software Update | | 200 hrs of usage | done on 6/15/2013 | due on 6/15/2014 |
| Asset Id: THP000008 | | | | | |
| THP000008 | Engine Oil | | 300 hrs of usage | | |
| THP000008 | Engine Oil | 100 hrs of usage | | | |
| THP000008 | Engine Oil | 200 hrs of usage | | | |

MANAGEMENT SYSTEM AND METHOD FOR MANAGING SOIL TREATMENT SYSTEMS

BACKGROUND OF THE DISCLOSURE

The field of the disclosure relates generally to soil treatments, and more particularly to management systems and methods, such as used by a soil treatment business, for managing soil treatment systems in which a handheld application tool is operated to apply soil treatments on or below the ground surface.

The insertion of soil treatments into the soil near buildings has been used to prevent the infestation of insects or other pests. Without treatment, these pests can be become a significant nuisance or hazard to a building owner or its occupants. Such pests are known to attack the structure of buildings and may infiltrate the building causing other problems for its occupants.

At least one known method of soil treatment includes an application of pesticides, fertilizers, or other soil treatments by direct placement into the soil under and around structures, around or near ornamental plantings, poles, fences, decks, or other wooden elements. This direct placement method includes digging, trenching and/or rodding (i.e., forcing an application device into the soil), and then directly placing the soil treatment into the dug out area of the trench. This known method can cause damage to vegetation, disrupt landscaping, and greatly impact or diminish the aesthetic beauty and value of the treated area until either the plants recover or new plantings are installed.

For example, in some common termite treatments direct placement of a termiticide into the soil around structures involves the digging of a trench approximately 4 to 6 inches wide by 6 inches deep into which a termiticide composition is applied at a rate of 4 gallons per 10 linear feet of trench per foot of depth. In addition to the application of the soil treatment to the trench, soil treatment may also be dispensed into the ground through the use of a rod injection tool, which is plunged down into the ground generally to a depth that is approximately to the top of a footer (i.e., a part of the building's foundation). For a typical structure having a perimeter of 200 linear feet, the time to prepare, dig, inject, and finish the application of soil treatment requires at least 4 to 6 hours depending on the type of soil and whether the application is conducted by a pair of or a single technician (s).

Another known method of soil treatment includes the direct insertion of a tool down into the ground and delivering the pesticides, fertilizers, or other soil treatments into the ground. Applying the soil treatments below the surface of the soil has been used as a way of limiting the wash off of the treatments. Typical devices for implementing such soil treatments have utilized needles or other mechanical devices, creating both a passageway into the soil and through which the treatments are applied to the subsurface area. These devices have the obvious limitation that they create holes in the soil, which may be unsightly, or create other adverse concerns, such as unwanted soil compaction adjacent the insertion sights, as well as require the creation of the hole using mechanical forces. Moreover, devices that are pushed into the ground can become plugged with soil or other debris which requires disassembly of the application tool for cleaning. Another disadvantage to devices that are pushed into the ground is that they can become contaminated with soil borne pathogens or other contaminates that can potentially be transferred to the next injection site.

The use of high pressure flows as a method of effectively injecting materials below the soil surface has been described before, such as in U.S. Pat. No. 5,370,069 to Monroe, titled Apparatus and Method for Aerating and/or Introducing Particulate Matter into a Ground Surface. These methods use high pressure jets of a fluid, such as air or water that entrain the soil treatment agent, whether the soil treatment agent is in solution with the fluid, or a granular material carried with the fluid. The high pressure jet can form a small hole in the surface into which the material is being placed, or cause the material to be absorbed by the surface in a rapid fashion, such that soil disturbance is minimal. One benefit of the use of a pressure jet is that no mechanical effort is required to create a passageway as a predicate for the soil treatment material to be placed below the surface of the soil. Nor is any other disturbance of the soil required, such as placing a tool directly down below the ground surface.

While devices such as that disclosed in Monroe are effective at placing soil treatment materials below the surface, they are designed to distribute such materials both a short distance below the soil surface and over a large open space area, where the size of the equipment is not a limitation. These known devices are not suitable for strategically injecting soil treatments to greater depths within the soil under and around structures, ornamental plantings, poles, fences, decks and other wood elements where treatments relating particularly to treatments against insects infestation are common.

Accordingly, a handheld high pressure application tool for applying soil treatments (e.g., termiticide or other pesticide) beneath the surface of the ground adjacent a structure is needed. Such a handheld tool would permit an operator to strategically position the tool around a structure such as a house, a deck, any landscaping that may be near the house and/or deck, around utility poles, and around plants. The tool could include multiple nozzles for applying a predetermined amount of soil treatment at a controlled pressure for injecting the soil treatment down to a desired predetermined depth. This would allow for precision applications where the area of application is carefully controlled.

In some applications, however, the type of soil (e.g., hard, compacted, etc.) or other obstructions (e.g., a concrete patio, walkway, etc.) may prevent an operator from treating certain areas with a high pressure application tool. Thus, a system that can operate in different modes, such as a high pressure mode and a low pressure mode (for use in applying the pesticide to areas in which a high pressure application is not feasible) is needed.

In other applications, it is advantageous to track various data related to soil treatments applied using a high pressure application tool, a low pressure application tool or a combination thereof. For example, pest control companies that utilize such tools in treating customer work sites, such as residential homes, commercial properties, nurseries or other work sites where soil treatments are needed may find it beneficial to collect and store historical data relating to soil treatments provided by the company.

BRIEF DESCRIPTION OF THE DISCLOSURE

In one aspect, a system for managing a soil treatment business generally comprises an injection apparatus operable to inject soil treatment under high pressure down into soil. A control system is associated with the injection apparatus and is configured to collect data during operation of the injection apparatus. A data management system is configured to receive the data collected by the injection apparatus control system. The data management system generally comprises a database for storing the collected data, with the data management system being accessible by the business for reviewing the collected data.

In another aspect, a lease management system for managing a lease arrangement pursuant to which a soil treatment system is leased by the owner of the soil treatment system to a soil treatment business (with the soil treatment system comprising an application tool operable to apply an active ingredient to soil) generally comprises a control system associated with the application tool and configured to collect data during operation of the application tool. A data management system is configured for receiving 1) owner provided data including at least the identification of the soil treatment business that is leasing the application tool from the owner, and 2) business provided data including at least a work order for a soil treatment to be performed at a work site. The data management system is configured for communication with the control system of the application tool to receive the data collected by the application tool in performing the soil treatment at the work site pursuant to the work order. The data management system includes at least one processor configured to determine a usage fee to be charged to the business by the owner as a function of one or more of the business provided data and the data collected by the application tool control system.

BRIEF DESCRIPTION OF THE DRAWINGS

FIGS. 41-68 are screen shots from a display media of the data management system of FIG. 28.

DETAILED DESCRIPTION OF THE DISCLOSURE

Figure 1:
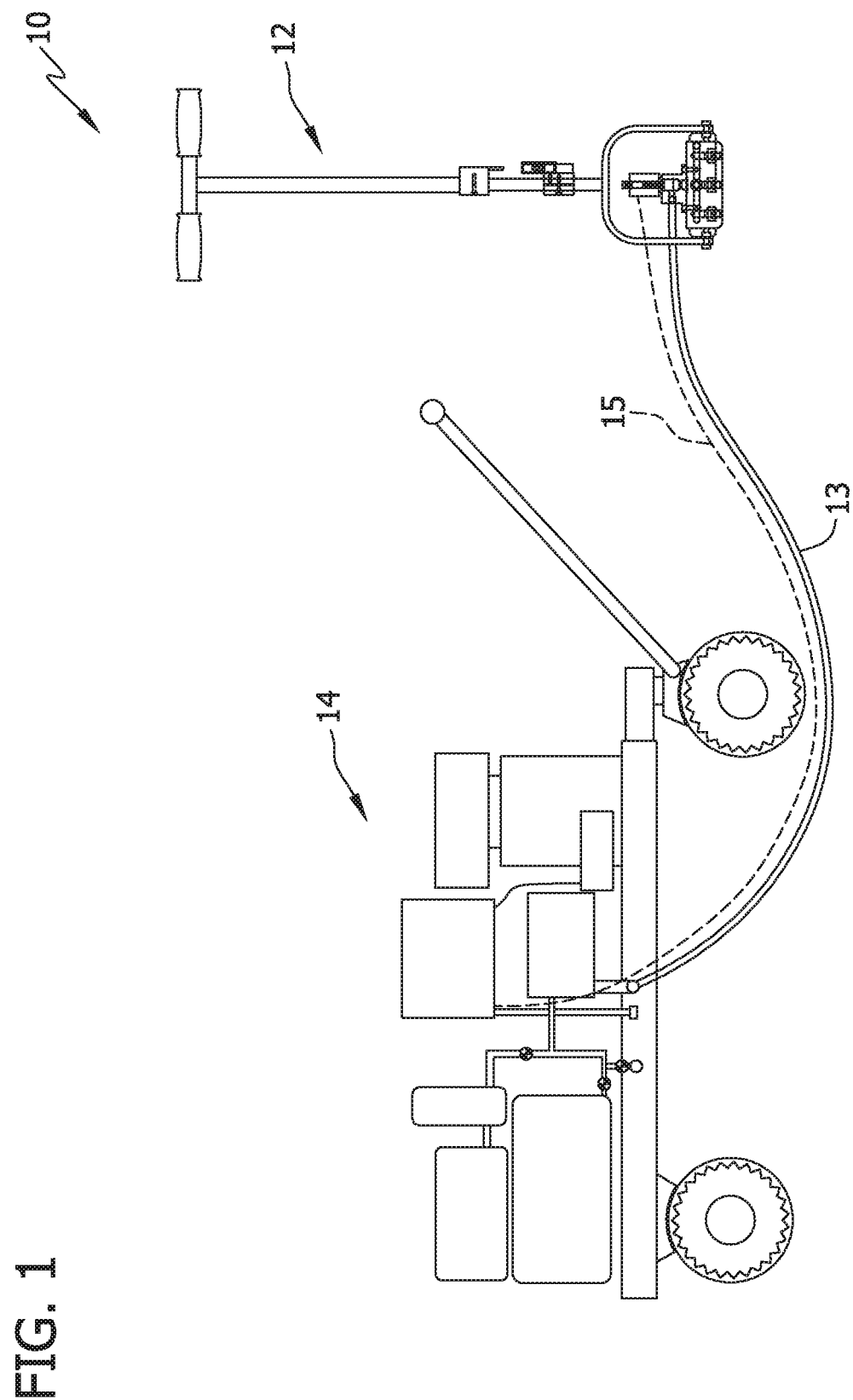
FIG. 1 is a schematic illustration of a high pressure injection system for injecting a termiticide into the ground in accordance with an exemplary embodiment in which the system includes a base unit and a handheld application tool.

A high pressure injection system for applying a soil treatment (e.g., pesticide, insecticide, termiticide, fertilizer or micronutrient) beneath the surface of the ground is described below in detail. It is understood that the system disclosed herein can be used to apply any suitable soil treatment including pesticide, insecticide, termiticide or soil amendment and can be used to inhibit or control various types of pests, pathogens or add to the nutritional value of the soil. For example, it may be desirable to inhibit and/or control termites, ants, cockroaches, beetles, earwigs, silverfish, crickets, spiders, centipedes, millipedes, scorpions, pillbugs, sowbugs, flies, mosquitoes, gnats, moths, wasps, hornets, bees, and the like. As used herein, the term "pesticide" refers to any substance or mixture for preventing, destroying, repelling, or mitigating any pest including insects, animals (e.g., mice, rats), plants (e.g., weeds), fungi, microorganisms (e.g., bacteria and viruses), pseudocoelomates (e.g., nematodes) and prions. The term "insecticide", which is a type of pesticide, is used herein to mean any substance or mixture for preventing, destroying, repelling, or mitigating insects. The term "termiticide", which is a type of insecticide, is used herein to mean any substance or mixture for preventing, destroying, repelling, or mitigating termites.

Although the methods and systems described herein relate to the application of termiticides beneath the surface of the ground, the methods and systems could also be used to apply pesticides, insecticides, or other soil treatments. The use of termiticides as described herein is not intended to be limiting in any way. Rather, it is for exemplary purposes. The methods and systems described herein may be used, therefore, to apply any type of soil treatment beneath the ground (e.g., pesticides, fertilizers, other soil conditioning materials and insect treatments including insecticides placed around the perimeter of a structure), and is in no way limited to only termiticides.

The methods and systems described herein include a termiticide fluid supply cart (a base unit), and a portable handheld application tool that facilitates the application or injection of termiticides into the soil under and around structures, ornamental plantings, poles, fences, decks, trees and other structural and non-structural elements. The example embodiment eliminates the need to apply termiticides using certain known techniques such as digging, trenching, and/or rodding, which all require mechanically disturbing at least the surface of the ground or soil. These known techniques can cause damage to vegetation, disrupt landscaping, and impact or diminish the aesthetic beauty and value of the treated area until the plants recover or new plantings are installed.

The application system described herein includes an application tool that has a tee-handle at the top of the tool and a manifold assembly at the bottom of the tool. The tee-handle includes a hand grip portion on each side of a vertical shaft that extends between the handle and the manifold assembly. The hand grip portions may include rubber grips to aid in holding the tool during application and to reduce hand strain. It is contemplated that in other embodiments any suitable handle configuration may be used. For example, the handle may be a circular-shaped handle with one or more rubber grips extending continually or in segments about the circumference of the handle to allow for adjustable positioning of the operator's hands during operation of the tool or during transport.

The vertical shaft of the tool consists of several parts that allow the shaft to compress, when the handle is pushed down, much like a pogo stick. The compression of the shaft activates an electronic triggering switch (broadly, "an actuator") that temporarily opens a discharge valve, for example a poppet valve. When the operator has the manifold assembly (i.e., device plate) in position on the ground, the operator uses the handle to apply a downward pressure (approximately 15-20 pounds) onto the shaft to actuate the trigger switch, which in turn causes a single injection of termiticide into the ground. The operator must release the pressure applied to the shaft to disengage the switch, which results in the system being reset.

In the example embodiment, the switch actuates the discharge valve a single time for each compression of the shaft. Thus, for each compression of the shaft, the discharge valve is opened a single time and a predetermined quantity of termiticide is discharged from the tool. The switch of tool is reset when the shaft is released. The next application can then be made by again compressing the shaft.

The application tool also includes a mounting bracket that mounts the manifold assembly to the shaft. This bracket allows the application head or manifold assembly to pivot about at least one axis. This allows the operator to adjust the tool such that the manifold assembly is properly positioned before activating the application switch.

The manifold assembly includes an inlet port, a discharge valve, a plurality of high pressure nozzles, a manifold head, and a contact plate for protecting the plurality of high pressure nozzles. The system also includes at least one high pressure liquid line and electrical connections that extend between the supply cart and the handheld application tool. The system also includes a pressure manifold and an electronic controller (broadly, "a valve closer") that sets the length of time the discharge valve remains open during each activation of the electronic switch.

In operation, a measured dose of a liquid termiticide concentrate from a container housed on the supply cart is mixed with measured supply of water and fed to the application tool by an inline injection system. In another embodiment, the termiticide concentrate is supplied from a tank housed on the application tool and is fed to the application manifold via an injection pump. In yet another embodiment, the termiticide solution is supplied to the application tool from a tank or container without the need of an inline injection pump or device. In still yet another embodiment, the termiticide concentrate can be carried by the operator and housed in a transportable container formed into and/or held within a backpack, a shoulder holster, a sling, a belt holster, a leg holster, or other suitable device capable of holding the pesticide container.

The methods and systems described herein utilize high pressure to inject the termiticide into soil beneath the surface of the ground. The high pressure injection system described herein differs from at least some known liquid injection systems that apply termiticides for soil application in that the current industry standard liquid termiticide injection systems inject liquids into the ground using pressures of 25 to 35 psi and through a single injection port or tip. The example system described herein injects the termiticide solution into the ground at pressures ranging from about 50 psi to about 10,000 psi, and in another embodiment, from about 1,000 psi to about 7,000 psi, and in yet another embodiment, at about 4,000 psi.

In operation, the application tool is set at a desired pressure for applying the termiticide. The operator then places the manifold assembly, and more specifically, the contact plate, which protects the injection nozzles, in a desired application area. The desired area may be, for example, adjacent to a wall or foundation of a structure. The operator then press down on the application handles to compress the shaft of the tool. This downward pressure causes the upper and lower portions of the device shaft to come together thereby activating an electronic switch. The switch would temporarily open the discharge valve and allow a predetermined amount of termiticide solution to pass through the high pressure injection nozzles and into the ground. The switch would only allow a single charge (i.e., a predefined amount of termiticide solution) to pass through the nozzles. The switch is reset by releasing the pressure on the handle and allowing the two parts of the electronic switch to separate. The operator applicator would then lift or slide the handheld application tool along the wall to the next application point and press down on the handle again, thus repeating the injection of the termiticide solution into the soil. The operator continues to move the handheld application tool and inject termiticide until the desired application area is injected. In one example, the desired application area is the perimeter of the structure so that a barrier of termiticide completely surrounds the structure and thereby inhibits termites from passing through the barrier to the structure.

In an alternative embodiment, the electronic switch could be positioned on or near the tee-handle portion of the tool where it could be activated by the operator pressing down on a button or switch with a finger or thumb. In another embodiment, the tool could include a position marker, such as a foam, dust, powder, paint, or a dye material that would be applied when the termiticide is applied. The position marker would apply a marking material to the ground to mark the position of the contact plate during each application. This would allow the operator to visually determine where an application has been made and where the device plate should be re-positioned to ensure that a continuous application of the termiticide is made around the perimeter of the structure. The marker would also aid in preventing over or under application of the termiticide solution in the application area.

The high-pressure application tool and methods of using the same as described herein have many advantages over the known systems. For example, the tool described herein may include an inline injection assembly which eliminates the need to mix large volumes of the termiticide solution, and reduces the hazards associated with transporting or handling large volumes of termiticide solutions on public roadways or on private property. The use of the high-pressure injection tool also eliminates the need for digging (i.e., trenching) before applying the termiticide solution into the ground. This reduces the destruction of the landscaping and/or natural vegetation around the perimeter of a structure being treated, and is also less wear and tear on the tool used to perform the application. For example, the high-pressure injection tool also reduces or eliminates the need for rodding into the soil with an application device in order to apply the termiticide solution. The high-pressure tool can also be programmed to deliver a specific volume of termiticide solution per nozzle, and control the depth to which the solution penetrates into the soil by controlling the application pressure. By controlling the volume and the pressure, the application volume of the termiticide can be reduced by 25% to 80% of a normal liquid termiticide application, thus saving cost and reducing demands on water. This is especially important in drier climates or during times of drought. The high-pressure tool also greatly reduces the time required to complete a termiticide treatment around a structure. This reduction in time can range between 40% and 80%. As a result, less time is spent at the site and thereby labor costs associated with the site preparation and application are reduced. Also, the application tool, which is designed to place the injection nozzles in close proximity to the ground when injecting the termiticide into the ground, reduces the risk of exposure to the operator or anyone in the immediate area of the application.

Referring to the drawings, FIG. 1 is a schematic illustration of a high pressure injection system 10 for injecting termiticide into the ground in accordance with an exemplary embodiment of the present invention. The injection system 10 includes a handheld portable application tool 12 (broadly, an "injection apparatus") and a termiticide fluid supply cart 14 (broadly, a "base unit"). The application tool 12 is connected to the cart 14 via a conduit 13 defining a fluid passageway (e.g., a hose) and at least one electrical connection 15. The conduit 13 permits fluid (e.g., water and/or a termiticide solution) to flow from the cart 14 to the application tool 12. The electrical connection 15 is used for transmitting various control signals between the application tool 12 and the cart 14.

Figure 2:
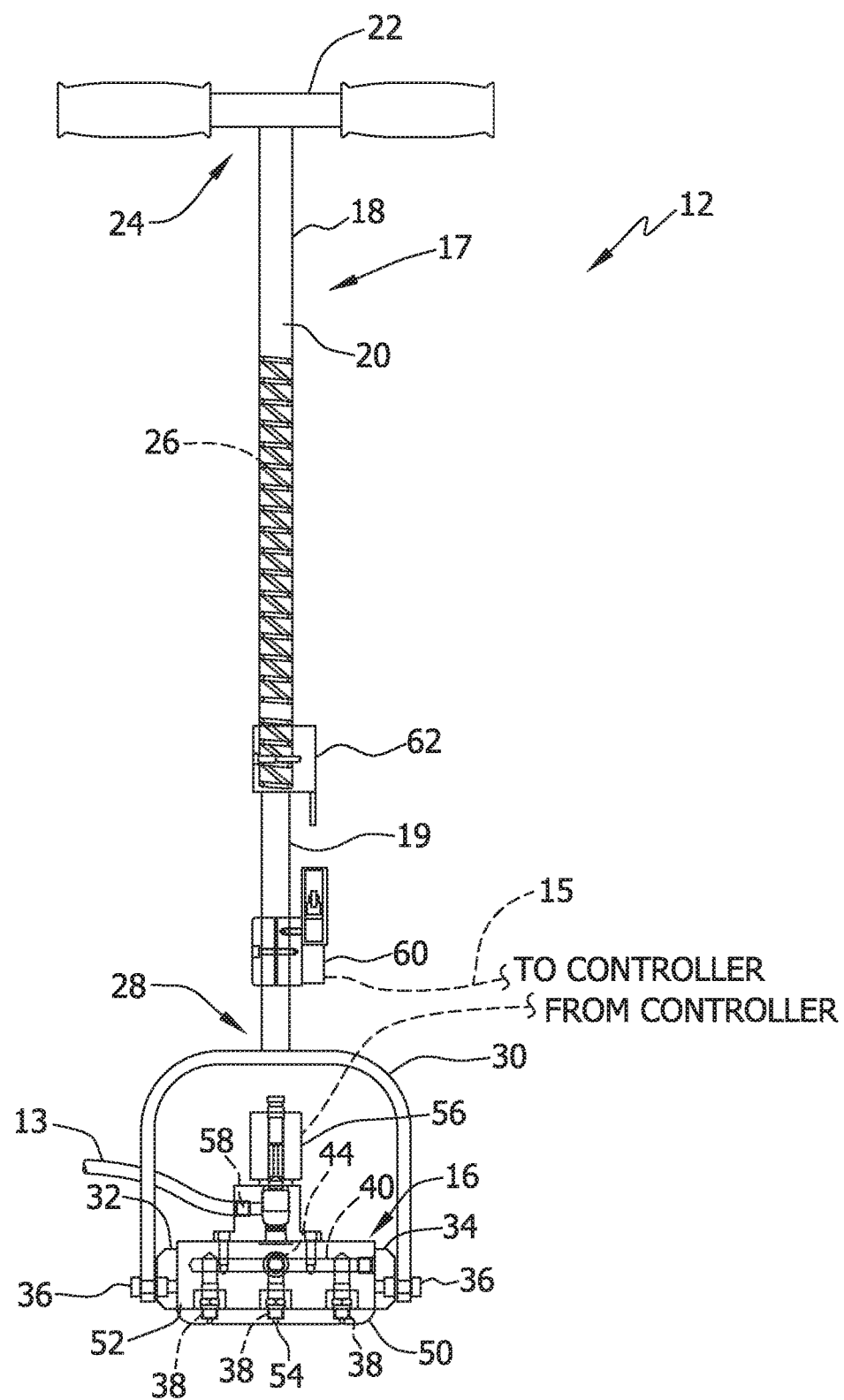
FIG. 2 is a front view schematic illustration of the handheld portable application tool of FIG. 1 with parts cut away.
Figure 3:
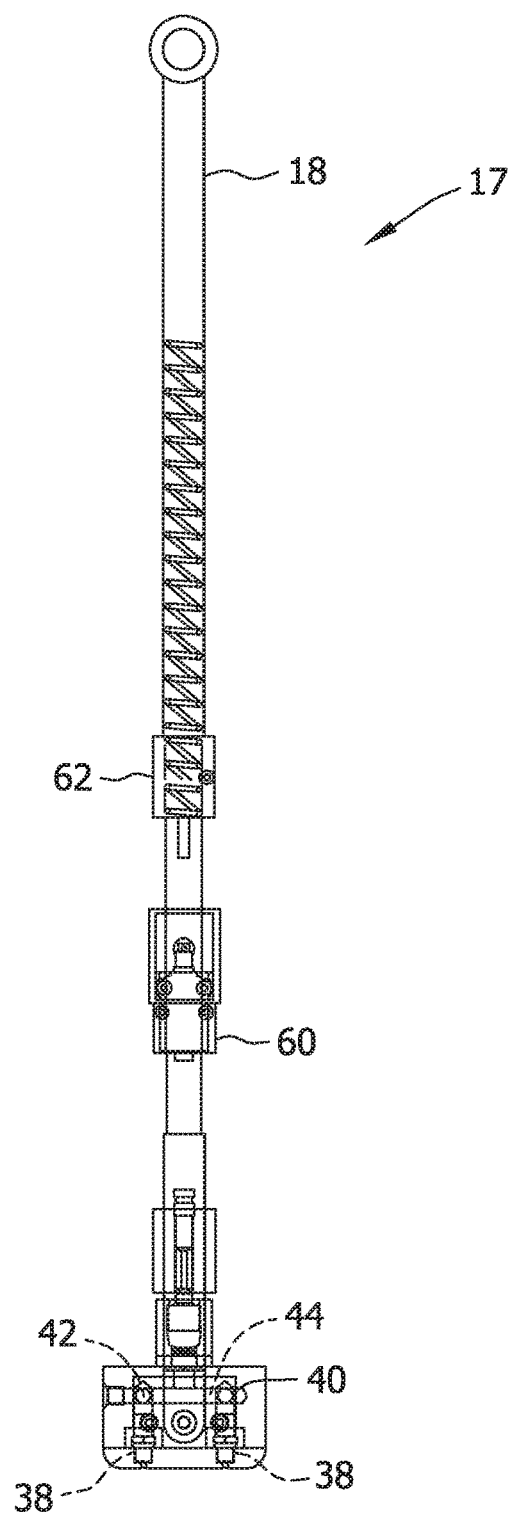
FIG. 3 is a side view schematic illustration of the handheld portable application tool of FIG. 2.

FIG. 2 is a front view schematic illustration of the handheld portable application tool 12, and FIG. 3 is a side view schematic illustration of the application tool 12. The handheld portable application tool 12 includes a handle 17 and a manifold head 16 mounted to the handle. The handle 17 includes an upper portion 18 and a lower portion 19. The upper portion 18 includes a tubular section 20 and a hand grip section 22 attached to an upper end 24 of the tubular section 20. As a result, the upper portion 18 of the handle 17 has a generally T-shape. The lower portion 19 of the handle 17, which is tubular, is sized for insertion into the tubular section 20 of the upper portion 18 of the handle. With the lower portion 19 of the handle 17 inserted into the tubular section 20 of the upper portion 18 of the handle, the upper portion can move with respect to the lower portion from a first, extended position to a second, compressed position. A biasing element, such as a spring 26, is provided to bias the upper portion 18 of the handle 17 toward its first, extended position. It is understood, however, that any known biasing element 26 may be used. A flange (not shown) or other suitable retainer(s) may be provided to inhibit the lower portion 19 of the handle 17 from being pulled or otherwise withdrawn from the upper portion 18 to thereby ensure that the lower portion remains telescopically attached to the upper portion. A lower end 28 of lower portion 19 of the handle 17 is attached to an inverted U-shaped attachment bracket 30. The manifold head 16 is pivotally attached at each of its ends 32, 34 to the attachment bracket 30 via a pair of pivot pins 36.

The manifold head 16 includes at least one internal passage to distribute the termiticide to a plurality of high pressure nozzles 38 in fluid communication with the internal passage. As seen in FIG. 3, the illustrated manifold head 16 includes two main internal passages 40, 42, and a cross passage 44 connecting main internal passages. It is contemplated that the manifold head 16 may include any number of high pressure nozzles 38 including a single nozzle. For example, the manifold head 16 of the exemplary embodiment has a matrix of six high pressure nozzles 38 with each nozzle generally equidistant from each other. Each of the high pressure nozzles 38, in one embodiment, has an orifice diameter ranging from about 0.002 inch to about 0.01 inch.

With reference again to FIG. 2, a contact plate 50 is attached to a bottom surface 52 of the manifold head 16 to protect the high pressure nozzles 38. In the illustrated embodiment, the contact plate 50 includes a plurality of openings 54 with each of the openings being generally aligned with a respective one of the plurality of high pressure nozzles 38. As a result, the high pressure nozzles 38 are spaced from the soil by the contact plate 50 and therefore do not directly contact the soil. Moreover, the contact plate 50 shields or otherwise blocks soil, rocks, and/or other debris that may be "kicked-up" during the injection of the termiticide. The contact plate 50 includes rounded edges to facilitate sliding of the tool 12. The contact plate 50 can be made from any suitable material, for example, metal and/or plastic.

Figure 4:
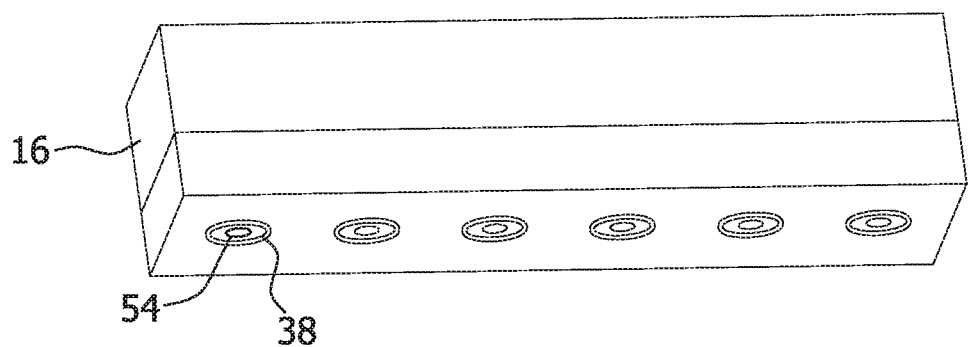
FIG. 4 is a perspective schematic illustration of an elongated shaped manifold head for use with the application tool.
Figure 5:
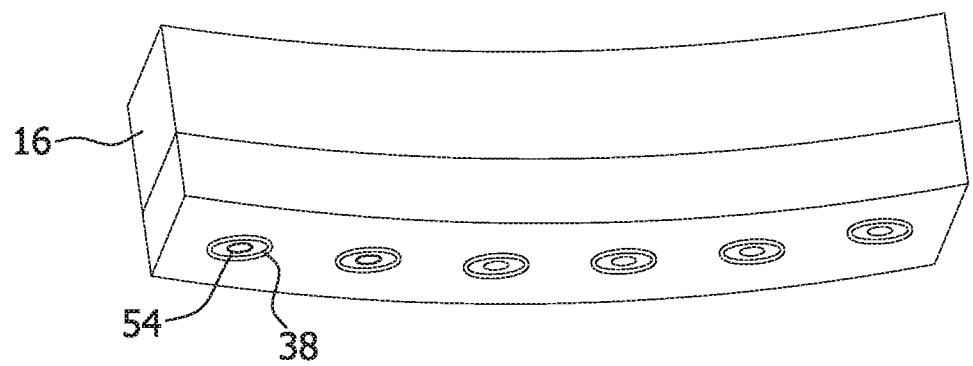
FIG. 5 is a perspective schematic illustration of an arcuate shaped manifold head for use with the application tool.

The size and shape of the manifold head 16 may be selected based on the particular application for which the tool 12 is intended to be used. In one embodiment, the manifold head 16 has a shape with a high length to width ratio such as the high pressure nozzles 38 being arranged linearly in a row as shown in FIG. 4. In another embodiment, the manifold head 16 has an arcuate shape as shown in FIG. 5. The arcuate shaped manifold head 16 may be used to conform around circular edges, such as around trees. It is contemplated that the manifold heads 16 can be interchangeable. That is, the operator of the tool 12 can selectively change out the manifold head 16. It is also contemplated that the manifold head 16 can be replaced with other delivery means (e.g., a rod injection tool) for delivering a supply of termiticide at low pressures. These low pressure delivery means can be used in areas less suitable for high pressure injection.

The weight of the manifold head 16 may be selected so that the mass of the manifold head 16 assists in retaining tool 12 in position during a discharge from the plurality of high pressure nozzles 38, without being unduly burdensome for manual positioning and moving the tool by an operator. In general, the lighter the mass of the manifold head 16, the greater the force that the operator must apply to the handle 17 to retain the tool 12 in position during a discharge of termiticide from the high pressure nozzles 38.

As illustrated in FIG. 2, a discharge valve 56 is attached to the manifold head 16 and is in fluid communication with the internal passages 40, 42, 44 in the manifold head and the supply of termiticide. More specifically, one end of the discharge valve 56 is coupled to a high pressure inlet port 58 and the other end of the discharge valve is coupled to the hose 13. The discharge valve 56 is moveable between an opened position and a closed position. When the discharge valve is in its closed position, termiticide is inhibited from flowing from the supply of termiticide via the hose 13 to the internal passages 40, 42, 44 in the manifold head via the high pressure inlet port 58. When the discharge valve 56 is opened, the termiticide solution flows from the supply of termiticide through the hose 13 and into inlet port 58 under high pressure. From the inlet port 58, the pressurized termiticide flows into internal passages 40, 42, 44 of the manifold head 16 and through the high pressure nozzles 38 from which the termiticide is injected into the ground. In one embodiment, the termiticide is pressurized to a pressure of about 25 psi to about 10,000 psi, and in another embodiment, from about 1,000 psi to about 7,000 psi, and in yet another embodiment, at about 4,000 psi.

In one suitable embodiment, the discharge valve 56 is a solenoid operated poppet valve capable of sufficiently rapid operation to allow opening and closing of the discharge valve 56 within the desired time parameters to allow correct depth penetration of the soil based on the pressure in use and correct volume of termiticide solution for the specific application. While it is possible to use a hydraulically actuated valve, the size and weight constraints of such a valve may otherwise limit the utility of the handheld application tool 12.

In another suitable embodiment, the manifold head 16 may have a discharge valve 56 associated with each of the high pressure nozzles 38, such that even distribution of termiticide fluid across the plurality of high pressure nozzles 38 may be ensured. While discharge balancing can be obtained within reasonable parameters simply through proper sizing of the internal passages 40, 42, 44, should it be required, and should it justify the expense, multiple discharge valves 56 may be used, such that pressurized termiticide solution contained in a feed hose supplying each of the discharge valves 56 may provide that an adequate amount of termiticide solution is available for each of the high pressure nozzle 38. Such a configuration, however, adds complexity to the system 10 in that the controller must be able to actuate the multiple discharge valves 56 in response to a single actuation, i.e., increasing the amount of wiring and power required to control the valves, although the power requirement may be offset by the use of smaller discharge valves 56.

As illustrated in FIG. 2, a trigger switch 60 (broadly, an "actuator") is mounted on the lower portion 19 of the handle 17 and a trigger switch actuator 62 is mounted on the upper portion 18. The trigger switch 60, which is electrically coupled to the discharge valve 56, activates the discharge valve 56 when the trigger switch actuator 62 engages the trigger switch 60. In the illustrated embodiment and as seen in FIG. 3, the trigger switch actuator 62 is engaged with the trigger switch 60 when the upper portion 18 of the handle 17 is moved to its second, compressed position. Thus, the trigger switch 60 can be actuated by moving the upper portion 18 of the handle 17 from its first, expanded position to its second compressed position by applying a force on the upper portion so that it slides downward relative to the lower portion 19 of the handle until the trigger switch actuator engages the trigger switch 60.

In another embodiment (not shown), the trigger switch 60 can be located on the hand grip section 22 of the upper portion 18 of the handle 17 where it can be actuated by the operator using a finger or thumb. The trigger switch may be a mechanical device, which interrupts the flow of termiticide from the discharge valve 56 to the high pressure nozzles 38, or may be an electrical switch which interrupts the electrical signal to the discharge valve 56, thus preventing actuation of the discharge valve 56.

To inject the termiticide into the ground, the operator positions handheld portable application tool 12 such that the contact plate 50 is in contact with the surface of the ground. A downward force between about 15 to 20 pounds is applied by the operator to the upper portion 18 of the handle 17 to move the upper portion 18 from its first position to its second position and thereby cause the trigger switch actuator 62, which is mounted to the upper portion, to engage the trigger switch 60, which is mounted to the lower portion 19. Engagement of the trigger switch actuator 62 and the trigger switch 60 actuates the trigger switch 60. As a result, an electronic signal is sent from the trigger switch 60 to the discharge valve 56 causing the discharge valve to move from its closed position to its opened position for a predetermined amount of time thereby permitting termiticide to flow to and out the high pressure nozzles 38 for injecting the termiticide into the ground. The operator then releases the pressure from the handle 17, which resets the trigger switch. More specifically, the spring 26 causes the upper portion 18 of the handle 17 to move back to its first, extended position. The illustrated trigger switch 60 is configured to work only once during each compression of handle 17 to prevent repeated opening of the discharge valve 56 until the handle 17 has been reset.

The depth of penetration of the termiticide solution into the ground is a function of the pressure at which the termiticide solution is discharged from the tool 12 and the type of soil into which the termiticide is discharged. For example, hard packed or compacted soil, such as clay, is harder to penetrate and may require higher pressures than a soft sandy soil. Thus, at a given pressure the penetration of termiticide into a sandy soil may be about 12 to 14 inches, while the penetration of termiticide into a sandy loam at the same pressure may be about 6 to 9 inches, and the penetration of termiticide into a clay soil at the same pressure may be about 2 to 5 inches. It is understood, however, that the penetration of termiticide can be greater at higher pressures. For example, the penetration of termiticide into a clay soil may be about 10 to 12 inches at a sufficiently high pressure.

The depth of penetration of the termiticide solution into the ground is also a function of the duration in which the discharge valve 56 is open. The longer the duration during which discharge valve 56 is open, the longer the sustained force of the solution is maintained—resulting in increased depths of penetration of the solution. At low pressure, the time required for the solution to force its way into the ground to the desired application depth takes longer than when the pressure by which the solution is delivered is increased.

Referring to FIG. 5, the manifold head can be formed into an arch, a semicircle, or other form of angled deflection. A manifold formed in such a manner would be well suited for facilitating the injection of a pesticide solution around a tree, a bush, a post, a pole, a potted plant, root ball, or other plant or structural element where the curved or angled manifold enables the applicator to position the pesticide into an area proximate to the targeted point of application.

Figure 6:
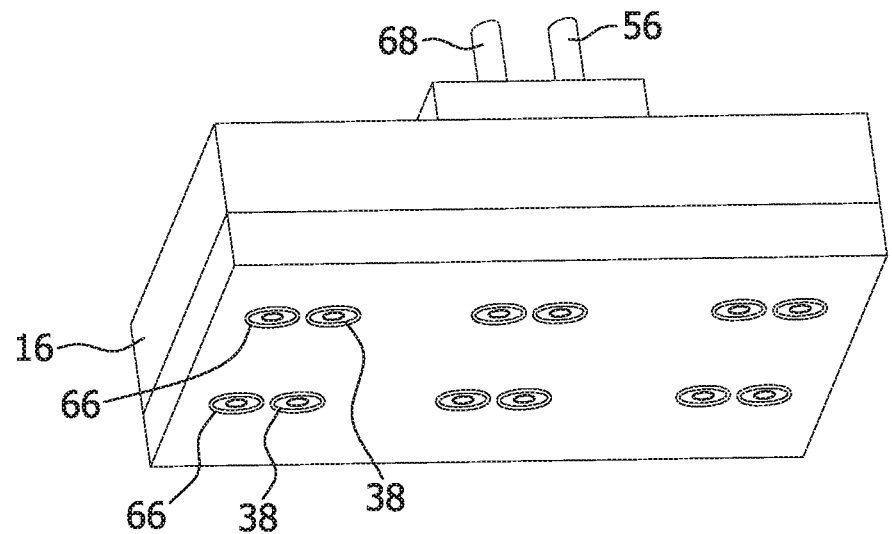
FIG. 6 is a perspective schematic illustration of a manifold head of the handheld portable application tool shown in FIG. 2 having low pressure nozzles positioned adjacent to high pressure nozzles.
Figure 7:
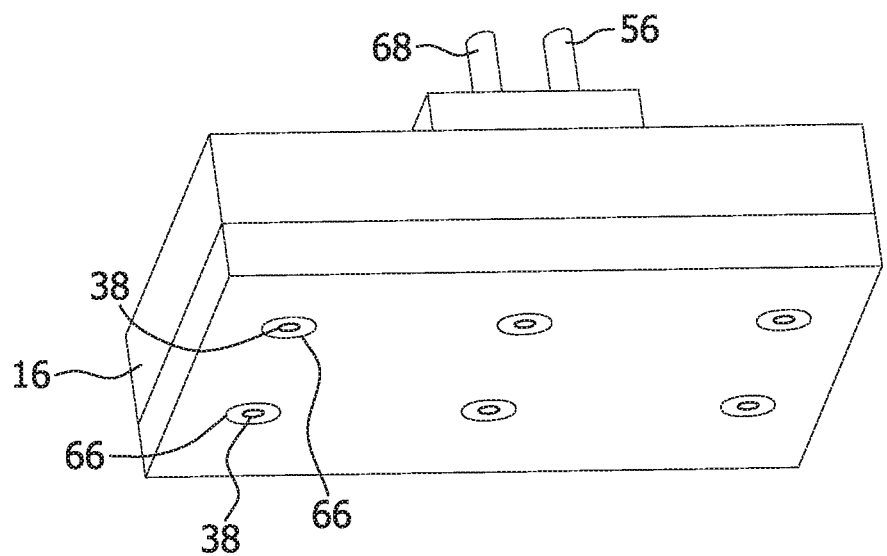
FIG. 7 is a perspective schematic illustration of the manifold head of the handheld portable application tool shown in FIG. 2 having low pressure nozzles concentric with high pressure nozzles.

Referring also to FIGS. 6 and 7, the manifold head 16 may also include a plurality of the low pressure nozzles 66. In the illustrated embodiment of FIG. 6, each of the lower pressures nozzles 66 positioned adjacent to one of the plurality of high pressure nozzles 38. In another embodiment, which is illustrated in FIG. 7, each of the low pressure nozzles 66 is concentric with one of the high pressure nozzles 38. The low pressure nozzles 66 apply the termiticide solution onto the surface of the ground when a low pressure discharge valve 68 is opened. The lower pressure discharge valve operates in the same manner as the previously described discharge valve 65. The low pressure nozzles 66 are configured to apply the termiticide solution to the ground at a pressure of less than about 35 psi. It is also contemplated that in some embodiments the high pressure nozzles 38 may not all have the same size (e.g., diameter) orifice. For example, the nozzles 38 that are, in operation, closer to the structure may have a larger diameter orifice than the nozzles that are away from the structure so that a higher volume of the termiticide solution is applied nearer the structure and a lower volume is applied away from the structure. A similar arrangement may be provided for the low pressure nozzles 66.

Figure 8:
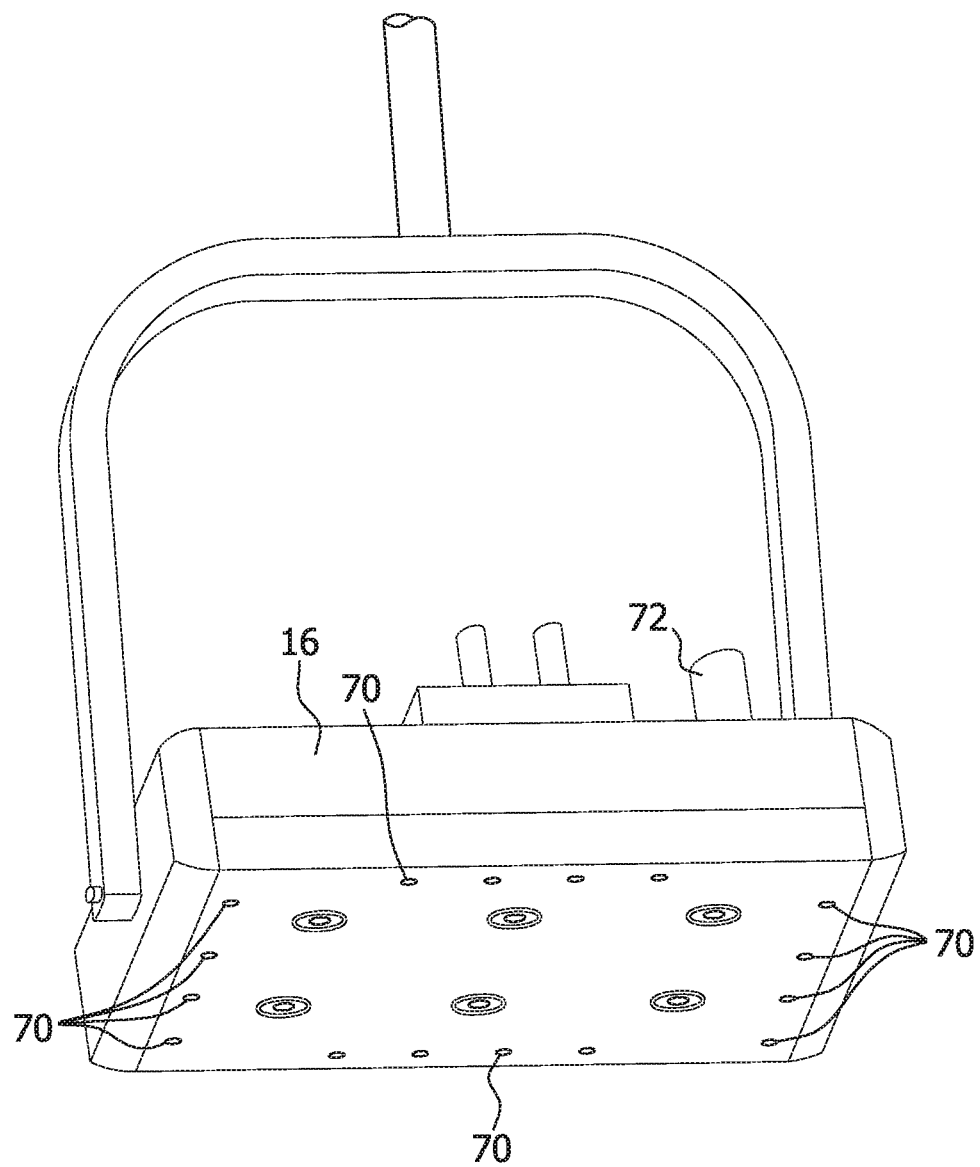
FIG. 8 is a bottom schematic illustration of the manifold head of the handheld portable application tool shown in FIG. 2 having nozzles on the perimeter for applying marking materials.
Figure 9:
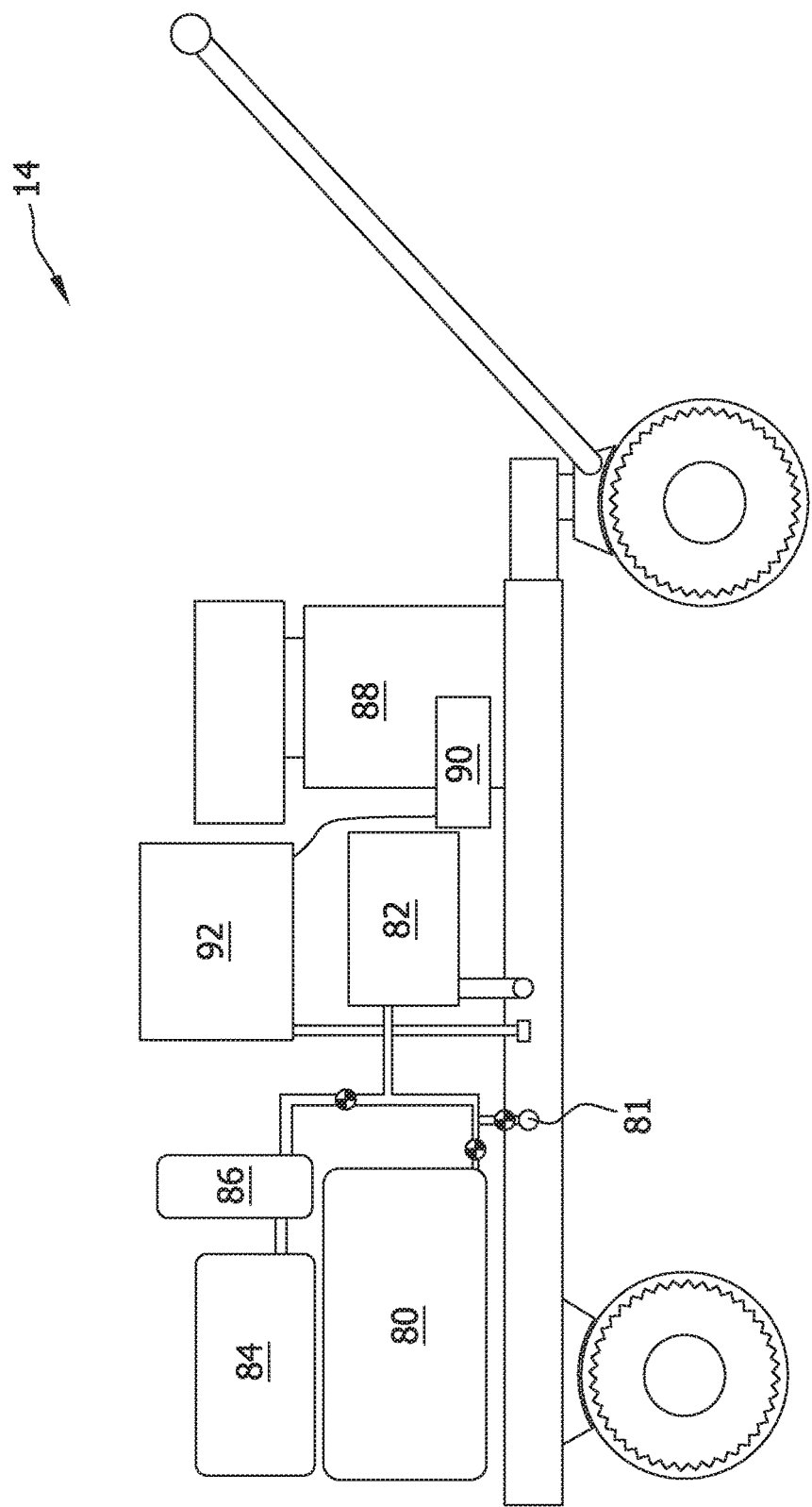
FIG. 9 is a side view schematic illustration of the base unit shown in FIG. 1.

Referring now to FIG. 8, the handheld portable application tool 12 may also include a plurality of nozzles 70 (broadly, a "dispenser") for depositing position marker material onto the surface of the soil to indicate an area in which the termiticide has been injected, and marking the position of the manifold head 16 during each application. Marking the position of the manifold head 16 permits the operator to visually observe where termiticide has been applied and to where the manifold head should be positioned next so that a uniform application of the termiticide can be applied around the perimeter of a structure. In addition, the applied marking material may also aid in preventing over and/or under application of the termiticide. Any suitable marking material may be used, for example, a foam, a powder, a paint, and a dye. In the illustrated embodiment, the marking material is applied by the plurality of nozzles 70 about the circumference of the manifold head 16. A container 72 containing the marking material may be carried by the application tool 12 or a remotely located device such as the cart 14 shown in FIG. 1. It is understood that the marking material may be applied by any suitable delivery device and remain within the scope of this invention.

The supply of termiticide solution may be provided by the supply cart 14. In one embodiment, the cart 14 includes a water reservoir 80, a high pressure pump 82 for pressurizing the termiticide solution, a termiticide concentrate reservoir 84, and a mixing device 86 that supplies the appropriate amount of termiticide concentrate to be mixed with the appropriate amount of water to form the termiticide solution. A water inlet 81 for receiving water from an external water source (e.g., a standard residential water spigot) is also provided. It is contemplated that either the water reservoir 80 or the water inlet 81 can be omitted. The supply cart 14 also includes a gasoline engine 88 with a generator 90 for generating power for operating the pressure pump 82 and generating electrical current for operating a controller 92 associated with the tool 12. In another embodiment, electrical power can be supplied by connecting into an electrical outlet located at the application site.

It is contemplated that the supply cart 14 may be vehicle mounted (e.g., a truck, a van, a ATV), trailer mounted, self propelled, or even a combination thereof, such that the cart 14 can be towed to a job site, then moved around a location under its own power. It is also contemplated that some of the various components of the system 10 described herein as being mounted on the supply cart 14 may be mounted on the application tool 12. For example, it is contemplated that the termiticide concentration reservoir 84 and the mixing device 86 can be mounted on the application tool 12 instead of the supply cart 14. It is further contemplated that the supply cart 14 can be omitted. In such an embodiment, at least the termiticide concentration reservoir 84, the mixing device 86, and the water inlet 81 are carried on-board the application tool 12.

The controller 92, which is mounted on the cart 14, permits the operator of the system 10 to selectively set a pulse duration and pressure level for termiticide injections. The controller 92 may be programmable to permit the operator to enter parameters associated with a particular manifold head 16 in use, such as by defining the number of orifices and their sizes, parameters with a termiticide solution in use, such that dosing through the mixing device 86 can be properly controlled, or the number of injections can be tracked, and the like. It is understood that the pulse duration and/or pressure level for termiticide injections can be manually adjustable (e.g., via a manually adjustable valve) in addition to or instead of being set using the controller 92.

Figure 10:
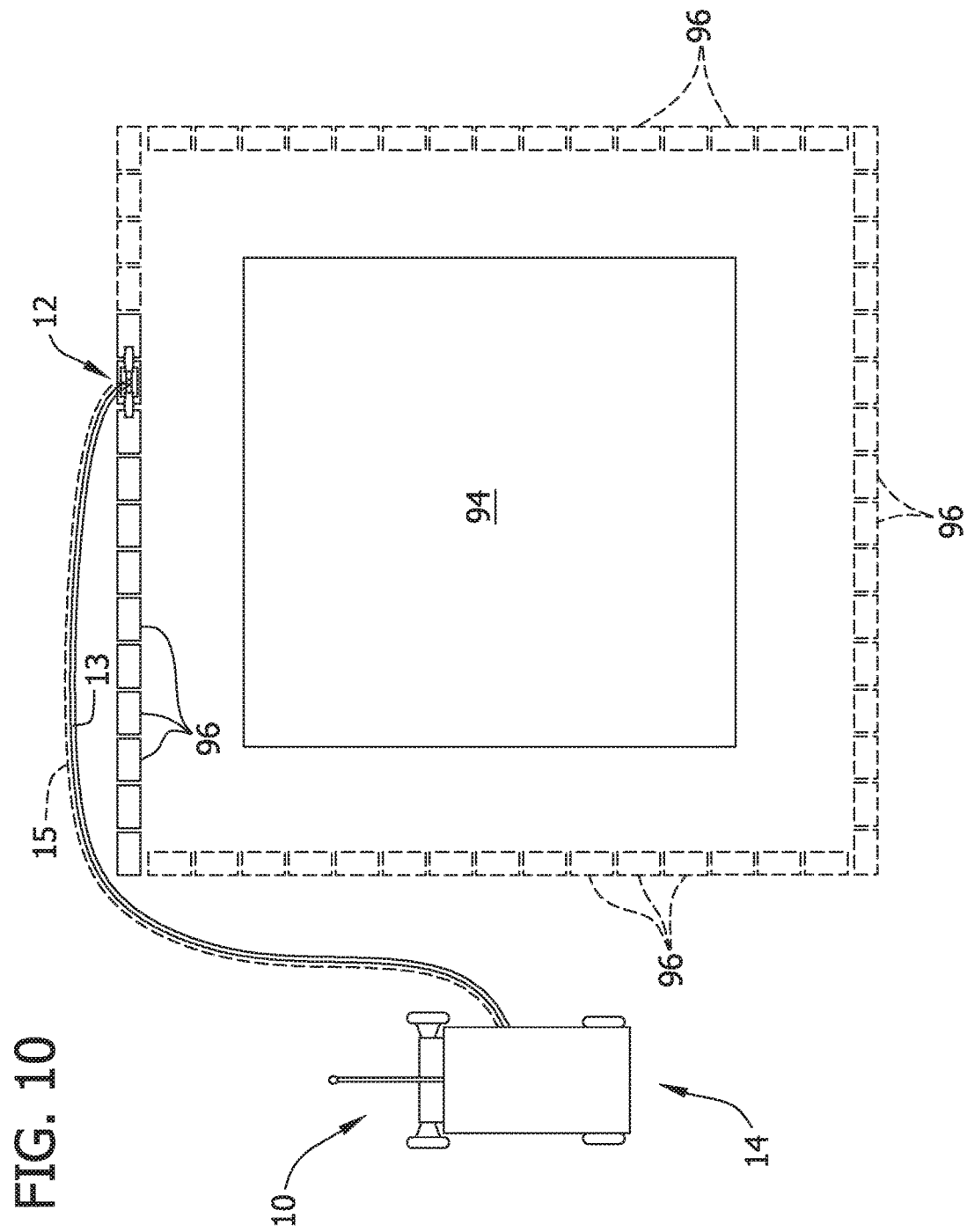
FIG. 10 is a top plan schematic illustrating the high pressure injection system of FIG. 1 being used to inject termiticide into the soil adjacent a structure.

As illustrated in FIG. 10, the system 10 can be used according to one embodiment of a method for treating soil adjacent to a structure, such as a house 94. For example, the system 10 can be used to inject and/or apply termiticide to the soil around the perimeter of the house 94 and thereby establish a barrier to inhibit termites from accessing the house and to control termites in close proximity to the house. According to one method, the base unit 14 is placed at a stationary location relative to the house 94 and the tool 12 is positioned over, and more suitably in contact with, an injection site 96 generally adjacent the house. The tool 12 is operated as described above to inject termiticide down into the soil at the injection site 96 without prior disturbance of the soil. The tool 12 is then moved relative to the supply cart 14 to another injection site 96 that at least in part different from the previous injection site and generally adjacent the house 94. In the illustrated embodiment, the injections sites 96 are generally in side-by-side relationship with each other. The tool 12 is again operated to inject termiticide down into the soil at this next injection site 96 without prior disturbance of the soil.

As seen in FIG. 10, the tool 12 is moved to and operated at a plurality of injection sites 96 adjacent the structure so that the injection sites cooperatively surround substantially the entire perimeter of the house 94. FIG. 10 illustrates a plurality of injection sites 96 at which termiticide has been injected (illustrated in the Figure with solid lines) and a plurality of injection sites at which termiticide will be injected (illustrated in the Figure with dashed lines). It is understood that termiticide can also be applied to surface of the soil at each or some of the injection sites 96. It is further understood that marking material can be deposited onto the soil to indicate where the pesticide solution had been injected into the soil. It is also contemplated that, if necessary, the supply cart 14 may be moved to another location as the handheld tool 12 is used about the perimeter of the house 94.

Figure 11:
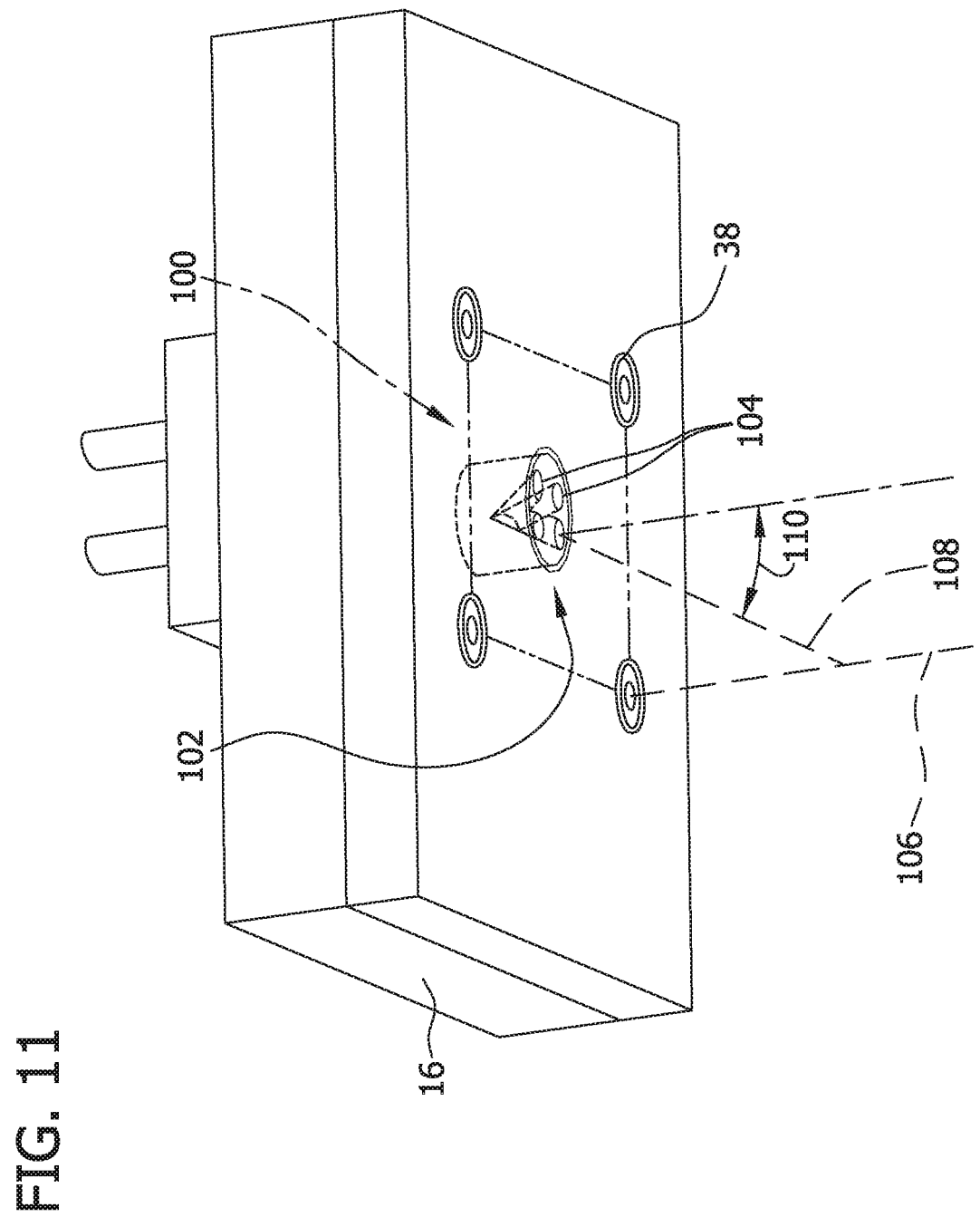
FIG. 11 is a perspective schematic illustration of a manifold head that includes multiport center nozzles.
Figure 12:
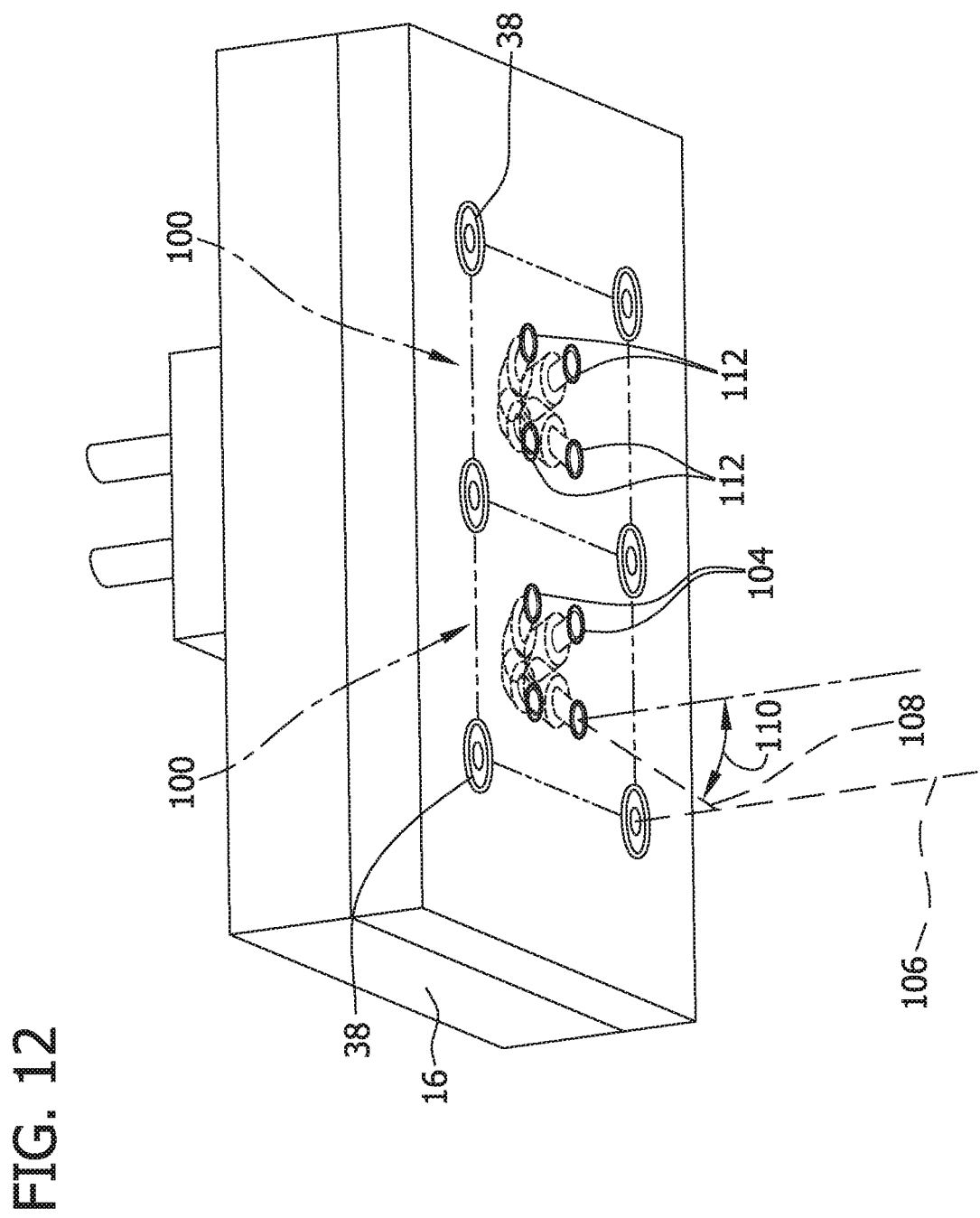
FIG. 12 is a perspective schematic illustration of a manifold head that includes four center nozzles.

Referring now to FIG. 11, in another embodiment the manifold head 16 includes four high pressure nozzles 38 arranged in a rectangular and more suitably a square matrix configuration 100 wherein adjacent nozzles 38 are generally equidistant from each other. In the illustrated embodiment, each of the high pressure nozzles is generally positioned at each corner of the square matrix configuration 100. It is contemplated that more than one square matrix of high pressure nozzles 38 may be formed in the manifold head 16. For example, FIG. 12 illustrates an embodiment wherein six high pressure nozzles 38 form two side-by-side square matrices 100 (or a single rectangular matrix). It is contemplated that the manifold head 16 may include 4+x equidistant high pressure nozzles 38 forming 1+(x/2) side-by-side square matrices 100, wherein x is an even integer greater than 0. It is also contemplated that the high pressure nozzles 38 can be arranged in an orthogonal matrix configuration, for example, a rectangular matrix, an hexagonal matrix, an octagonal matrix, and the like.

As seen in FIGS. 11 and 12, a multiport high pressure nozzle 102 can be positioned in the center of each of the square matrices 100. Each of the illustrated multiport nozzles 102 includes four ports 104 that are angled toward the corners of matrix 100. Each of the high pressure nozzles 38 is orientated so that a discharge stream 106 of termiticide from the nozzle 38 is substantially perpendicular to the bottom surface 52 of the manifold head 16. When the manifold head 16 is positioned on the ground, the discharge stream 106 is substantially normal to the ground surface, e.g., vertical, when the surface of the ground is substantially level. Each of the ports 104 of the multiport nozzle 102 is configured to direct a discharge stream 108 of termiticide from the port to intersect the discharge stream 106 from one of the high pressure nozzles 38. The intersection of the discharge stream 106 from one of the high pressure nozzles 38 by the discharge stream 108 from one of the ports 104 of the multiport high pressure nozzle 102 may be about 1 inch to about 12 inches below the surface of the ground.

An angle off vertical 110 of the discharge stream 108 of one of the ports 104 of the multiport nozzle 102 is based on the depth of intersection desired and the distance between the nozzles 38. The intersection of the discharge streams potentially results in the pooling of some of the injected termiticide. For example, when the high pressure nozzles 38 are 2 inches apart from each other, the angle off vertical 110 of the discharge stream 108 of the port 104 is about 54 degrees for an intersection at one inch below the surface, and about 9 degrees for an intersection at 6 inches below the surface, and about 5 degrees for an intersection at 12 inches below the surface. The soil also fractures due to the "lift-effect" of the solution discharged from the angled nozzles 38. As the solution flows from the nozzles it will deflect on the soil. With the deflected energy the soil is forced up and out away from the discharge stream 108, causing the soil to fracture and opening the soil to more termiticide solution and increasing the distribution of the solution forced out of the nozzles 38.

It is contemplated that the ports 104 of the multiport nozzle 102 can be configured such that the discharge streams of termiticide emitted therefrom are generally vertically and that some or all of the plurality of high pressure nozzles 38 can be configured such that the discharge streams of termiticide emitted therefrom are other than vertical. In one suitable embodiment, the termiticide is emitted from the nozzles 38 in a generally conical discharge stream. It is further contemplated that the ports 104 of the multiport nozzle 102 and the plurality of high pressure nozzles 38 can be configured to emit discharge streams of termiticide that are other than vertical. In either of these arrangements, some or all of the plurality of high pressure nozzles 38 can be configured to emit discharge streams that are angled toward the periphery of the control plate (i.e., away from the multiport nozzle 102) to thereby increase the coverage area of the termiticide and that some or all of the plurality of high pressure nozzles 38 can be configured to emit discharge streams that are angled inward and toward the multiport nozzle 102 for intersecting the discharge streams emitted from the ports 104 of the multiport nozzle.

In operation, the manifold head 16 is positioned on the ground and the operator activates the trigger switch 60 causing the discharge valve 56 to open thereby permitting the predetermined quantity of termiticide to flow to and out each of the high pressure nozzles 38 and each of the ports 104 of the multiport high pressure nozzle 102 thereby injecting termiticide into the ground. The discharge streams 106 of termiticide from each of the high pressure nozzles 38 is injected substantially vertically into the ground. The discharge streams 108 of termiticide from the ports 104 are injected into the ground at an angle off vertical 110 which causes the discharge streams 108 from each of the ports 104 to intersect respective discharge streams 106 from the high pressure nozzles 38 below the surface of the ground.

The angled discharge streams 108 of ports 104 provide for supplying the termiticide to a greater volume of the injection area than just using the high pressure nozzles 38. The angled discharge streams 108 of the ports 104 inject termiticide into the soil within a central injection zone of the injection area, which is located within an outer injection zone defined by the termiticide injected by the high pressure nozzles 38. Injection of termiticide at high pressures causes the soil to fracture as the discharge streams 106, 108 of termiticide pass through the soil. In another embodiment, each of the ports 104 are slightly offset so that their discharge streams 108 of termiticide do not precisely intersect respective discharge streams 106 from the high pressure nozzles 38.

Referring again to FIG. 12, in another embodiment four center high pressure nozzles 112 may be used instead of the multiport nozzle 102. The four center nozzles 112 are collectively positioned in the center of the matrix 100 and are each angled toward a different corner of the square matrix. Similar to the multiport nozzles 102 described above, the center nozzles 112 are configured to direct their discharge streams 108 to intersect a respective discharge stream 106 from one of the high pressure nozzles 38. The intersection of the discharge stream 106 from one of the high pressure nozzle 38 by the discharge stream 108 from one of the center high pressure nozzles 112 may be about 1 inch to about 12 inches below the surface of the soil. The angle off vertical 110 of the discharge stream 108 of the center nozzle 112 is based on the depth of intersection desired and the distance between the high pressure nozzles 38. For example, when high pressure nozzles 38 are 2 inches apart from each other, the angle off vertical 110 of the discharge stream 108 from the center nozzle 112 is about 54 degrees for an intersection at one inch below the surface, and about 9 degrees for an intersection at 6 inches below the surface, and about 5 degrees for an intersection at 12 inches below the surface.

Figure 13:
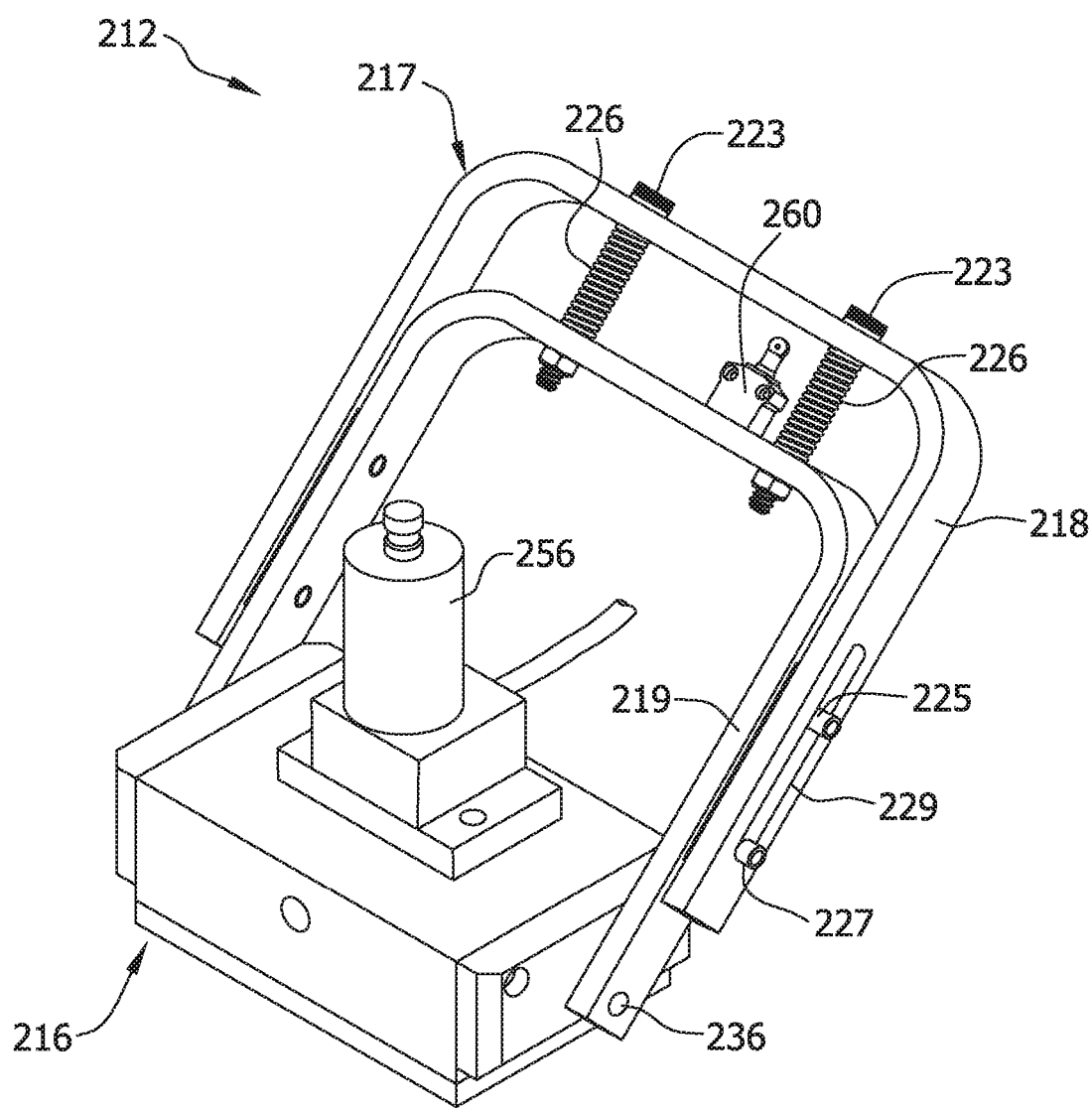
FIG. 13 is a perspective schematic illustration of another embodiment of a handheld application tool.

FIG. 13 is a schematic illustration of another embodiment of a handheld portable application tool 212 (broadly, an "injection apparatus") suitable for use with the high pressure injection system for injecting termiticide into the ground, which was described above. The relative size of the tool 212 makes it suitable for use in tight spaces (e.g., crawl spaces) as well as open spaces (e.g., a lawn). As seen in FIG. 13, the application tool 212 includes a handle 217 and a manifold head 216 mounted to the handle. The manifold head 216, which is pivotally mounted to the handle 217 via a pair of pivot pins 236 (one of the pivot pins being seen in FIGS. 13 and 14), is substantially the same as the manifold head 16 illustrated in FIGS. 1-3. As a result, the manifold head 216 illustrated in FIGS. 13 and 14 will not be described in detail.

Figure 14:
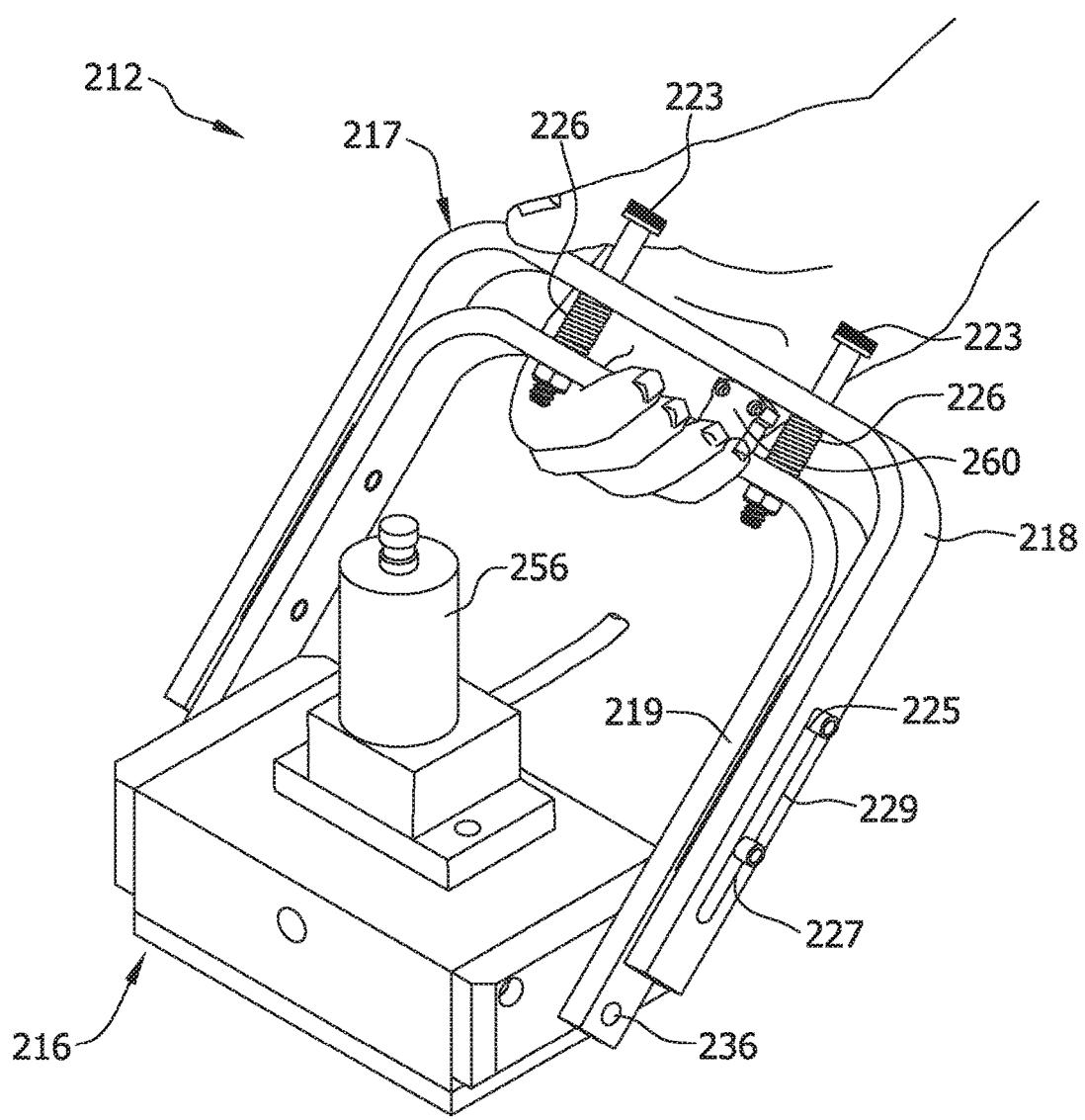
FIG. 14 is a perspective schematic illustration of the handheld application tool of FIG. 13 but with a trigger switch of the tool being actuated.

The handle 217 of the tool 212 includes an upper portion 218 and a lower portion 219. In the illustrated embodiment, both the upper and lower portions 218, 219 of the tool comprise generally U-shaped brackets. The upper portion 218 of the handle 217 can move relative to the lower portion 219 from a first, extended position (FIG. 13) to a second, compressed position (FIG. 14). A biasing element, such as a pair of springs 226, biases the upper portion 218 of the handle 217 toward its first, extended position and away from the lower portion 219. In the illustrated embodiment, each of the springs 226 is mounted on the handle 217 via a bolt 223. In addition, a pair of upper stops 225 and a pair of lower stops 227 are mounted on the lower portion 219 and extend through a slot 229 formed in the upper portion 218 to limit the range of movement of the upper portion relative to the lower portion. One of the upper stops 225 and one of the lower stops 227 are shown in FIGS. 13 and 14. It is understood, however, that any known biasing element 226 may be used and the biasing element can be mounted on the handle 217 in other suitable manners. It is also understood that other types of stops can be used to limit the relative movement between the upper and lower portions 218, 219 of the handle 217.

As illustrated in FIGS. 13 and 14, a trigger switch 260 (broadly, an "actuator") is mounted on the lower portion 219 of the handle 217. The trigger switch 260 is electrically coupled to a discharge valve 256 and activates the discharge valve when the trigger switch is actuated. As seen in FIG. 14, the trigger switch 260 is actuated by the upper portion 218 of the handle 217 being manually pressed into contact with the trigger switch. That is, the trigger switch 260 can be actuated by manually moving the upper portion 218 of the handle 217 from its first, expanded position to its second compressed position by applying a force on the upper portion so that it slides downward relative to the lower portion 219 of the handle until the trigger switch 260 is actuated. Actuation of the trigger switch 260 causes termiticide to be injected into the ground through the manifold 216.

Figure 15:
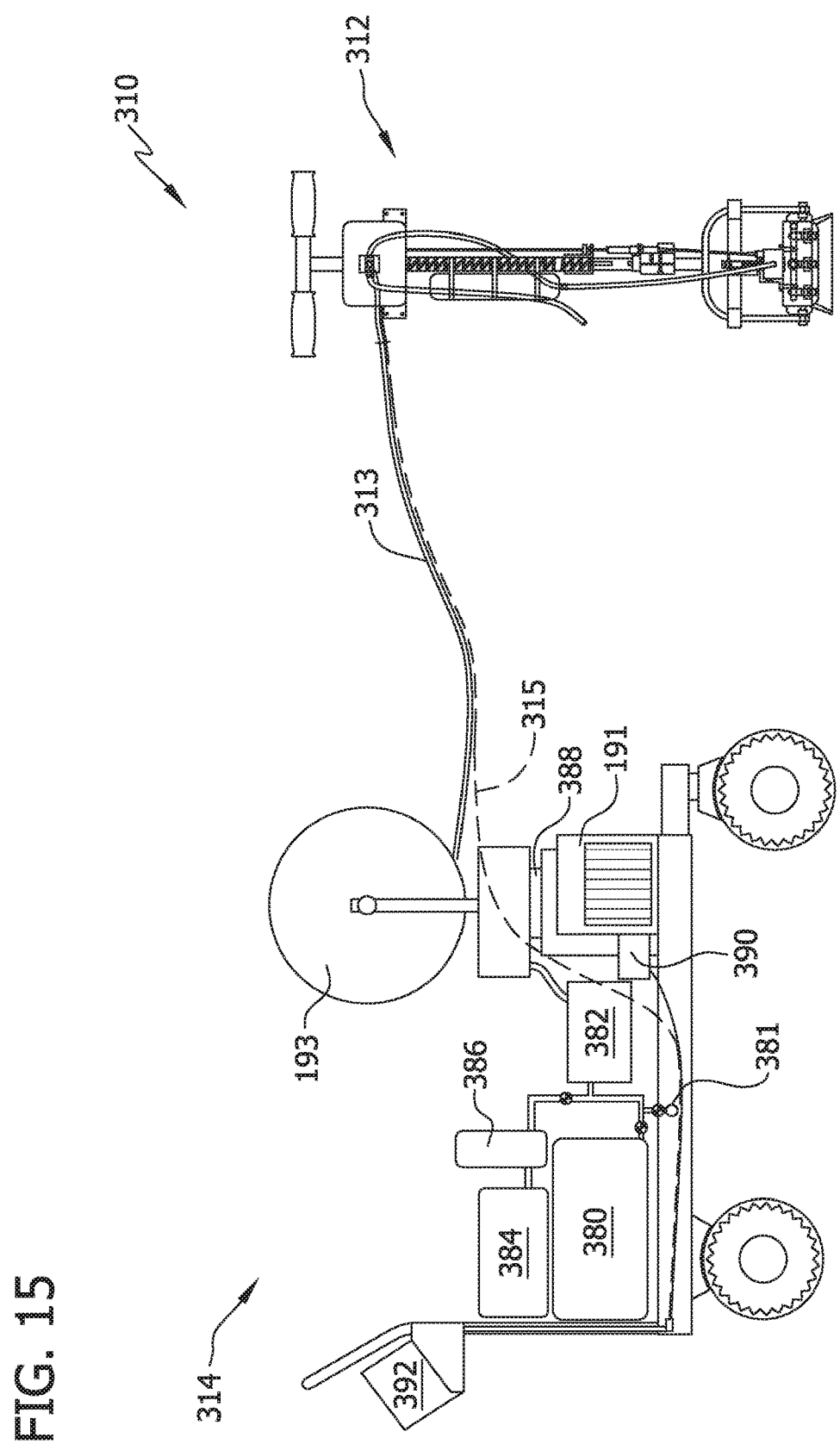
FIG. 15 is a schematic illustration of a high pressure injection system for injecting a termiticide into the ground in accordance with another exemplary embodiment in which the system includes a base unit and a handheld application tool.
Figure 16:
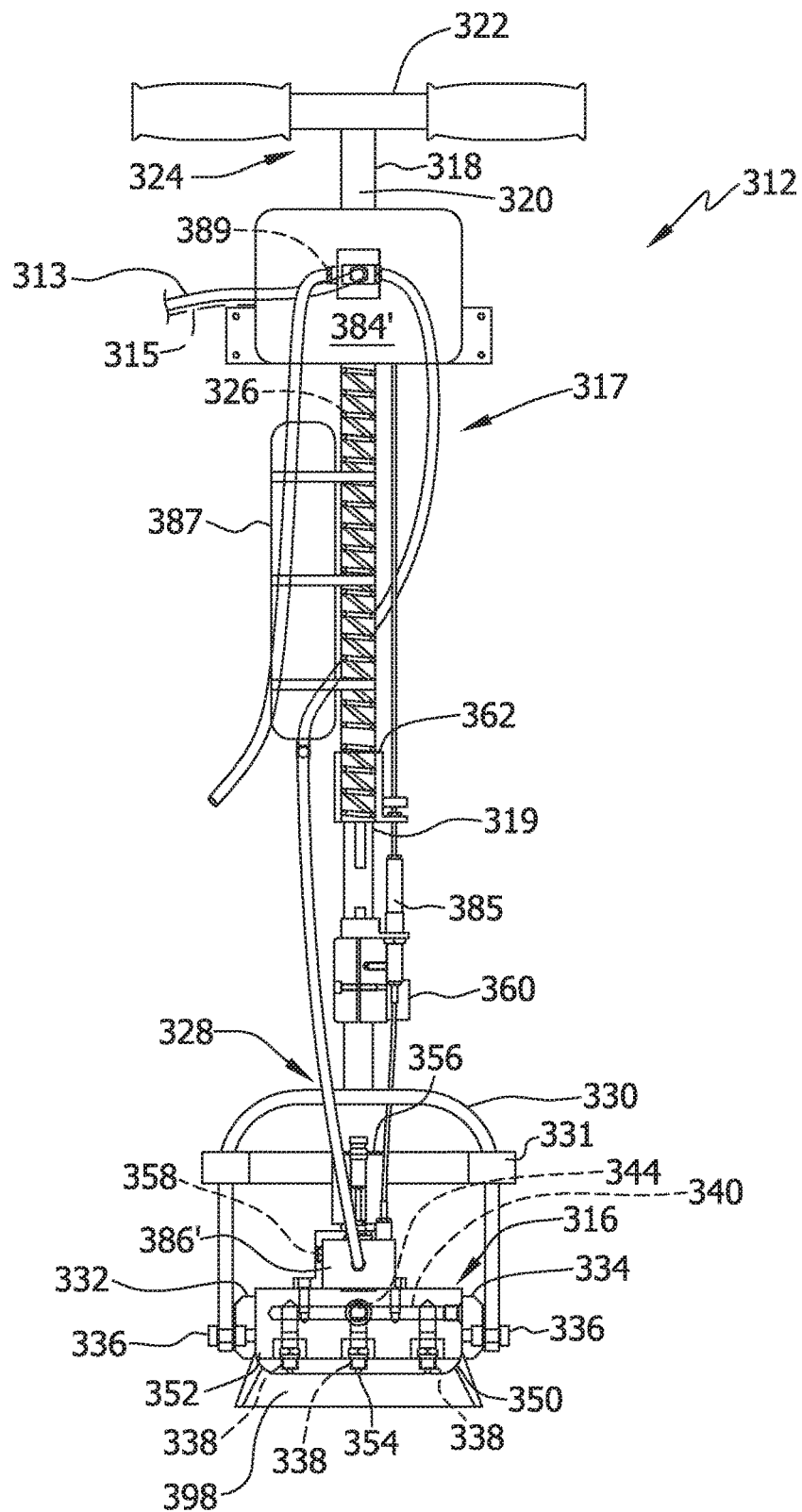
FIG. 16 is a front view schematic illustration of the handheld portable application tool of FIG. 15 with parts cut away.
Figure 17:
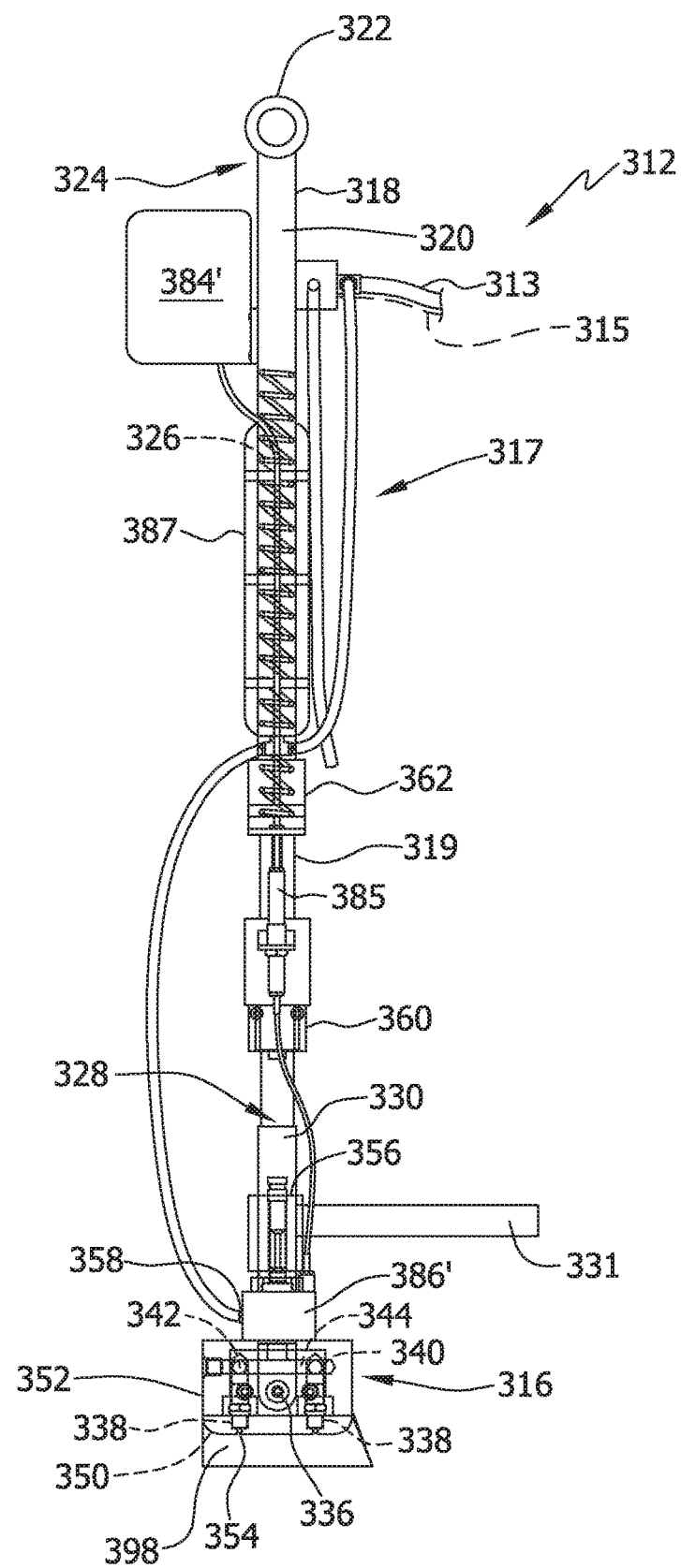
FIG. 17 is a side view schematic illustration of the handheld portable application tool of FIG. 16.

Referring now to FIGS. 15-17, these Figures schematically illustrate a high pressure injection system 310 for injecting termiticide (or other suitable treatment) into the ground in accordance with another exemplary embodiment. As seen in FIG. 15, the injection system 310 includes a handheld portable application tool 312 (broadly, an "injection apparatus") and a supply cart 314 (broadly, a "base unit"). The application tool 312 is connected to the cart 314 via a conduit 313 (e.g., a hose) defining a fluid passageway and at least one electrical connection 315. The conduit 313 permits fluid (e.g., water and/or a termiticide solution) to flow from the cart 314 to the application tool 312. The electrical connection 315 is used for transmitting various control signals between the application tool 312 and the cart 314.

FIG. 16 is a front view schematic illustration of the handheld portable application tool 312, and FIG. 17 is a side view schematic illustration of the application tool 312. The handheld portable application tool 312 includes a handle 317 and a manifold head 316 mounted to the handle. The handle 317 includes an upper portion 318 and a lower portion 319. The upper portion 318 includes a tubular section 320 and a hand grip section 322 attached to an upper end 324 of the tubular section 320. As a result, the upper portion 318 of the handle 317 has a generally T-shape. The lower portion 319 of the handle 317, which is also tubular, is sized for insertion into the tubular section 320 of the upper portion 318 of the handle. With the lower portion 319 of the handle 317 inserted into the tubular section 320 of the upper portion 318 of the handle, the upper portion can move with respect to the lower portion from a first, extended position to a second, compressed position. A biasing element, such as a spring 326, is provided to bias the upper portion 318 of the handle 317 toward its first, extended position. It is understood, however, that any known biasing element 326 may be used. A flange (not shown) or other suitable retainer(s) may be provided to inhibit the lower portion 319 of the handle 317 from being pulled or otherwise withdrawn from the upper portion 318 to thereby ensure that the lower portion remains telescopically attached to the upper portion.

A lower end 328 of lower portion 319 of the handle 317 is attached to an inverted U-shaped attachment bracket 330. The manifold head 316 is pivotally attached at each of its ends 332, 334 to the attachment bracket 330 via a pair of pivot pins 336. It is contemplated that one or more stops (not shown) can be provided to limit the pivoting movement of the handle 317 relative to the manifold 316. Attached to the U-shaped attachment bracket 330 is a foot bracket 331. During use of the tool 312, the user can place one of his/her feet on the foot bracket 331 to inhibit movement of the tool during an injection.

The manifold head 316 includes at least one internal passage to distribute the termiticide to a plurality of high pressure nozzles 338 in fluid communication with the internal passage. As seen in FIG. 17, the illustrated manifold head 316 includes two main internal passages 340, 342, and a cross passage 344 connecting main internal passages. It is contemplated that the manifold head 316 may include any number of high pressure nozzles 338. For example, the manifold head 316 of the exemplary embodiment has a matrix of six high pressure nozzles 338 with each nozzle generally equidistant from each other. Each of the high pressure nozzles 338, in one embodiment, has an orifice diameter ranging from about 0.002 inch to about 0.01 inch.

With reference again to FIG. 16, a contact plate 350 is attached to a bottom surface 352 of the manifold head 316 to protect the high pressure nozzles 338. In the illustrated embodiment, the contact plate 350 includes a plurality of openings 354 with each of the openings being generally aligned with a respective one of the plurality of high pressure nozzles 338. As a result, the high pressure nozzles 338 are spaced from the soil by the contact plate 350 and therefore do not directly contact the soil. Moreover, the contact plate 50 shields or otherwise blocks soil, rocks, and/or other debris that may be "kicked-up" during the injection of the termiticide. As seen in FIG. 17, the contact plate 350 includes rounded edges to facilitate sliding (e.g., dragging) of the tool 312. The contact plate 350 can be made from any suitable material, for example, metal and/or plastic.

In this embodiment, a kick guard 398 extends outward from three sides on the contact plate 350 to further shield or otherwise block soil, rocks, and/or other debris that may be "kicked-up" during the injection of the termiticide. In the illustrated embodiment, one side of the contact plate 350 is free from the kick guard 398 to facilitate placement of the contact plate and manifold head 316 in close proximity to objects and structures. It is understood, however, that the kick guard 398 can extend around the entire periphery (i.e., all four sides) of the contact plate 350. In one suitable embodiment, the kick guard 398 is made from three pieces of suitable rubber material, which each piece of rubber material extending outward from a respective side of the contact plate 350. It is understood, however, that the kick guard 398 can have other suitable configurations (e.g., bristles, strips, flaps) and be made from any suitable material.

As illustrated in FIG. 16, a discharge valve 356 is attached to the manifold head 316 and is in fluid communication with the internal passages 340, 342, 344 in the manifold head and a supply of termiticide. The discharge valve 356 is moveable between an opened position and a closed position. When the discharge valve is in its closed position, termiticide solution is inhibited from flowing to the internal passages 340, 342, 344 in the manifold head via the high pressure inlet port 358. When the discharge valve 356 is opened, the termiticide solution flows into inlet port 358 under high pressure. From the inlet port 358, the pressurized termiticide solution flows into internal passages 340, 342, 344 of the manifold head 316 and through the high pressure nozzles 338 from which the termiticide solution is injected into the ground. In one embodiment, the termiticide solution is pressurized to a pressure of about 25 psi to about 10,000 psi, and in another embodiment, from about 1,000 psi to about 7,000 psi, and in yet another embodiment, at about 4,000 psi.

In one suitable embodiment, the discharge valve 356 is a solenoid operated poppet valve capable of sufficiently rapid operation to allow opening and closing of the discharge valve 356 within the desired time parameters to allow correct depth penetration of the soil based on the pressure in use and correct volume of termiticide solution for the specific application. While it is possible to use a hydraulically actuated valve, the size and weight constraints of such a valve may otherwise limit the utility of the handheld application tool 312.

As illustrated in FIG. 16, a trigger switch 360 (broadly, an "actuator") is mounted on the lower portion 319 of the handle 317 and a trigger switch actuator 362 is mounted on the upper portion 318. The trigger switch 360, which is electrically coupled to the discharge valve 356, activates the discharge valve 356 when the trigger switch actuator 362 engages the trigger switch 360. In the illustrated embodiment and as seen in FIG. 16, the trigger switch actuator 362 is engaged with the trigger switch when the upper portion 318 of the handle 317 is moved to its second, compressed position. Thus, the trigger switch 360 can be actuated by moving the upper portion 318 of the handle 317 from its first, expanded position to its second compressed position by applying a force on the upper portion so that it slides downward relative to the lower portion 319 of the handle until the trigger switch actuator engages the trigger switch 360.

In one suitable embodiment, a kill switch (not shown) can be located on the hand grip section 322 of the upper portion 318 of the handle 317 where it can be actuated by the operator to quickly and easily shut the system 310 off. It is contemplated that the kill switch can be located on other portions of the tool 312 besides the hand grip section 322 of the handle 317. It is also contemplated that a kill switch can be provided on the cart 314 in addition to or instead of the kill switch located on the tool 312. It is further contemplated that the kill switch can be programmed into the system (i.e., a controller) whereby if the discharge valve 356 does not open within a specified time interval it will cause a clutch to disengage from the pressure manifold and/or kill the engine.

In this embodiment, a first termiticide concentrate reservoir 384' and a dosing device 385 are mounted on the handle 317 of the tool 312. The dosing device 385 is in fluid communication with termiticide concentrate reservoir 384' and is adapted to deliver a predetermined amount (i.e., a dose) of concentrated termiticide to a suitable first mixing device 386' each time the trigger switch 360 is actuated. In one suitable embodiment, the dosing device 385 is adjustable so that the predetermined amount of concentrated termiticide can be adjusted. In another suitable embodiment, the dosing device 385 is non-adjustable. That is, the amount of concentrated termiticide delivered to the mixing device 386' each time the trigger switch 360 is actuated cannot be changed without replacement of the dosing device. One suitable dosing device 385 is available from SMC Corporation of America of Indianapolis, Ind. as part no. NCMB075-0125. In the illustrated embodiment, the mixing device 386' is mounted on top of the manifold head 316 but it is understood that the mixing device can be otherwise mounted. For example, the mixing device 386' can be mounted on the lower portion 319 of the handle 317.

With reference still to FIG. 16, a pressure accumulator 387 is mounted to the handle 317. The pressure accumulator 387 is adapted to store pressurized water (or other suitable carrier liquids) from the cart 314 prior to it being delivered to the mixing device 386'. The pressure accumulator 387 minimizes the effect of the pressure drop between the cart 314 and the mixing device 386'. Thus, the pressure accumulator 387 provides pressurized water from the cart 314 to the mixing device 386' at a higher pressure than if the pressurized water was delivered directly to the mixing device from the cart.

In the embodiment illustrated in FIG. 15, the cart 314 includes a water reservoir 380, a high pressure pump 382, a second termiticide concentrate reservoir 384, and a second mixing device 386 that is capable of supplying the appropriate amount of termiticide concentrate to be mixed with the appropriate amount of water to form the termiticide solution. A water inlet 381 for receiving water from an external water source (e.g., a standard residential water spigot) is also provided. It is contemplated that either the water reservoir 380 or the water inlet 381 can be omitted.

The supply cart 314 also includes a gasoline engine 388 with a generator 390 for generating power for operating the pressure pump 382 and generating electrical current for operating a controller 392 associated with the system 310. In another embodiment, electrical power can be supplied by connecting into an electrical outlet located at the application site. A radiator 191 is provided to cool the pressurized water being driven by the high pressure pump 382. In the illustrated embodiment, a hose reel 193 is mounted on the cart 314 for winding the hose 313 that extends between the cart 314 and the application tool 312. A pressurized water bypass 389 is provided on the handle 317 of the tool 312 for allowing pressurized water to be discharged prior to the pressure accumulator 387. The bypass 389 can be used to facilitate priming of the high pressure pump 382 and flushing termiticide solution from the hose 313.

The controller 392 permits the operator of the system 310 to selectively set a pulse duration for termiticide injections. The controller 392 may be programmable to permit the operator to enter parameters associated with a particular manifold head 316 in use, such as by defining the number of orifices and their sizes, parameters with a termiticide solution in use, such that dosing through the mixing device 386 can be properly controlled, or the number of injections can be tracked, and the like.

To inject the termiticide into the ground, the operator positions handheld portable application tool 312 such that the contact plate 350 is in contact with the surface of the ground. A downward force between about 15 to 20 pounds is applied by the operator to the upper portion 318 of the handle 317 to move the upper portion 318 from its first position to its second position and thereby cause the trigger switch actuator 362, which is mounted to the upper portion, to engage the trigger switch 360, which is mounted to the lower portion 319. Engagement of the trigger switch actuator 362 and the trigger switch 360 actuates the discharge valve 356. More specifically, an electronic signal is sent from the trigger switch 360 to the discharge valve 356 causing the discharge valve to move from its closed position to its opened position for a programmed amount of time.

In addition, movement of the upper portion 318 of the handle 317 relative to the lower portion 319 causes a predetermined amount of termiticide concentrate to be delivered by the dosing device 385 from the first termiticide concentrate reservoir 384' to the mixing device 386'. Opening the discharge valve 356 causes the pressure accumulator 387 to release at least a portion of the pressurized water stored therein to the mixing device 386'. The termiticide concentration and pressurized water mix within the mixing device 386' to form a termiticide solution. The termiticide solution is then driven to the manifold head 316 where it flows to and out the high pressure nozzles 338 for injection into the ground.

The operator then releases the pressure from the handle 317, which resets the trigger switch 360, the dosing device 385, and the pressure accumulator 387. More specifically, the spring 326 causes the upper portion 318 of the handle 317 to move back to its first, extended position. The illustrated trigger switch 360 is configured to work only once during each compression of handle 317 to prevent repeated opening of the discharge valve 356 until the handle 317 has been reset.

The depth of penetration of the termiticide solution into the ground is a function of the pressure at which the termiticide solution is discharged from the tool 312, the duration for which the discharge valve 356 remains open, and the type of soil into which the termiticide is discharged. In one suitable embodiment, the penetration of termiticide into the ground is between about 12 to 16 inches.

The second termiticide concentrate reservoir 384 and the second mixing device 386, which are mounted on the cart 314, allow the cart to be used for low pressure applications. Low pressure applications of termiticide can be carried out using the application tool 312 illustrated herein or using conventional rodding techniques. It is understood that the second termiticide concentrate reservoir 384 and the second mixing device 386 can be omitted.

Figure 18:
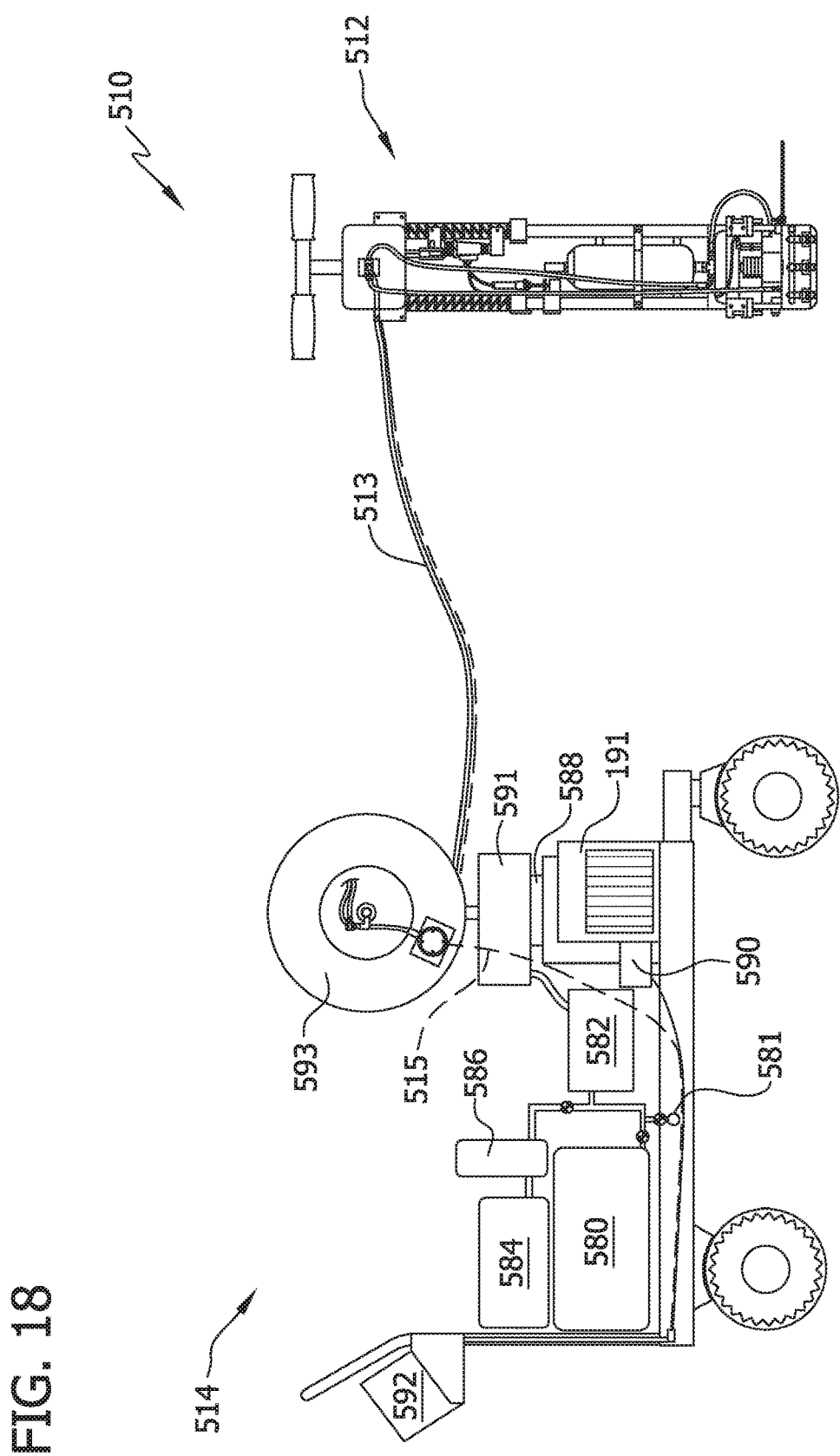
FIG. 18 is a schematic illustration of a high pressure injection system for injecting a termiticide into the ground in accordance with another exemplary embodiment in which the system includes a base unit and a handheld application tool.

Referring now to FIGS. 18-22, these Figures illustrate a high pressure injection system, indicated generally at 510, for injecting termiticide (or other suitable soil treatment) into the ground in accordance with yet another exemplary embodiment. As seen in FIG. 18, the injection system 510 includes a handheld portable application tool 512 (broadly, an "injection apparatus") and a supply cart 514 (broadly, a "base unit"). The application tool 512 is connected to the cart 514 via a conduit 513 (e.g., a hose) defining a fluid passageway and at least one electrical connection 515. The conduit 513 permits fluid (e.g., water and/or a termiticide solution) to flow from the cart 514 to the application tool 512. The electrical connection 515 is used for transmitting various control signals between the application tool 512 and the cart 514.

Figure 19:
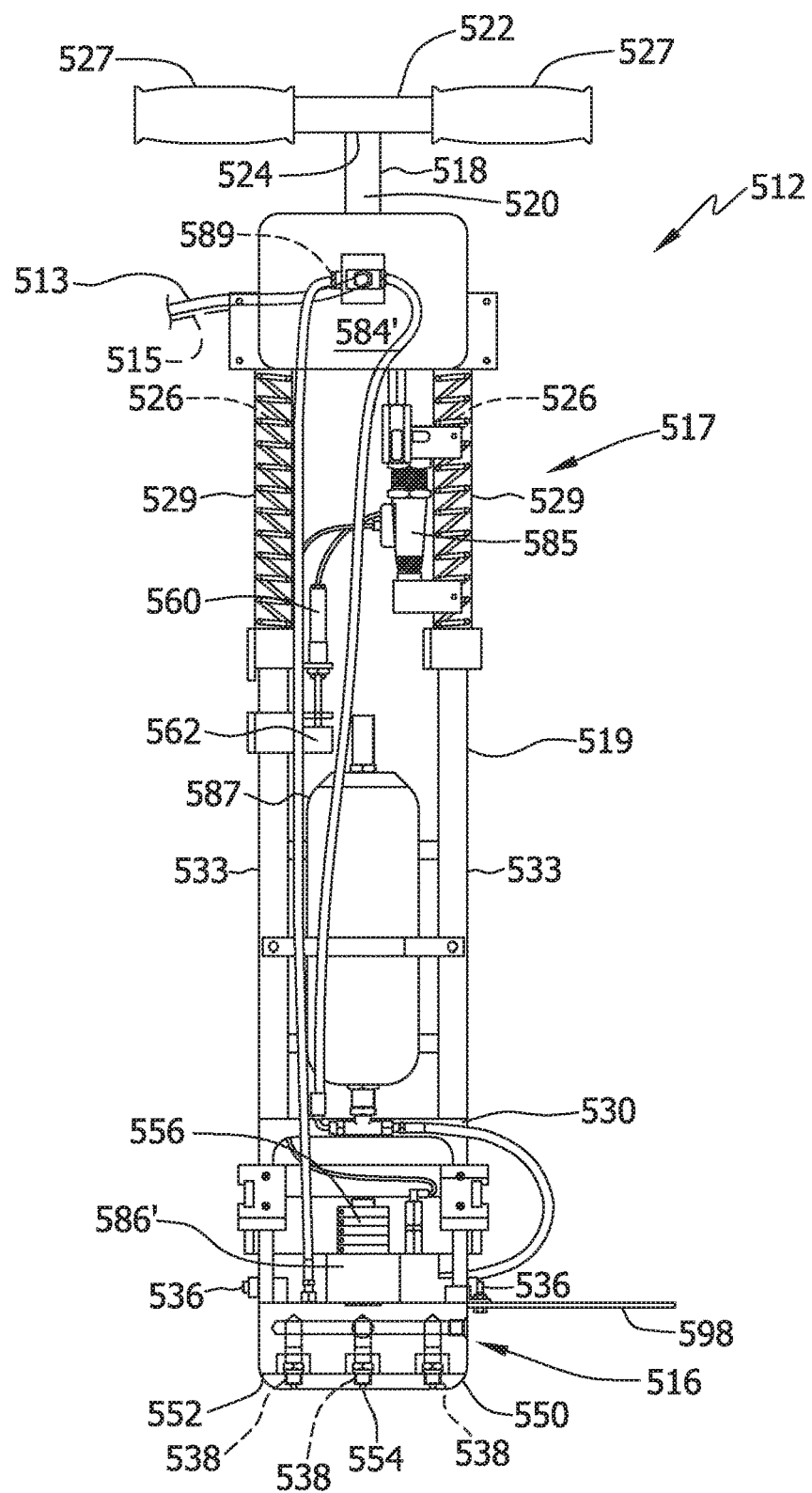
FIG. 19 is a front view schematic illustration of the handheld portable application tool of FIG. 18.
Figure 20:
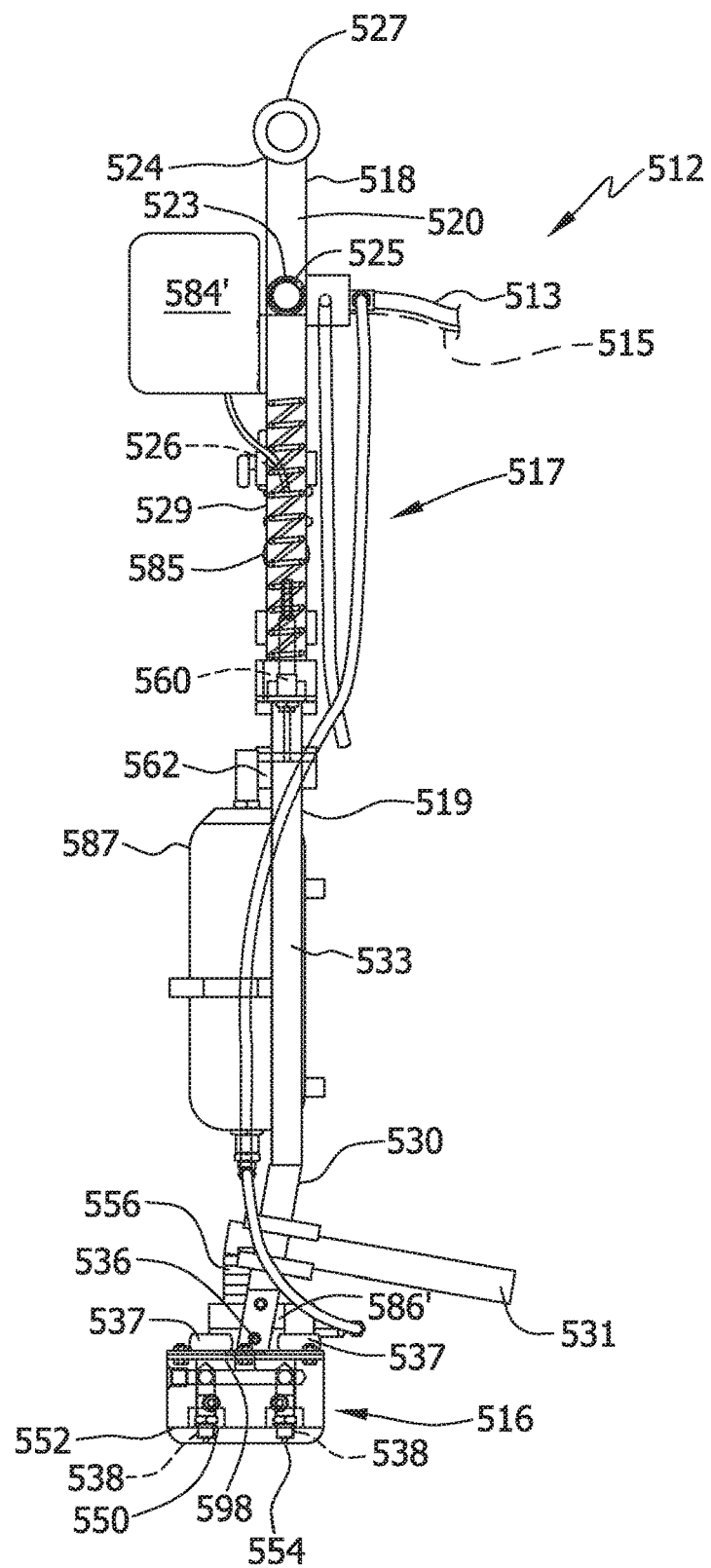
FIG. 20 is a side view schematic illustration of the handheld portable application tool of FIG. 18.
Figure 21:
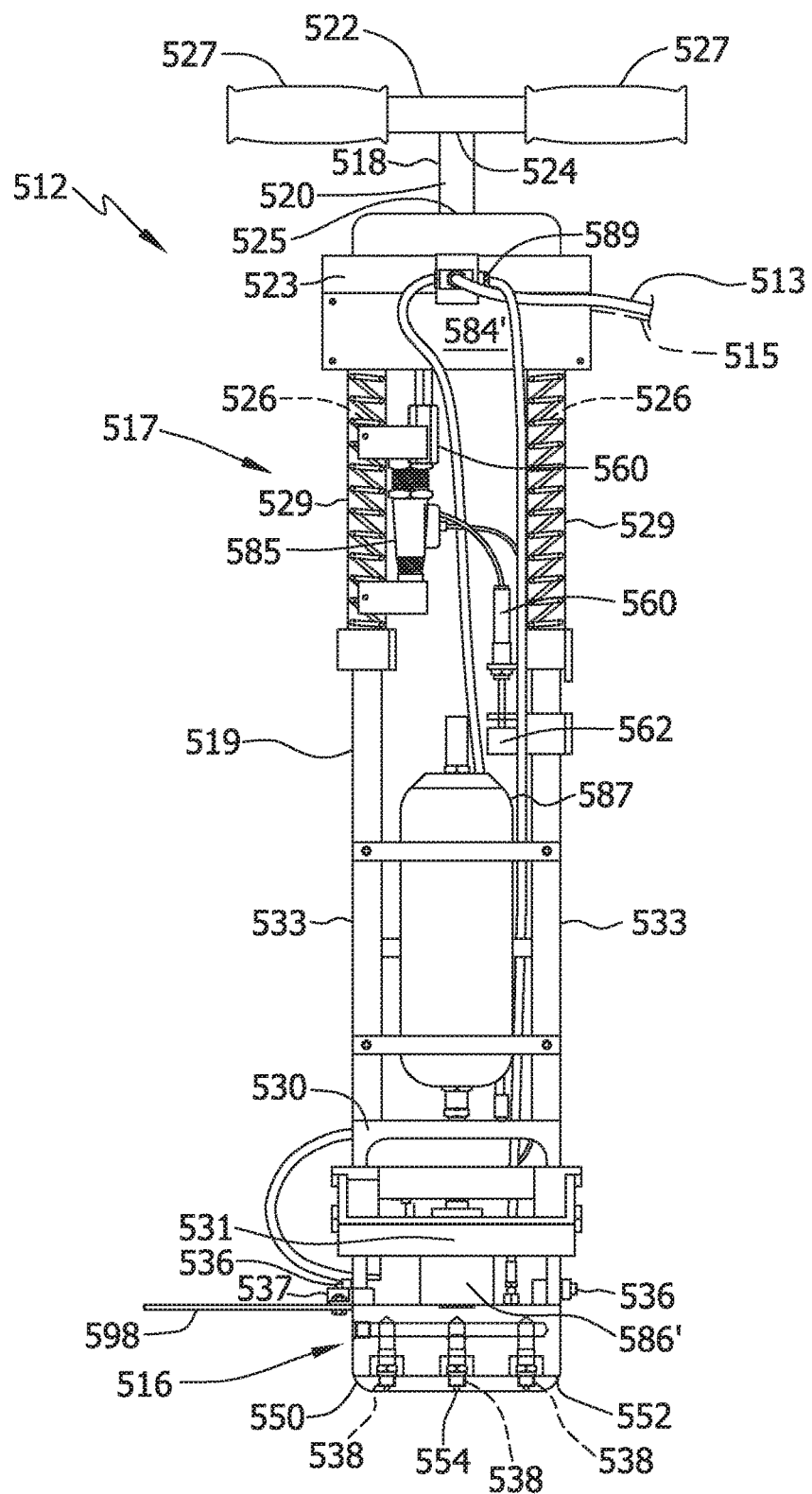
FIG. 21 is a back view schematic illustration of the handheld portable application tool of FIG. 18.

With reference now to FIGS. 19-21, the handheld portable application tool 512 includes a handle 517 and a manifold head 516 mounted to the handle. The handle 517 includes an upper portion 518 and a lower portion 519. The upper portion 518 includes a tubular section 520, a first hand grip section 522 attached to an upper end 524 of the tubular section, and a second hand grip section 523 attached to a lower end 525 of the tubular section. A pair of hand grips 527 is selectively moveable between the first hand grip section 522 and the second hand grip section 523. In the illustrated embodiment, for example, both the first hand grip section 522 and the second hand grip section 523 include a pair of thread sockets for receiving one of the hand grips 527, which are also threaded. As a result, the user can selectively move the hand grips 527 between the first hand grip section 522, which is designed to accommodated taller users, and second hand grip section 523, which is designed to accommodate shorter users. The upper portion 518 also includes two spaced-apart tubular shafts 529 extending downward from the second hand grip section 523.

The lower portion 519 of the handle 517 has two spaced-apart tubular shafts 533 configured for insertion into the tubular shafts 529 of the upper portion 518 of the handle. With the two tubular shafts 533 of the lower portion 519 inserted into the two tubular shafts 529 of the upper portion 518, the upper portion can move with respect to the lower portion from a first, extended position to a second, compressed position. It is understood that in some embodiments the upper and lower portions 518, 519 of the handle 517 can have more than two tubular shafts 529, 533. A biasing element, such as a pair of springs 526, is provided to bias the upper portion 518 of the handle 517 toward its first, extended position. In the illustrated embodiment, one spring 526 is disposed in one of the tubular shafts 529 of the upper portion 518 of the handle 517 and the other spring is disposed in the other one of the tubular shafts of the upper portion. It is understood, however, that any suitable biasing element 526 may be used. A flange (not shown) or other suitable retainer(s) may be provided to inhibit the lower portion 519 of the handle 517 from being pulled or otherwise withdrawn from the upper portion 518 to thereby ensure that the lower portion remains telescopically attached to the upper portion.

The two tubular shafts 533 of the lower portion 519 of the handle 517 are attached to an inverted U-shaped attachment bracket 530. As seen in FIG. 20, the inverted U-shaped attachment bracket 530 is angled relative to the handle 517 to facilitate placement of the manifold head 516 adjacent to and beneath structures (e.g., buildings, vegetation, fences). In the illustrated embodiment, the bracket 530 is angled about 10 degrees relative to the handle 517. It is understood, however, that the bracket 530 can be arranged at any suitable angle (e.g., any angle between about 0 degrees and about 45 degrees) relative to the handle 517. It is understood that the U-shaped attachment bracket 530 can be omitted and the manifold head 516 be attached to the two tubular shafts 533 of the lower portion 519.

In one suitable embodiment, the manifold head 516 is pivotally attached at each of its ends to the attachment bracket 530 via a pair of pivot pins 536. As a result, the handle 517 can be moved relative to manifold head 516. A pair of stops 537 is provided to limit the pivoting movement of the handle 517 relative to the manifold 516. The stops 537 inhibit the handle 517 from pivoting relative to the manifold head 516 beyond a predetermined range of motion. Suitably, the stops 537 inhibit the handle 517 from pivoting into contact with the conduit 513. Attached to the U-shaped attachment bracket 530 is a foot bracket 531. During use of the tool 512, the user can place one of his/her feet on the foot bracket 531 to inhibit movement of the tool during an injection.

The manifold head 516 includes at least one internal passage to distribute the termiticide to a plurality of high pressure nozzles 538 in fluid communication with the internal passage. It is contemplated that the manifold head 516 may include any number of high pressure nozzles 538. For example, the manifold head 516 of the illustrated exemplary embodiment has a matrix of six high pressure nozzles 538 with each nozzle generally equidistant from each other.

A contact plate 550 is attached to a bottom surface 552 of the manifold head 516 to protect the high pressure nozzles 538. In the illustrated embodiment, the contact plate 550 includes a plurality of openings 554 with each of the openings being generally aligned with a respective one of the plurality of high pressure nozzles 538. As a result, the high pressure nozzles 538 are spaced from the soil by the contact plate 550 and therefore do not directly contact the soil. Moreover, the contact plate 550 shields or otherwise blocks soil, rocks, and/or other debris that may be "kicked-up" during the injection of the termiticide. The contact plate 550 includes at least one rounded edge to facilitate sliding (e.g., dragging) of the tool 512. The contact plate 550 can be made from any suitable material, for example, metal and/or plastic.

In this embodiment, a kick guard 598 extends outward from one side (e.g. the trailing side) on the contact plate 550 to further shield or otherwise block soil, rocks, and/or other debris that may be "kicked-up" during the injection of the termiticide. More specifically, the kick guard 598 inhibits debris from being "kicked-up" by injected termiticide exiting through openings in soil created by the previous injection. Thus, the illustrated kick guard 598 is sized and shaped to generally overlie the previous injection site. In one suitable embodiment, the kick guard 598 is made from a single piece of suitable rubber material. It is understood, however, that the kick guard 598 can have other suitable configurations (e.g., bristles, strips, flaps) and be made from any suitable material.

As illustrated in FIG. 19, a discharge valve 556 is attached to the manifold head 516 and is in fluid communication with the internal passages in the manifold head and a supply of termiticide. The discharge valve 556 is moveable between an opened position and a closed position. When the discharge valve is in its closed position, termiticide solution is inhibited from flowing to the internal passages in the manifold head. When the discharge valve 556 is opened, the termiticide solution flows under high pressure into the internal passages in the manifold head and through the high pressure nozzles 538 from which the termiticide solution is injected into the ground. In one embodiment, the termiticide solution is pressurized to a pressure of about 25 psi to about 10,000 psi, and in another embodiment, from about 1,000 psi to about 7,000 psi, and in yet another embodiment, at about 4,000 psi.

In one suitable embodiment, the discharge valve 556 is a solenoid operated poppet valve capable of sufficiently rapid operation to allow opening and closing of the discharge valve 556 within the desired time parameters to allow correct depth penetration of the soil based on the pressure in use and correct volume of termiticide solution for the specific application. While it is possible to use a hydraulically actuated valve, the size and weight constraints of such a valve may otherwise limit the utility of the handheld application tool 512.

As illustrated in FIGS. 19 and 21, a trigger switch actuator 562 is mounted on the lower portion 519 of the handle 517 and a trigger switch 560 (broadly, an "actuator") is mounted on the upper portion 518 such that it faces downward toward the trigger switch actuator and is disposed between the tubular shafts 529, 533 of the upper and lower portions of the handle. The trigger switch 560, which is electrically coupled to the discharge valve 556, activates the discharge valve 556 when the trigger switch actuator 562 engages the trigger switch 560. In the illustrated embodiment, the trigger switch actuator 562 is engaged by the trigger switch when the upper portion 518 of the handle 517 is moved to its second, compressed position. Thus, the trigger switch 560 can be actuated by moving the upper portion 518 of the handle 517 from its first, expanded position to its second compressed position by applying a force on the upper portion so that it slides downward relative to the lower portion 519 of the handle until the trigger switch engages the trigger switch actuator. Mounting the trigger switch 560 on the upper portion 518 of the handle 517, such that it faces downward and is disposed between the tubular shafts 529 of the upper portion, inhibits inadvertent actuation of the trigger switch 560.

In this embodiment, a first termiticide concentrate reservoir 584' and a dosing device 585 are mounted on the handle 517 of the tool 512. As seen in FIG. 19, the first termiticide concentrate reservoir 584' is mounted to each of the tubular shafts 529 of the upper portion 518 of the handle such that the first termiticide concentrate reservoir is generally aligned along a longitudinal axis of the tool 512. As a result, the weight of the first termiticide concentrate reservoir 584' is distributed generally equally between the two tubular shafts 529 of the upper portion 518. As also seen in FIG. 19, the dosing device 585 is mounted to the lower portion 519 of the handle 517 such that it is disposed between the two tubular shafts 533 of the lower portion. As a result, the tubular shafts 533 of the lower portion 519 of the handle 517 provide some protection for or shielding of the dosing device 585.

The dosing device 585 is in fluid communication with termiticide concentrate reservoir 584' and is adapted to deliver a predetermined amount (i.e., a dose) of concentrated termiticide to a suitable first mixing device 586' each time the trigger switch 560 is actuated. In one suitable embodiment, the dosing device 585 is adjustable so that the predetermined amount of concentrated termiticide can be adjusted. In another suitable embodiment, the dosing device 585 is non-adjustable. That is, the amount of concentrated termiticide delivered to the mixing device 586' each time the trigger switch 560 is actuated cannot be changed without replacement of the dosing device. One suitable dosing device 585 is available from SMC Corporation of America of Indianapolis, Ind. as part no. NCMB075-0125. In the illustrated embodiment, the mixing device 586' is mounted on top of the manifold head 516 but it is understood that the mixing device can be otherwise mounted. For example, the mixing device 586' can be mounted on the lower portion 519 of the handle 517.

A pressure accumulator 587 is mounted to the handle 517. More specifically, the pressure accumulator 587 is mounted between the two tubular shafts 533 of the lower portion 519 of the handle 517 such that the pressure accumulator is generally aligned along a longitudinal axis of the tool 512. As a result, the weight of the pressure accumulator is distributed generally equally between the two tubular shafts 533 of the lower portion 519. The pressure accumulator 587 is adapted to store pressurized water (or other suitable carrier liquids) from the cart 514 prior to it being delivered to the mixing device 586'. The pressure accumulator 587 minimizes the effect of the pressure drop between the cart 514 and the mixing device 586'. Thus, the pressure accumulator 587 provides pressurized water from the cart 514 to the mixing device 586' at a higher pressure than if the pressurized water was delivered directly to the mixing device from the cart.

In the embodiment illustrated in FIG. 18, the cart 514 includes a water reservoir 580, a high pressure pump 582, a second termiticide concentrate reservoir 584, and a second mixing device 586 that is capable of supplying an appropriate amount of termiticide concentrate to be mixed with an appropriate amount of water to form the termiticide solution. A water inlet 581 for receiving water from an external water source (e.g., a standard residential water spigot) is also provided. It is contemplated that either the water reservoir 580 or the water inlet 581 can be omitted.

The supply cart 514 also includes a gasoline engine 588 with a generator 590 for generating power for operating the pressure pump 582 and generating electrical current for operating a controller 592 associated with the system 510. In another embodiment, electrical power can be supplied by connecting into an electrical outlet located at the application site. A clutch mechanism 591 is provided to disengage the high pressure pump 582 between injections (or after a predetermined time interval) and thereby inhibit the water being driven by the high pressure pump from being heated. In the illustrated embodiment, a hose reel 593 is mounted on the cart 514 for winding the conduit 513 that extends between the cart 514 and the application tool 512. A pressurized water bypass 589 is provided on the handle 517 of the tool 512 for allowing pressurized water to be discharged prior to the pressure accumulator 587. The bypass 589 can be used to facilitate priming of the high pressure pump 582 and flushing termiticide solution from the conduit 513. In one suitable embodiment, the bypass 589 is fluidly connected to the manifold head 516 for allowing liquid (e.g., water, termiticide solution), gases (e.g., air) or the combination of the two passing through the bypass to be discharged beneath the manifold head.

Figure 22:
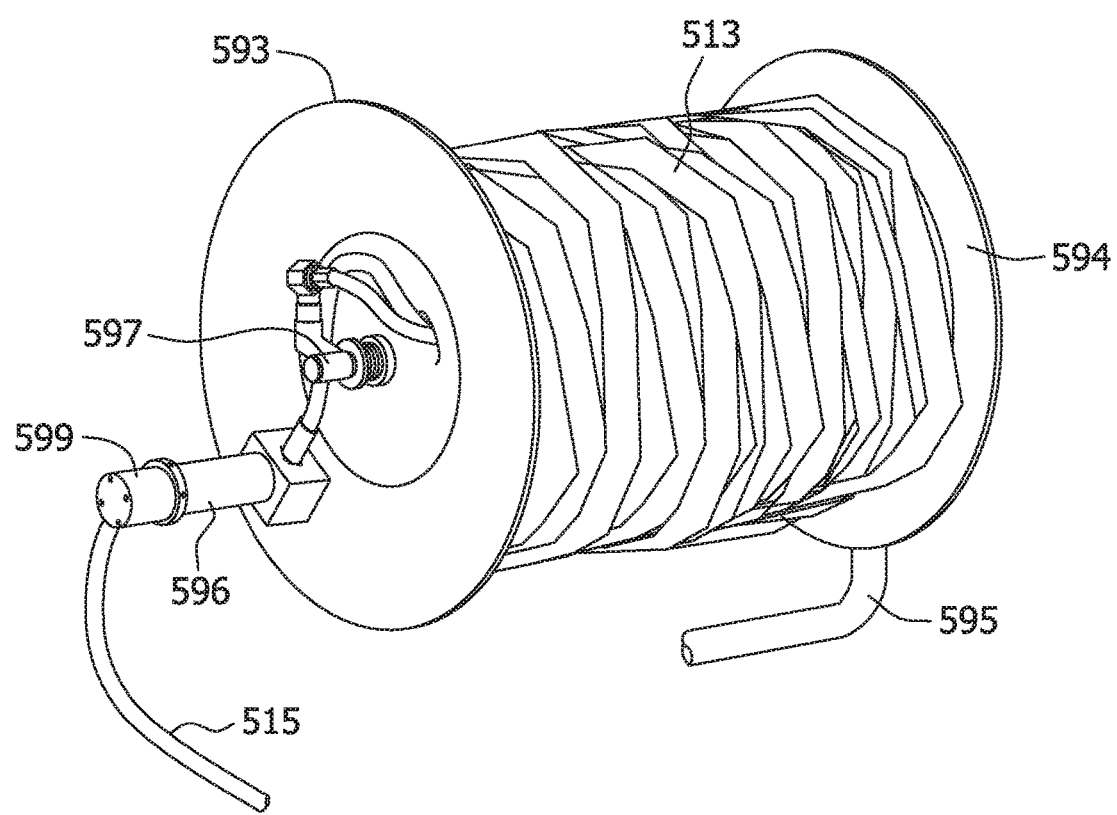
FIG. 22 is an enlarged perspective schematic illustration of a hose reel removed from the base unit of FIG. 18.
Figure 23:
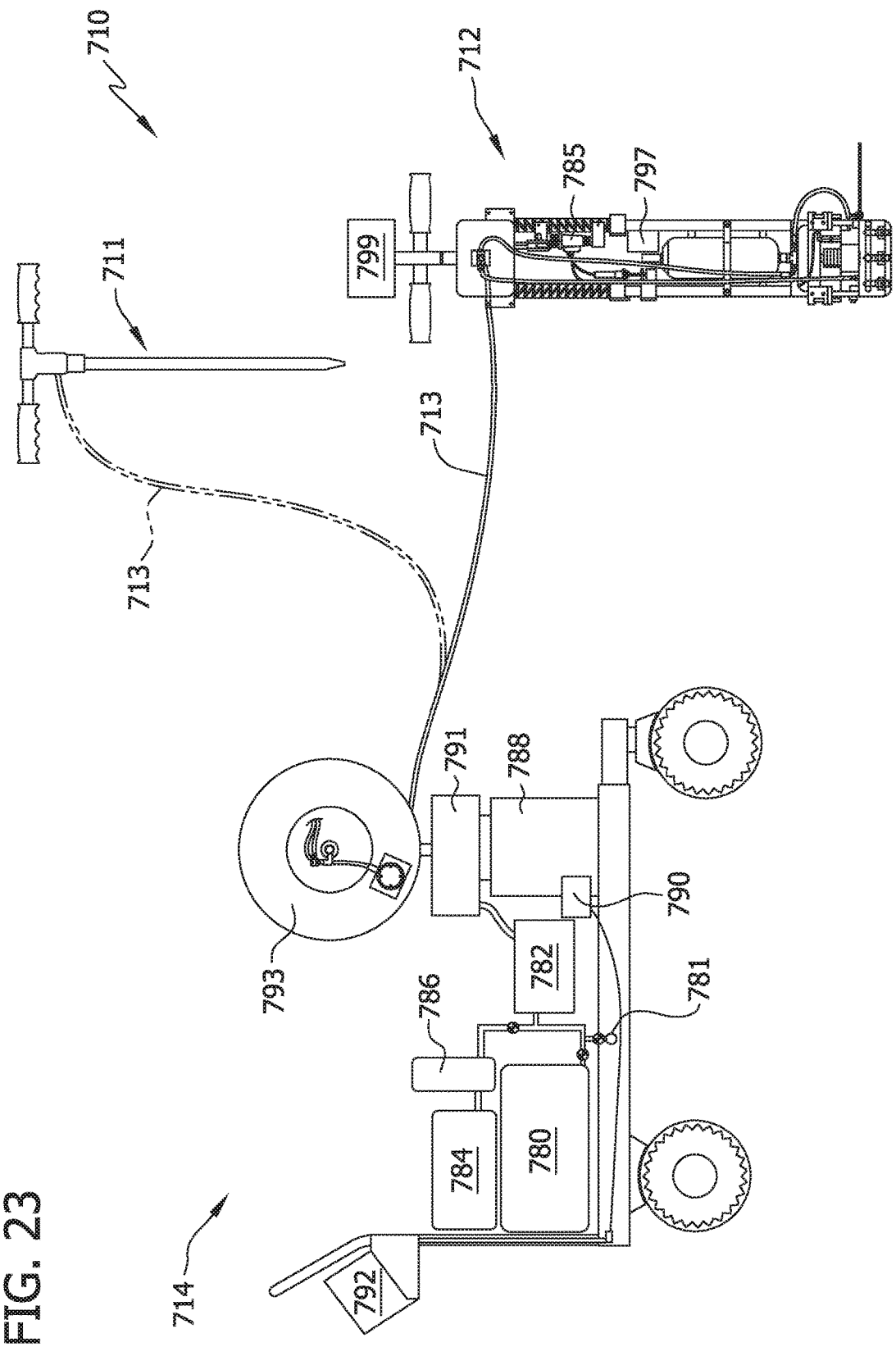
FIG. 23 is a schematic illustration of another exemplary embodiment of an apparatus for applying a soil treatment beneath the surface of the ground in which the apparatus includes a base unit, a handheld portable high pressure application tool, and a handheld portable low pressure application tool.
Figure 24:
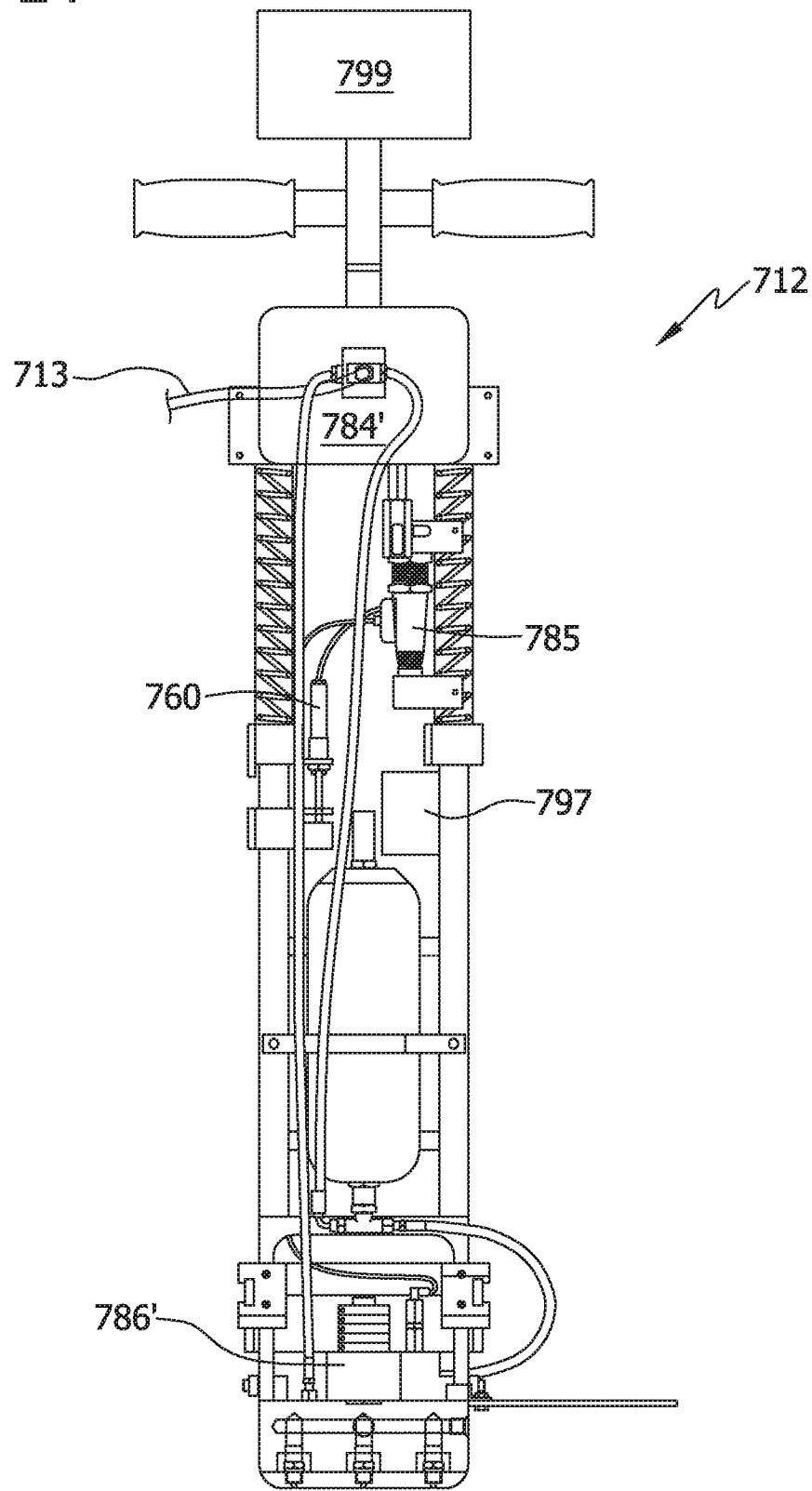
FIG. 24 is a front view schematic illustration of the high pressure application tool of FIG. 23.
Figure 25:
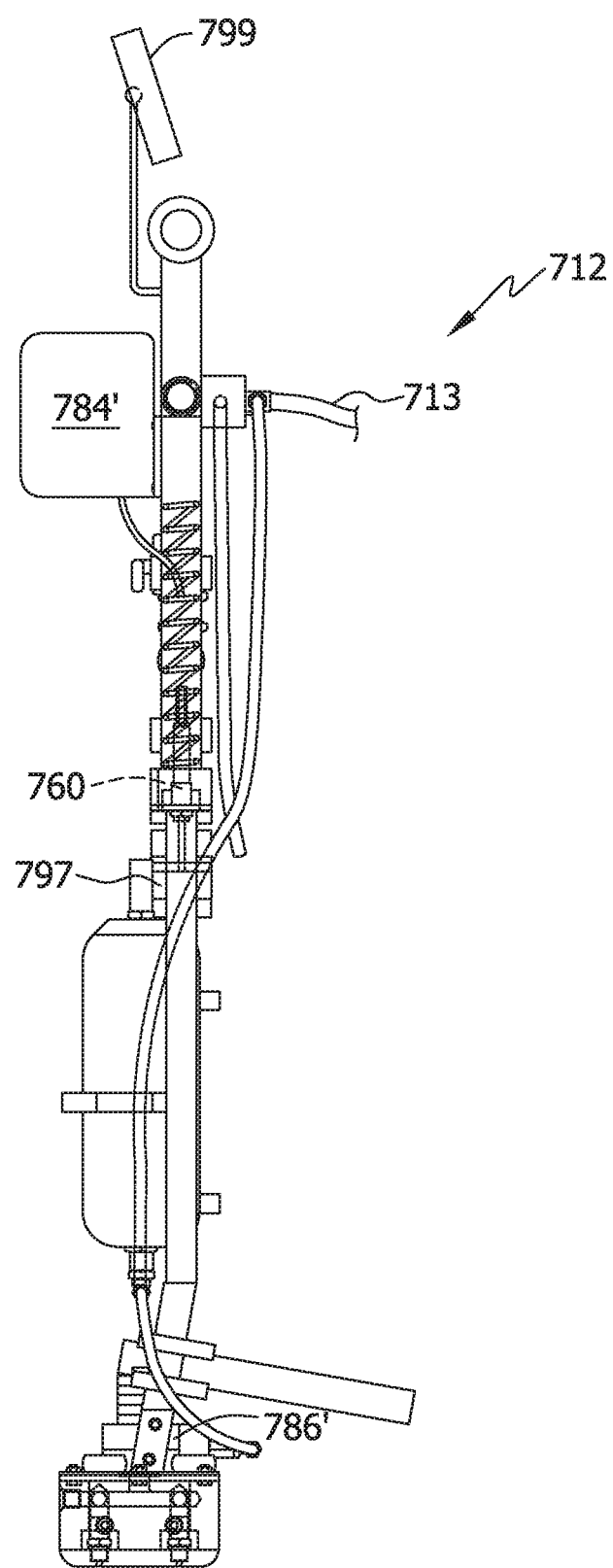
FIG. 25 is a side view schematic illustration of the high pressure application tool of FIG. 23.
Figure 26:
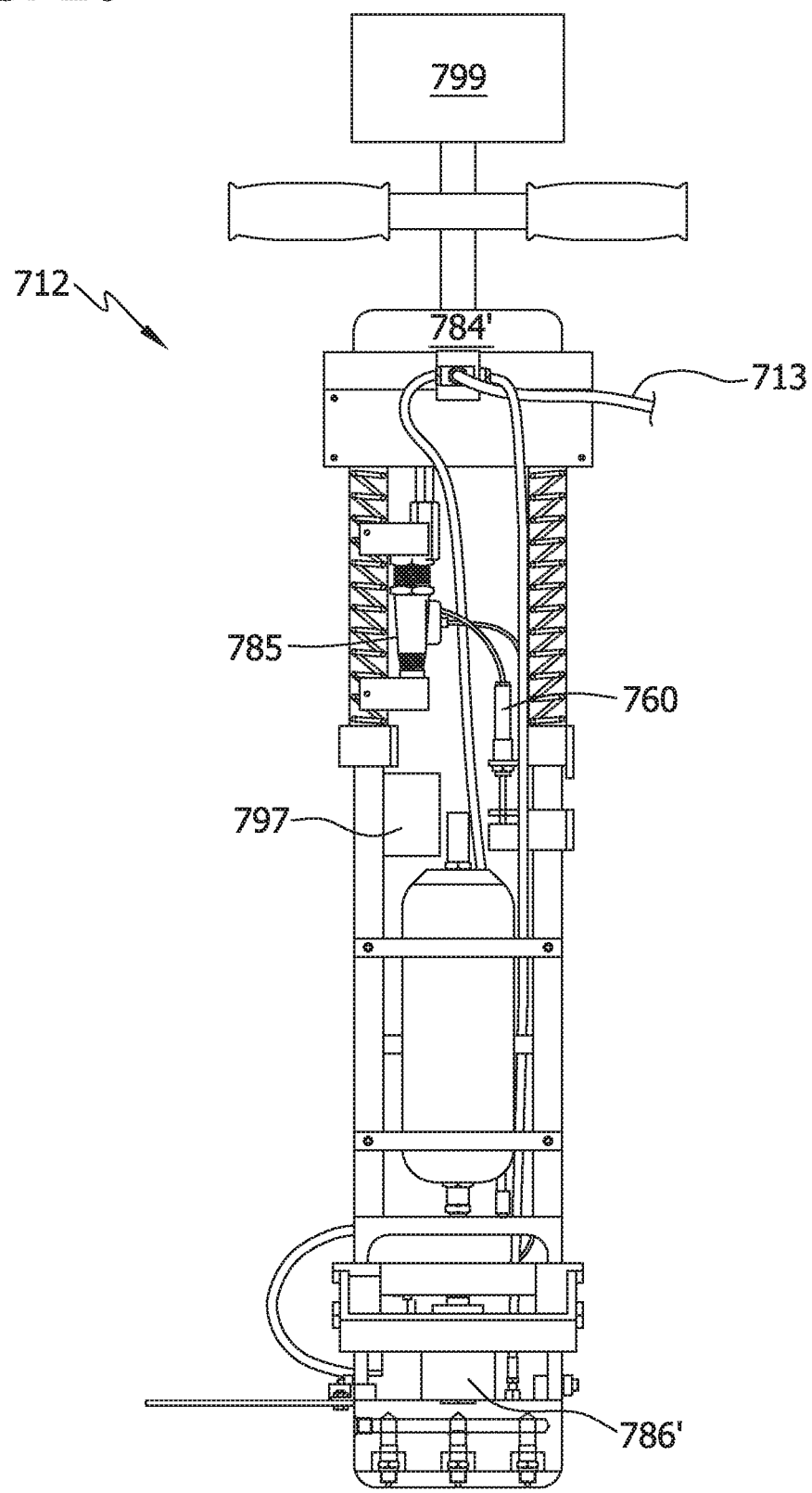
FIG. 26 is a back view schematic illustration of the high pressure application tool of FIG. 23.

As seen in FIG. 22, the hose reel 593 includes a spool 594, a mounting bracket 595 for mounting the spool to the supply cart 514, and a handle 596 for manually rotating the spool relative to the mounting bracket. Thus, the spool 594 can be selectively rotated relative to the mounting bracket 595 using the handle 596 to wind and unwind the conduit 513 about the spool. Water from the water reservoir 580 and/or the external water source is fed to the conduit 513 through a rotary coupling 597. The rotary coupling 597 allows the spool 594 and thereby the conduit 513 wrapped about the spool to rotate relative to an inlet line (not shown) connecting the rotary coupling 597 to the water reservoir 580 and/or the external water source. The rotary coupling 597 inhibits twisting of the inlet line. With reference still to FIG. 22, the handle 596 includes a rotary electrical connector 599 at its free end for feeding the electrical connection 515 to the conduit 513 wound about the spool 594. The rotary electrical connector 599 inhibits the electrical connection 515 for being twisted as the conduit 513 is wound and unwound about the spool 594.

With reference again to FIG. 18, the controller 592 permits the operator of the system 510 to selectively set a pulse duration and pressure level for termiticide injections. In other embodiments, the controller 592 may permit the operator selectively set a pulse duration, while the pressure is manually set by adjusting a pressure valve (not shown). The controller 592 may be programmable to permit the operator to enter parameters associated with a particular manifold head 516 in use, such as by defining the number of orifices and their sizes, parameters with a termiticide solution in use, such that dosing through the mixing device 586 can be properly controlled, or the number of injections can be tracked, and the like. It is understood that the controller 592 can be mounted on the tool 512 in addition to or instead of the controller mounted on the cart 514.

To inject the termiticide into the ground, the operator positions handheld portable application tool 512 such that the contact plate 550 is in contact with the surface of the ground. A downward force between about 15 to 20 pounds is applied by the operator to the upper portion 518 of the handle 517 to move the upper portion 518 from its first position to its second position and thereby cause the trigger switch 560, which is mounted to the upper portion, to engage the trigger switch actuator 562, which is mounted to the lower portion 519. Engagement of the trigger switch actuator 562 and the trigger switch 560 actuates the discharge valve 556. More specifically, an electronic signal is sent from the trigger switch 560 to the discharge valve 556 causing the discharge valve to move from its closed position to its opened position for a predetermined amount of time.

In addition, movement of the upper portion 518 of the handle 517 relative to the lower portion 519 causes a predetermined amount of termiticide concentrate to be delivered by the dosing device 585 from the first termiticide concentrate reservoir 584' to the mixing device 586'. Opening the discharge valve 556 causes the pressure accumulator 587 to release at least a portion of the pressurized water stored therein to the mixing device 586'. The termiticide concentration and pressurized water mix within the mixing device 586' to form a termiticide solution. The termiticide solution is then driven to the manifold head 516 where it flows to and out the high pressure nozzles 538 for injection into the ground.

The operator then releases the pressure from the handle 517, which resets the trigger switch 560, the dosing device 585, and the pressure accumulator 587. More specifically, the springs 526 cause the upper portion 518 of the handle 517 to move back to its first, extended position. The illustrated trigger switch 560 is configured to work only once during each compression of the handle 517 to prevent repeated opening of the discharge valve 556 until the handle 517 has been reset.

The depth of penetration of the termiticide solution into the ground is a function of the pressure at which the termiticide solution is discharged from the tool 512, the duration for which the discharge valve 556 remains open, and the type of soil into which the termiticide is discharged.

In one suitable embodiment, the penetration of termiticide into the ground is between about 12 to 16 inches.

The second termiticide concentrate reservoir 584 and the second mixing device 586, which are mounted on the cart 514, allow the cart to be used for low pressure applications. Low pressure applications of termiticide can be carried out using the application tool 512 illustrated herein or using conventional rodding techniques. It is understood that in some embodiments the second termiticide concentrate reservoir 584 and the second mixing device 586 can be omitted.

FIGS. 23-27 illustrate one embodiment of an apparatus 710 for applying a soil treatment, such as any of the soil treatments described previously herein, beneath the surface of the ground. The apparatus 710 generally comprises a base unit in the form of a supply cart 714, a handheld portable high pressure application tool 712 and a handheld portable low pressure application tool 711. In one embodiment, the supply cart 714 is substantially similar to the supply cart 514 of the embodiment illustrated in FIGS. 18-22 and described previously herein. In particular, the supply cart 714 of this embodiment functions as a fluid delivery device and includes the water reservoir 780, pressure pump 782, second termiticide concentrate reservoir 784, water inlet 781, gasoline engine 788 with generator 790 for operating the pressure pump 782, and clutch mechanism 791 all operable in the manner described previously in connection with the similar components of the supply cart 514. The radiator 191 of the previous embodiments is omitted from this embodiment since the clutch mechanism 791 is sufficient to inhibit over heating due to pressurized water driven by the high pressure pump 782.

Figure 27:
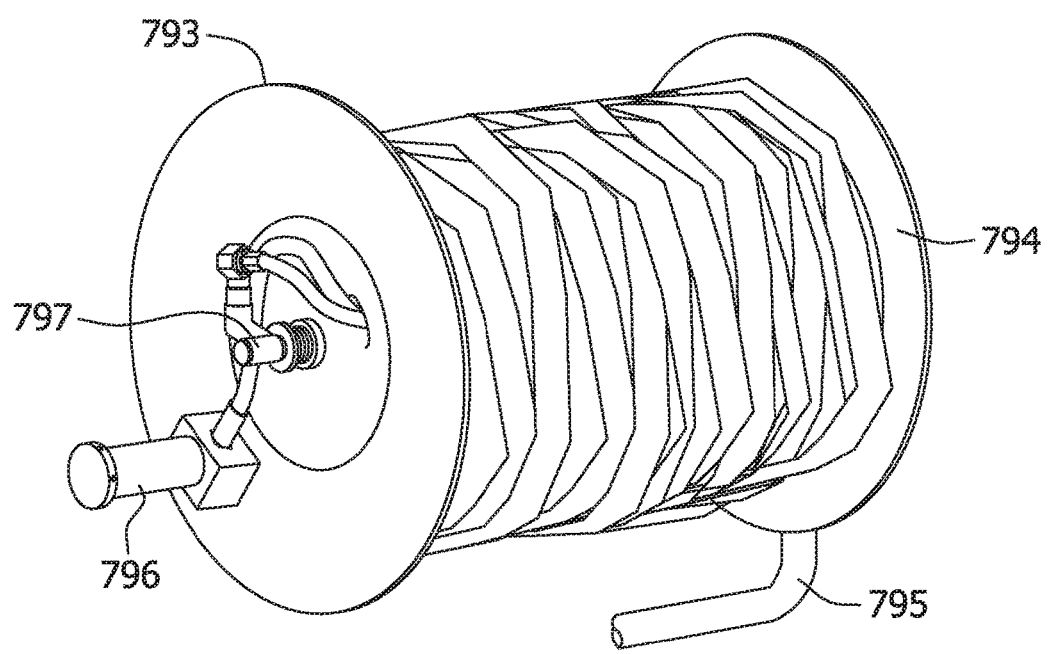
FIG. 27 is an enlarged perspective schematic illustration of a hose reel removed from the base unit of FIG. 23.

The high pressure application tool 712 is in fluid communication with the supply cart 714 via a conduit 713 (e.g., a hose supported by a hose reel 793 including a spool 794, mounting bracket 795 and handle 796 as shown in FIG. 27) that permits fluid (e.g., water and/or a termiticide solution from the mixing device 786') to flow from the cart 714 to the high pressure application tool. In this embodiment, however, the conduit 714 does not include a wired electrical connection to the high pressure application tool 712. Rather, the high pressure application tool 712 is battery powered by a suitable rechargeable battery 797. In one embodiment, the battery 797 is removable from the application tool 712 for recharging. In other embodiments, the battery 797 may be charged while remaining on the application tool 712. A suitable power switch (not shown) is provided on the high pressure application tool 712 in electrical communication with the battery 797 for use in shutting down the battery for turning on and off the application tool. It is understood, however, that an electrical cable or other wired electrical connection may electrically connect the high pressure application tool 712 with the supply cart 714 and remain within the scope of this disclosure.

In one suitable embodiment, the handheld, portable high pressure application tool 712 is otherwise constructed similar to the application tool 512 of the embodiment of FIGS. 18-22 so as to be moveable (and thus positionable) relative to the supply cart 714 (i.e., relative to the base unit). The conduit 713 includes a quick connect (not shown) for releasable connection with the high pressure application tool 712 to permit selective connection and disconnection of the high pressure application tool from the supply cart 714. A pressure relief valve, not shown, is provided on the high pressure application tool 712 to bleed off pressure in the tool prior to disconnecting the conduit 713 from the high pressure application tool. It is understood that in other embodiments a high pressure application tool identical to that of the embodiment of FIGS. 18-22 may be used, or any of the application tools illustrated in FIGS. 1-17 may be used, or any combination of components thereof may be used, or another suitable high pressure application tool may be used without departing from the scope of this disclosure.

The high pressure application tool 712 of this embodiment also uses a dosing device 785 similar to the dosing device 585 of the previous embodiment and in fluid communication with the termiticide concentrate reservoir 584' to deliver a predetermined amount (i.e., a dose or dosing volume) of concentrated termiticide (broadly referred to as an active ingredient) to the first mixing device 786' each time the trigger switch 760 is actuated. In one suitable embodiment, the dosing device 785 is adjustable so that the predetermined amount of concentrated termiticide (i.e., the dosing volume) can be adjusted. In another suitable embodiment, the dosing device 785 is non-adjustable. That is, the amount of concentrated termiticide delivered to the mixing device 786' each time the trigger switch 760 is actuated cannot be changed without replacement of the dosing device. In this manner, the predetermined dosing volume is independent of the pressure of the carrier liquid (e.g., water) used for each injection of the high pressure application tool 712, and independent of how much water is used per injection. Rather, the dosing volume is based solely on the injection event itself.

With reference back to FIG. 23, the low pressure application tool 711 in accordance with one embodiment comprises a conventional rodding tool. The rodding tool 711 is configured for fluid communication with the supply cart 714 via the conduit 713 in the low pressure mode of the apparatus 710. More suitably, the rodding tool 711 is configured for releasable connection with the conduit 713, such as using the quick connect (not shown) on the conduit. In this manner, the rodding tool 713 is readily and selectively interchangeable with the high pressure application tool 712 upon switching operation of the apparatus 710 between the high pressure mode and the low pressure mode. It also understood that the low pressure application tool 711 may be other than a rodding tool, such as a wand, a trenching device, sprayer or any other portable, handheld tool that can receive a low pressure flow of soil treatment and direct the soil treatment through an outlet into the soil—such as by pushing the tool down into the soil or by pre-digging holes or trenches into the ground and then lowering the tool therein before dispensing the soil treatment—or dispensing the soil treatment onto the soil surface.

In the exemplary embodiment, only one of the low pressure application tool 711 and the high pressure application tool 712 is connected to the conduit 713 at a time. Thus, the low pressure application tool is inoperable when the high pressure application tool is operating and the high pressure application tool is inoperable when the low pressure application tool is operating. Additionally, the apparatus 710 is inoperable in the high pressure mode when the low pressure application tool 711 is connected to the supply cart 714.

In this embodiment, the second mixing device 786 on the supply cart 714 comprises a suitable peristaltic pump operable to deliver active ingredient (e.g., concentrated termiticide in the illustrated embodiment) from the concentrate reservoir 784 for admixture with the carrier liquid (e.g., water) from the pressure pump 782 at low pressure before delivery to the low pressure application tool 711. The construction and operation of a peristaltic pump is conventionally known and thus not described in further detail herein except to the extent necessary to make the present disclosure. The peristaltic pump 786 is suitably operable to deliver the concentrated termiticide from the reservoir 784 based on a predetermined mixture ratio as a function of the rate of delivery of concentrated termiticide to a flow rate of carrier liquid (e.g., water) delivered by the pressure pump 782.

In a particularly suitable embodiment, the rate at which the peristaltic pump 786 operates (e.g., revolutions per minute) may be adjustable to accommodate different carrier liquid flow rates delivered from the pressure pump 782. This allows the mixture ratio of the active ingredient to carrier liquid to remain at a desired or predetermined mixture ratio irrespective of whether the flow rate changes during operation, or is different from one treatment to the next. More suitably, the operating rate of the pump 786 may be automatically adjustable, such as by a suitable controller (not shown) that automatically adjusts the operating rate of the pump as a function of a signal indicative of the carrier liquid flow rate during treatment in the low pressure mode of the apparatus 710. The carrier liquid flow rate is suitably monitored by a flow meter (not shown) located upstream of where the carrier liquid admixes with the active ingredient. A flow cell (also not shown) disposed on the line downstream of the pump 786 but upstream of the location at which active ingredient admixes with the carrier liquid monitors the presence of active ingredient flowing there through to provide confirmation that the active ingredient is still flowing during operation.

In operation according to one embodiment of a method for applying soil treatment to soil, and in particular applying the soil treatment beneath the surface of the ground, the apparatus 710 may be operated in the high pressure mode in accordance with a first treatment along a first area of a work site to be treated, and then operated in the low pressure mode in accordance with a second treatment along a second area of the work site, different from the first area of the work site. For example, where a work site is a residential property in which the treatment is to be applied about the perimeter of a home, a first area of the perimeter (either a continuous segment of the perimeter, or multiple discrete segments of the perimeter) may be composed of a soil that is suitable for using the high pressure mode of the apparatus 710, while another area (a second area) of the perimeter (continuous, or multiple discrete segments) may not be suitable for using the high pressure mode of the apparatus and thus the low pressure mode of the apparatus must be used to apply the soil treatment. It is understood, however, that a single treatment may comprise operation of the apparatus 710 only in the high pressure mode, or only in the low pressure mode, and remain within the scope of this disclosure.

It is also contemplated that in other embodiments the second work area in which the low pressure mode is used may overlap all or part of the first work area in which the high pressure mode is used. For example, where soil treatment into the soil to a depth of the footer or basement (e.g., beyond the 12-16 inch depth to which the soil treatment may be injected in the high pressure mode of the apparatus 710), the high pressure mode application is applied to the first area to cover the upper 12-16 inches of soil, and the low pressure mode application is applied to the second area overlapping the first area. In particular, such a low pressure mode application may include inserting an application tool, such as the rodding tool 711, down into the soil to deliver soil treatment below the injected depth (e.g., 12-16 inches) down to the footer or basement. The application tool may be intermittently inserted into the ground at spaced apart locations along the entire perimeter of the footer or basement.

With reference again to FIG. 23, in this embodiment a dual control system, comprising a first (e.g., base unit, or supply cart) control system 792 disposed on the supply cart 714 and a second (e.g., application tool) control system 799 disposed on the high pressure application tool 712, is employed to control the overall operation of the apparatus 710 and to provide the operator with some control over the operation while using the high pressure application tool remote from the supply cart. The supply cart control system 792 suitably comprises at least a controller, such as a microcontroller, and a display unit, with user interface, used by the operator to select various operating aspects of the apparatus. The application tool control system 799 also includes a controller, such as a microcontroller, and a display unit with associated user interface. In the illustrated embodiment, the supply cart control system 792 and the application tool control system 799 communicate with each other via wireless communication—and in particular by a pair of transceivers, each being disposed on a respective one of the supply cart 714 and the high pressure application tool 712. It is understood, however, that in other embodiments the control systems 792, 799 may communicate by wired connection, such as by a cable or other suitable connection extending from the supply cart 714 to the high pressure application tool 712.

Figure 28:
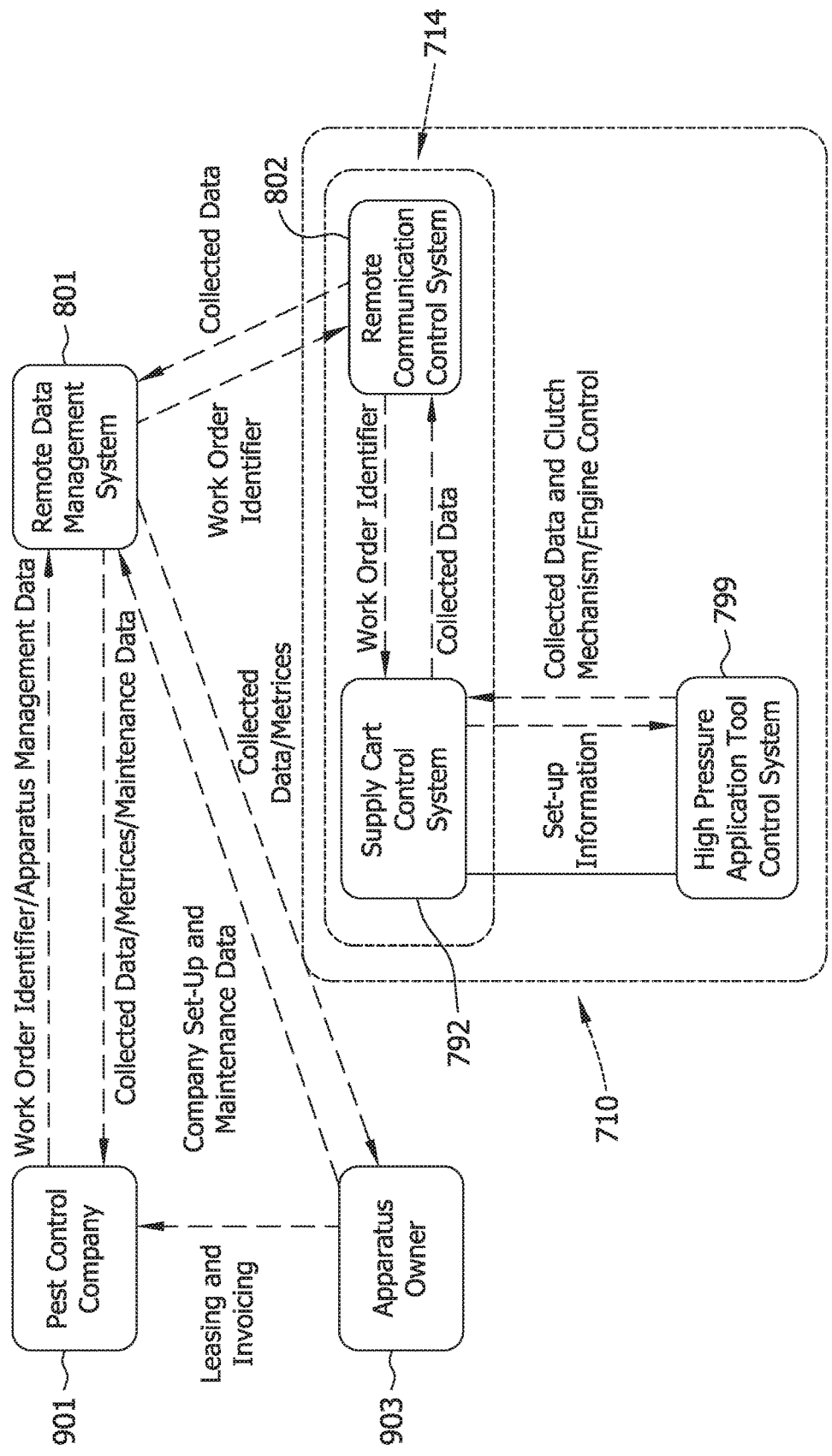
FIG. 28 is a schematic illustration of a data management system, control systems and communication capabilities using the apparatus of FIG. 23.

With reference to FIG. 28, the apparatus 710, and more particularly the supply cart control system 792 and the application tool control system 799, in accordance with one embodiment, are suitably configured to operate along with, e.g., via wireless communication with, a remote data management system 801 such as a website, a remote computer or other suitable system capable of transmitting and receiving data or other information to and from the supply cart control system 792 and/or the application tool control system 799. For example, in the illustrated embodiment of FIG. 28 the supply cart 714 further comprises a remote communication control system 802 (shown schematically in FIG. 28) carried on board the supply cart, and more suitably within the housing or control box that houses the supply cart control system 792, and including at least a second transceiver and a related controller configured for communication with the remote data management system 801. The remote communication control system 802 is also configured for communication with the supply cart control system 792, suitably by wired connection although it may alternatively be by wireless connection, to allow the transfer of data therebetween.

In a more particular example, the remote data management system 801 may be located at, or accessible by (e.g., in the form of an accessible website), a pest control company 901 having multiple field operators that transport a respective apparatus 710 to customer locations to apply a soil treatment at the customer locations. The pest control company 901 can download data to each apparatus 710 using the communication between the remote data management system 801 and the remote communication control system 802 on the supply cart 714, and can receive data collected during operation of the apparatus 710 at each of the customer locations. For example, the pest control company 901 can transmit data to the remote communication control system 802, such as a work order identifier and physical address of the different work sites at which the treatment is to occur. The remote communication control system 802 then communicates the information to the supply cart control system 792 for use in performing the desired treatment at the customer work site. Upon completion of the treatment, data collected during the treatment process is communicated by the supply cart control system 792 to the remote communication control system 802, where the data is then transmitted to the remote data management system 801.

Of course, it is understood that in other embodiments the apparatus 710 may operate independent of or entirely without the remote data management system 801 and remain within the scope of this disclosure. It is also contemplated that the remote communication control system 802 may be omitted, such that the remote data management system 801 communicates (e.g., by wireless communication) directly with the apparatus 710, such as the supply cart control system 792 and/or the application tool control system 799.

It is also contemplated that in some embodiments the remote data management system 801 may be configured to receive data collected by the supply cart control system 792 and/or the application tool control system 799 other by wireless communication. For example, the remote data management system 801 may be hardwire connected to the injection apparatus control system 792 and/or application tool control system 799 (or, in other embodiments, to the remote communication control system 802) for transferring the collected data to the data management system, or it may be configured for releasable hardware connection, such as by a USB cable or other data transfer cable to the supply cart control system 792, application tool control system 799 and/or remote communications control system 802 for transferring the collected data to the data management system, or it may be configured for receiving a transportable data storage media, such as a USB drive, compact disc or other transportable data storage media containing the collected data.

The display unit of the supply cart control system 792 is configured to provide a visual display of the various parameters to be selected by the operator prior to operation of the apparatus 710. With reference to FIGS. 29-47, the illustrated display unit has a display screen 803 and a plurality of push buttons 805 (best shown, for example in FIG. 32) spaced from each other along the lower edge of the screen so as to be accessible to the operator for use in controlling the display on the screen and for making desired selections of the operating parameters of the apparatus. In other embodiments, the display screen 803 may alternatively comprise a touchscreen display in which control of the display and selection of operating parameters is done by directly touching the screen. In the illustrated embodiment, one or more of the operating parameters of the apparatus 710 is received from the remote data management system 801. In embodiments where the supply cart control system 792 and the application tool control system 799 operate entirely independent of the remote data management system 801, data needed for operating the supply cart control system may be input manually.

Figure 29:
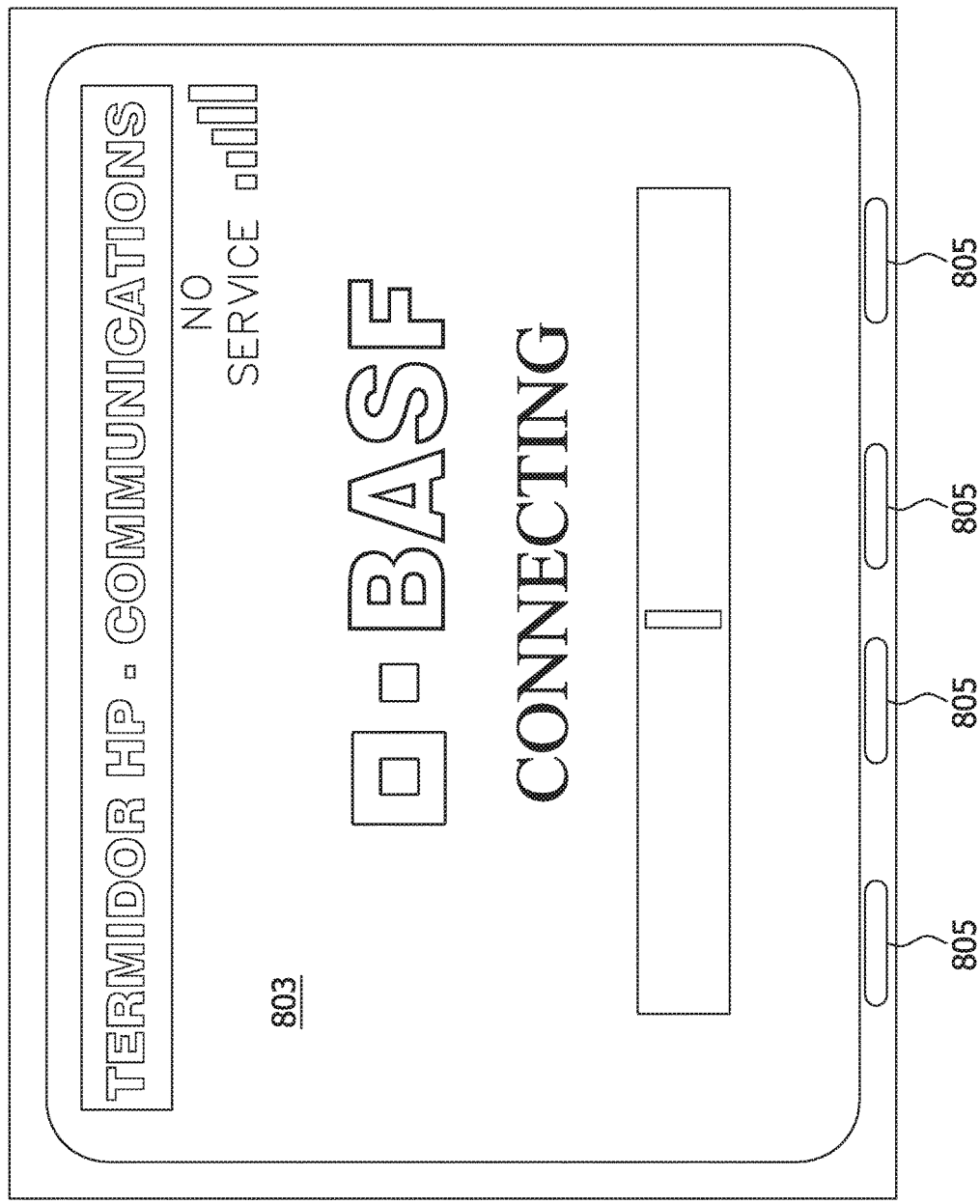
FIGS. 29-47 are screen shots from a display unit of a base unit control system for the apparatus of FIG. 23.
Figure 30:
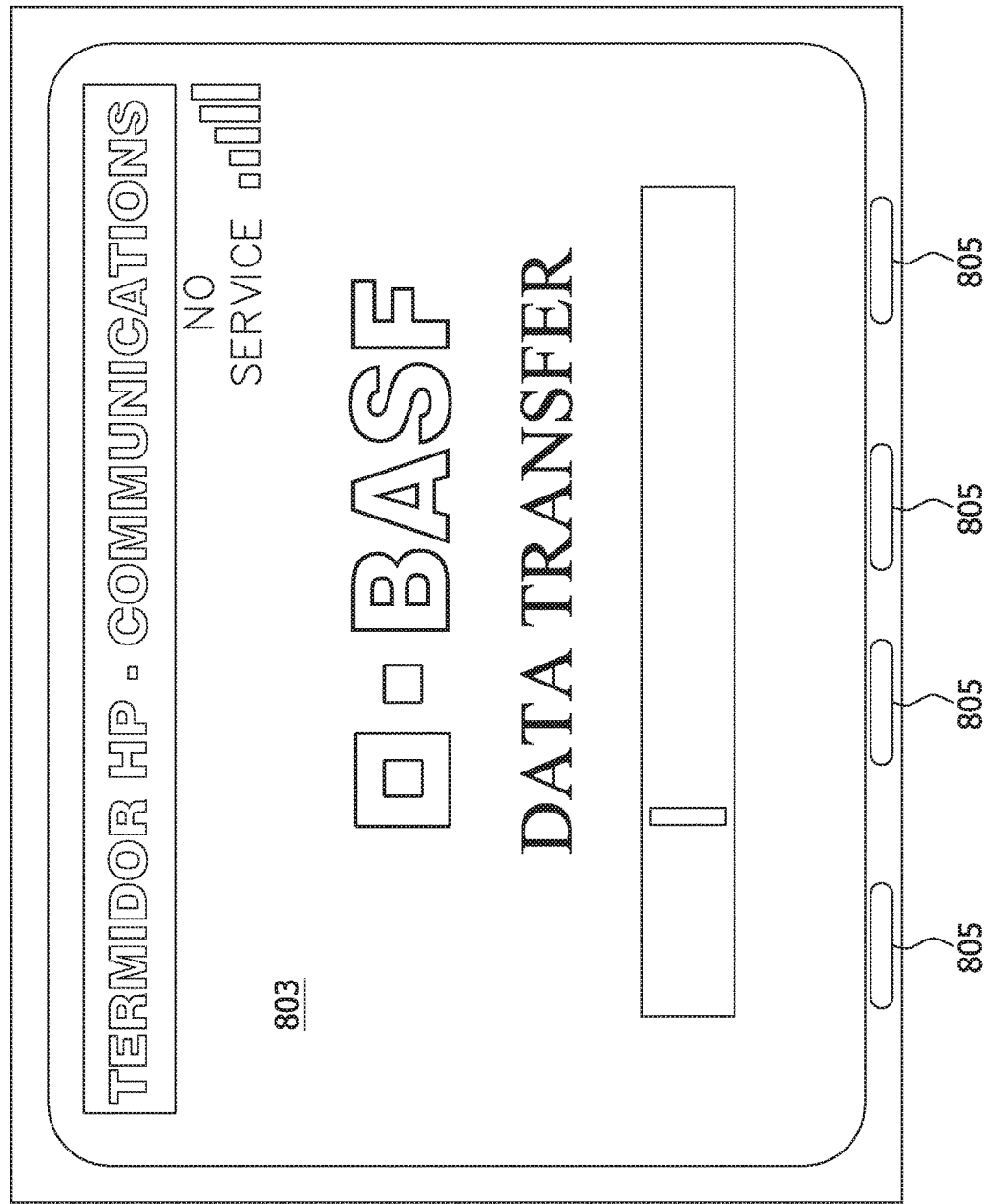
Figure 31:
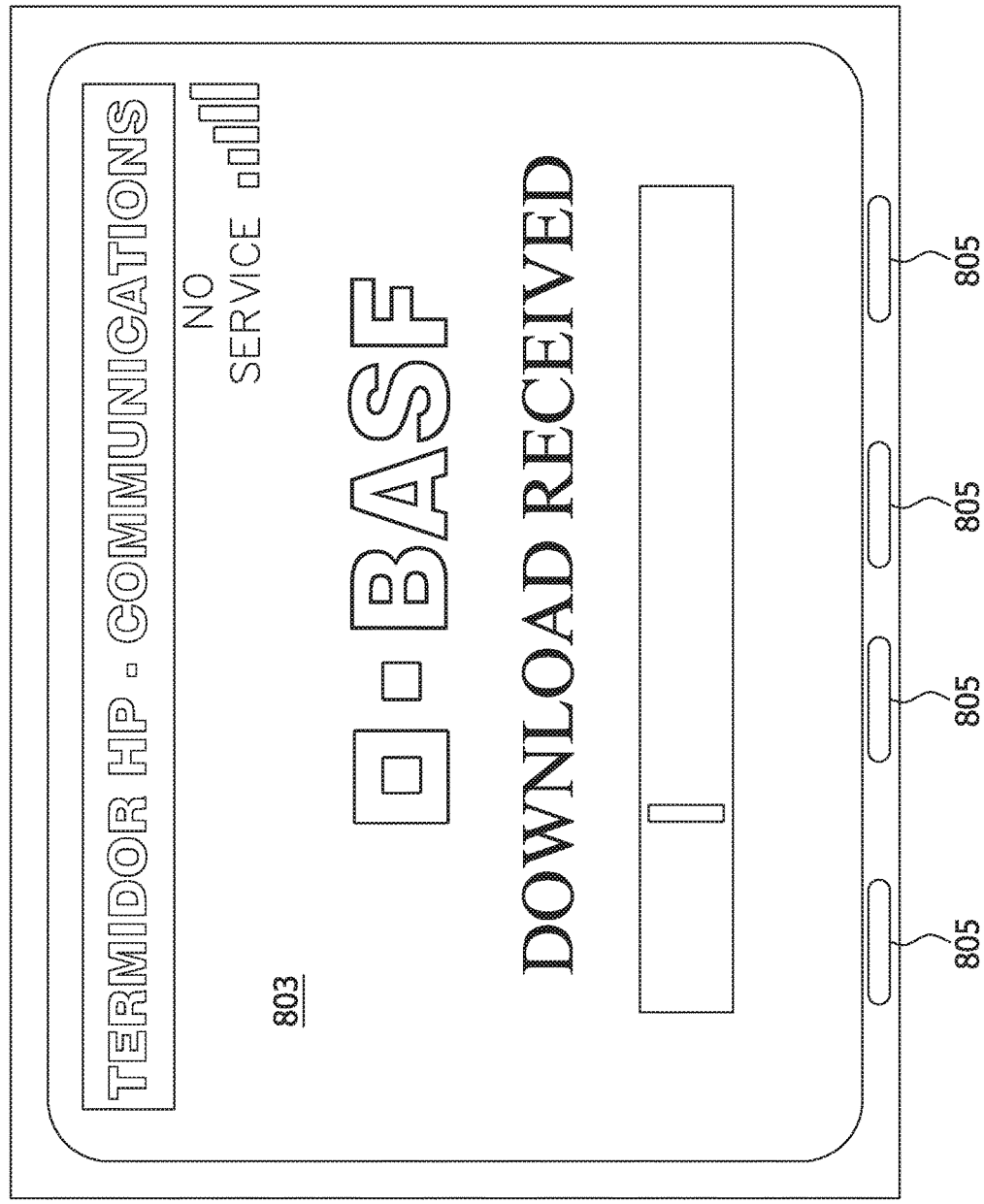
Figure 32:
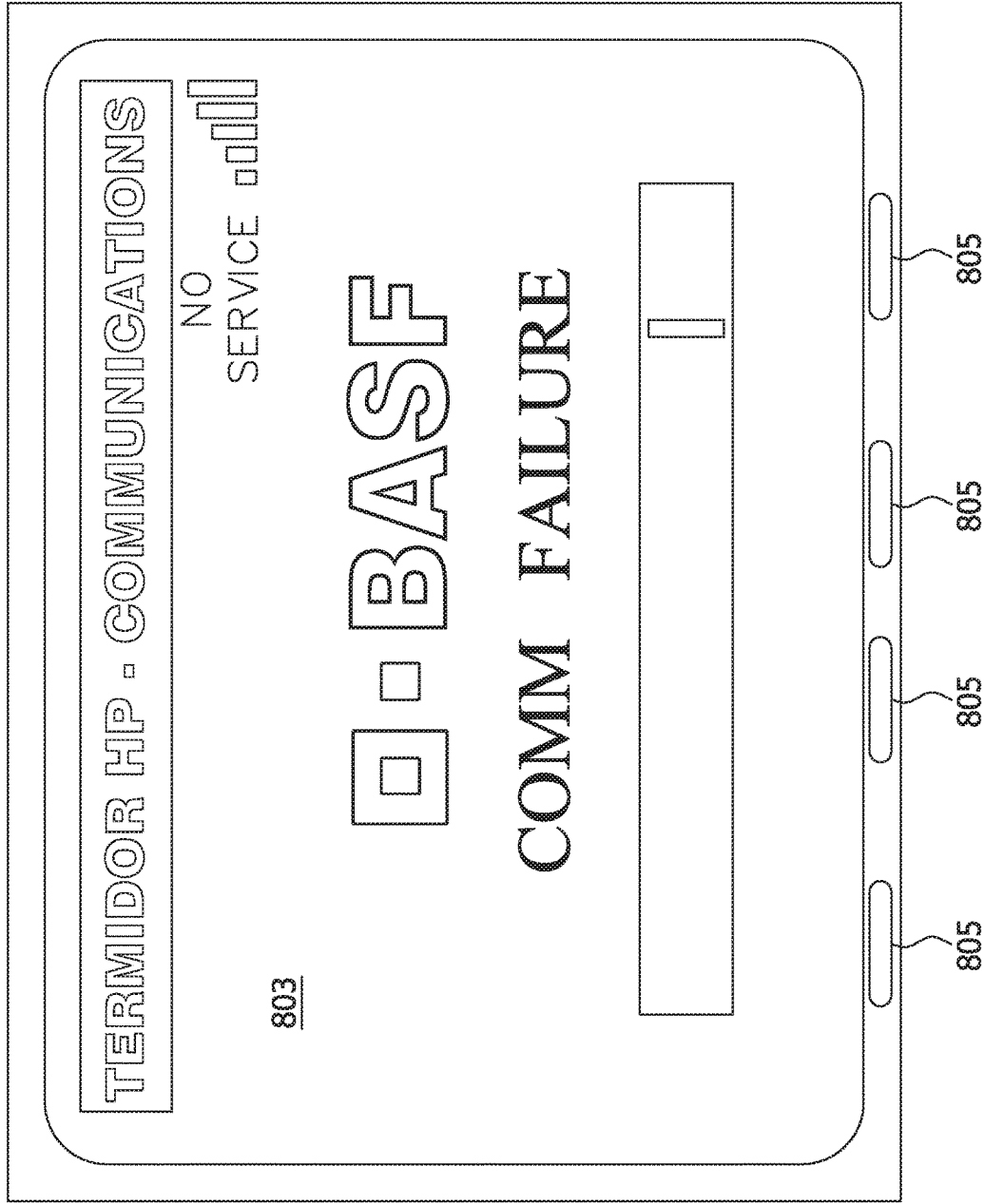

FIG. 29 is a screen shot of the first screen that the operator sees upon powering up the supply cart 714 when the apparatus 710 is used in combination with the remote data management system 801. In particular, the display screen 803 is a COMMUNICATIONS screen, with the display indicating that the remote communication control system is establishing a wireless connection with the remote data management system 801. Indicia indicating strength of the connection is also provided in the upper right corner of the COMMUNICATIONS screen. When a link is established, data is transferred from the remote data management system 801 to the supply cart control system 792 (e.g., via the remote communication control system on the supply cart 714) as shown in FIG. 30. After receipt of the data from the remote data management system 801, the COMMUNICATIONS screen will display an indication that the data was received as shown in FIG. 31. If a suitable connection was not established, the COMMUNICATIONS screen will display a communication failure warning as shown in FIG. 32.

Figure 33:
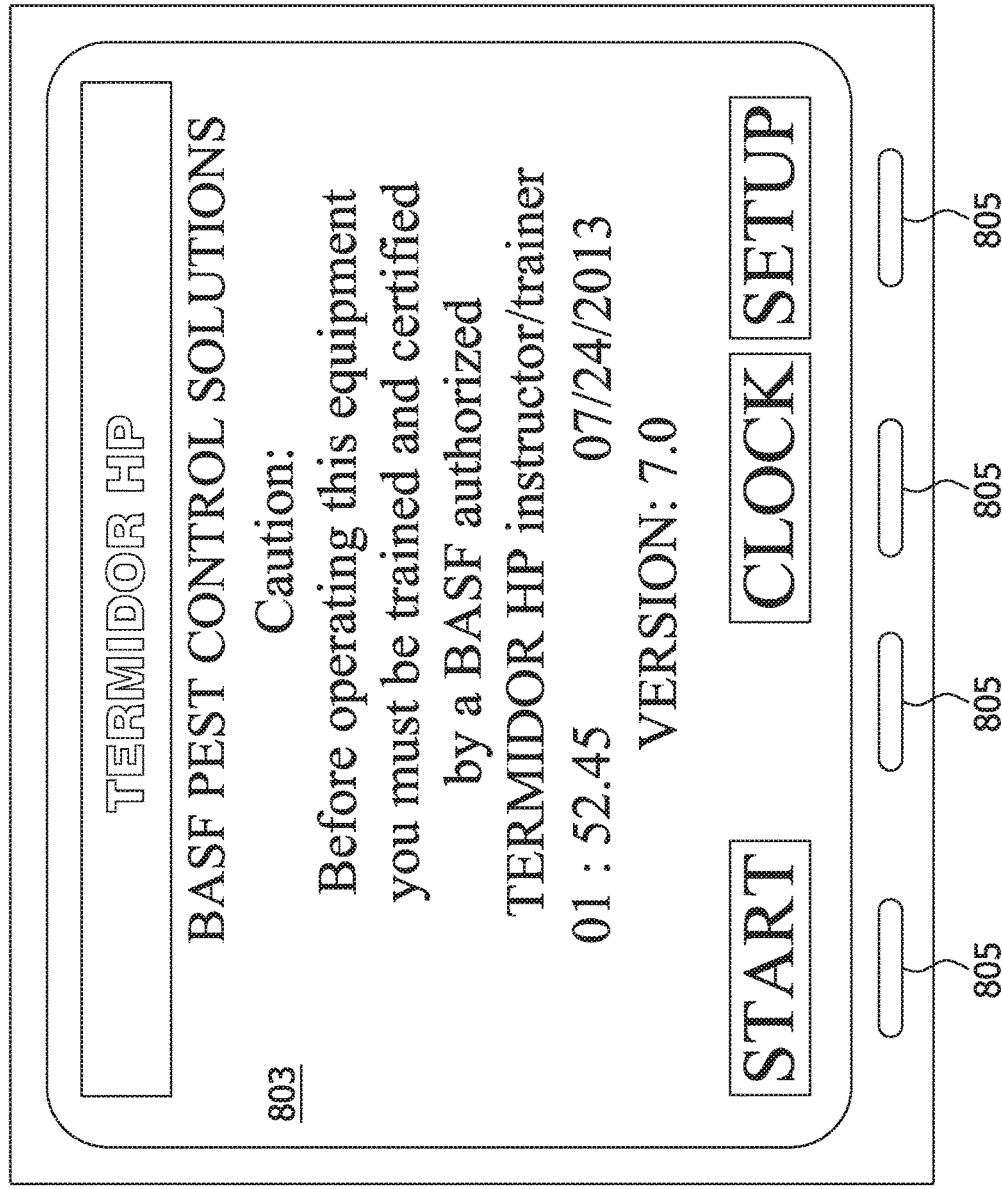

Once the data is transferred to the supply cart control system 792, the display screen 803 shown in FIG. 33 appears. In addition to the time, date, and operating software version, this display screen 803 includes three optional selections—each indicated by being in a box along the lower edge margin of the screen. In particular, a START selection, a CLOCK selection, and a SETUP selection are shown on the display screen. The SETUP selection allows certain operating parameters to be set up by the manufacturer of the apparatus 710, or by an authorized technician, or even by the pest management company. In one embodiment the SETUP selection is not used by the operator at the location at which the treatment is to be applied. In other embodiments, it is contemplated that the SETUP selection may be omitted.

Figure 34:
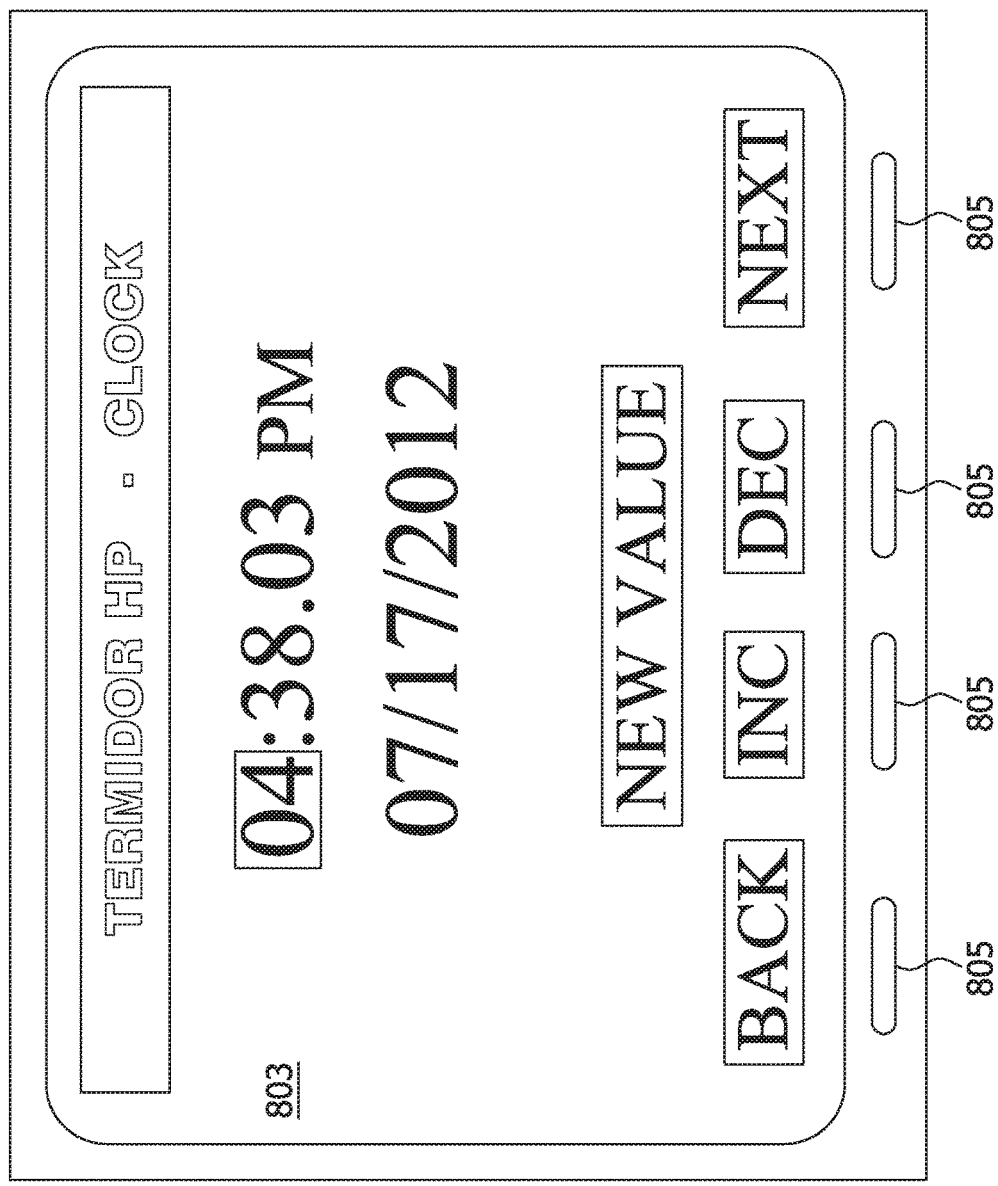

The operator may select from the START and CLOCK selections by pushing the corresponding push button 805 disposed below the selection on the display screen 803. For example, as shown in FIG. 34, if the operator pushes the button 805 below the CLOCK selection, the display screen 803 changes to a CLOCK screen to allow the operator to change the time and date on the display screen. Along the lower edge margin of the CLOCK screen are the selection options BACK, INC, DEC and NEXT. The NEXT selection is typically used to change the time and date selection between, for example, hours, minutes, second, month, day, and year. Following selection of the time and date value that the operator wishes to change, the operator pushes the button 805 below the INC and DEC selections to change the value. The INC and DEC selections stand, respectively, for "increase" and "decrease" and are used to toggle through the various values associated with the time and date selection. When the operator has input the desired time and date values, the operator pushes the button 805 below the BACK selection to return to the previous screen shown in FIG. 33.

Figure 35:
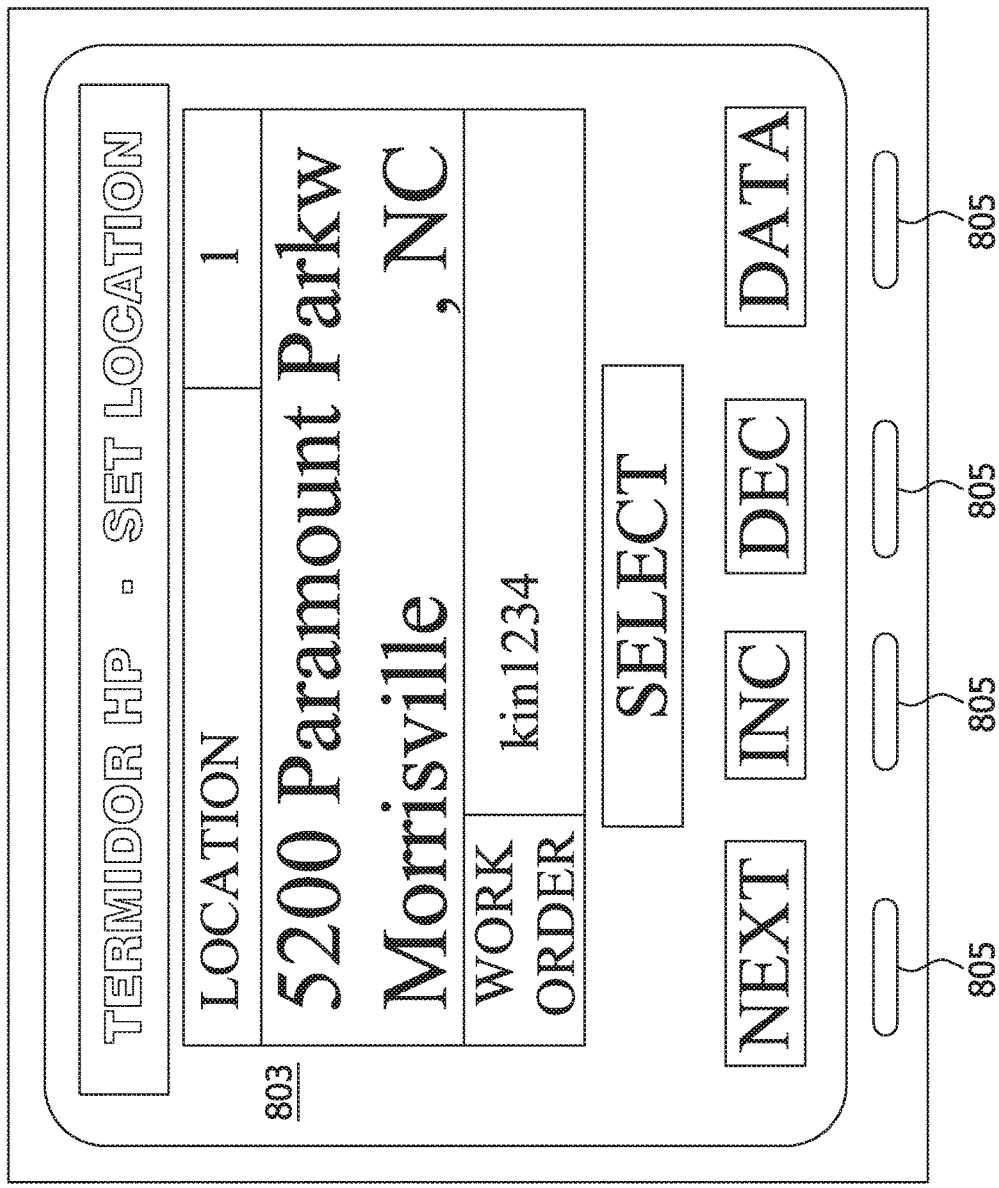

Referring back to FIG. 33, selecting the START selection initiates a parameter selection process to prepare the apparatus 710 for treating a specific work site, such as a residential property, business property or other work site. For example, when the operator is to treat a specific work site, the apparatus 710 is transported to the work site, set up at the work site, and powered up so that the screen of FIG. 33 appears on the display screen 803. By selecting the START selection, the display screen 803 changes to the first parameter selection screen, which is shown in FIG. 35. This screen, referred to as the SET LOCATION screen allows the operator to select a location of the work site to be treated. More particularly, as shown in FIG. 35, the "1" towards the upper right corner of the display screen indicates that the information on the screen relates to the first location stored in memory (such as temporary memory, e.g., random access memory) of the supply cart control system 792.

As an example, in the illustrated embodiment the supply cart control system 792 is capable of temporarily storing information relating to up to fourteen different work sites to be treated by the operator. The information includes, without limitation, a work order identifier associated with the treatment to be performed, and the address of the work site associated with the work order identifier. The work order information is suitably among the data downloaded from the remote data management system 801. In other embodiments the work order identifiers and associated information may be downloaded from a cellular phone, from flash drive or other data storage medium, or by any other suitable technique. It is also contemplated that the supply cart control system 792 may further include a keyboard input device or other suitable input device associated therewith that permits the operator to input the work order identifiers into the supply cart control system 792.

In one suitable embodiment, if no work order identifiers are input to or otherwise downloaded to the supply cart control system 792, the apparatus 710 will not operate. Also, the operator can compare the address information on the SET LOCATION screen with the actual address of the location at which the operator is setting up to make sure that the operator has a valid work order identifier associated with the address about to be treated. Along the lower edge margin of the SET LOCATION screen are the selection options NEXT, INC, DEC and DATA. The DATA selection is typically used following the completion of the treatment at the particular work site and is described in further detail later herein. The INC and DEC selections stand, respectively, for "increase" and "decrease" and are used to toggle through the various location numbers (and hence work order identifiers) stored in the supply cart control system 792. When the work order identifier and associated address corresponding to the work site at which the operator transported the apparatus 710 for treatment are displayed on the SET LOCATION screen, the operator pushes the button 805 below the NEXT selection to confirm that the treatment will be performed for the selected work order identifier.

Figure 36:
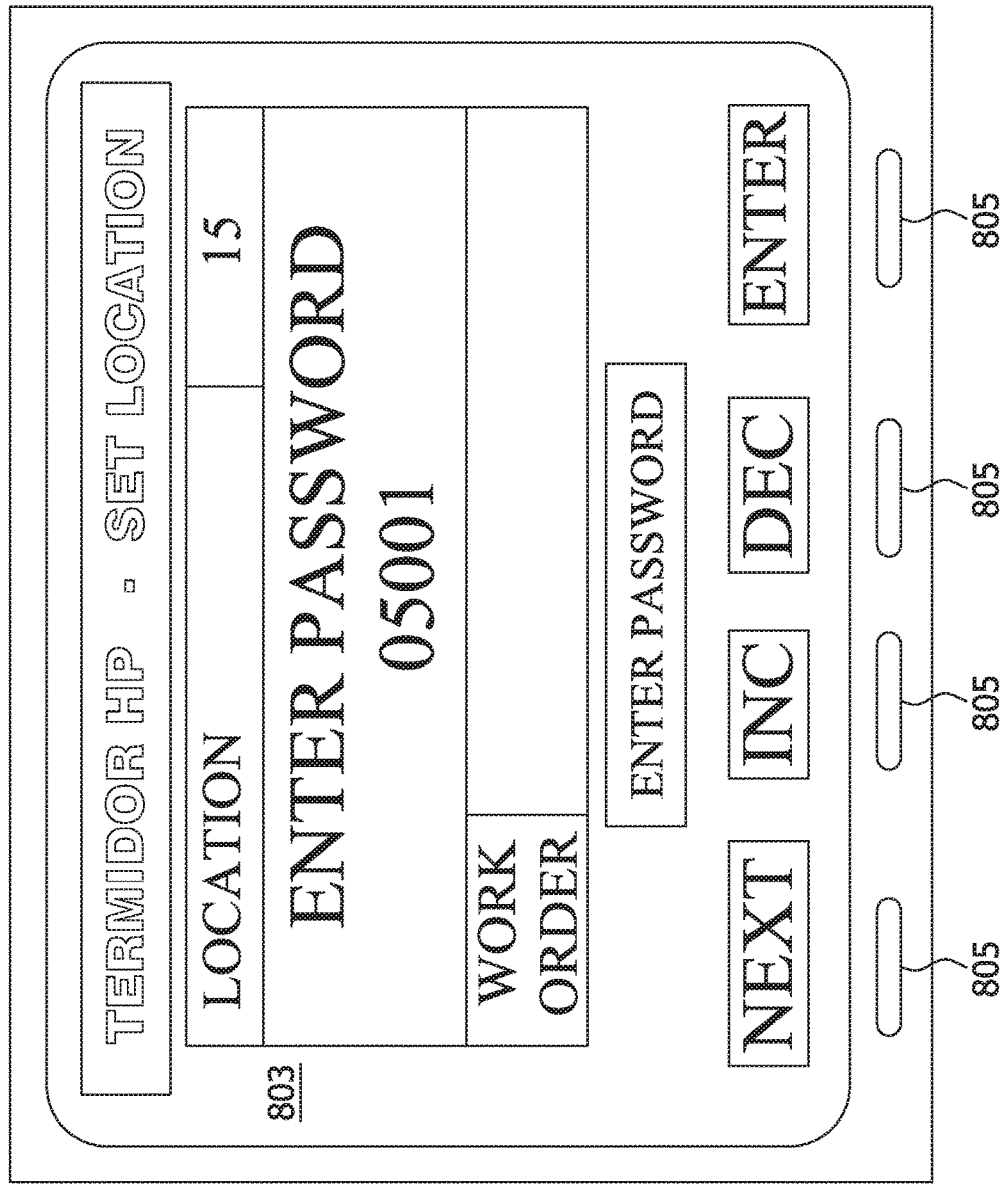

With reference to FIG. 36, the supply cart control system 792 according to one embodiment may further include a pre-set (by the manufacturer of the apparatus 710) fifteenth location that is for maintenance purposes only, e.g., for testing operation of the apparatus by maintenance technicians. While no work order identifier is required, a maintenance technician must input a password to operate the apparatus for this location. This inhibits operators from operating the apparatus and performing treatments without an associated work order identifier (e.g., for invoicing customers).

Figure 37:
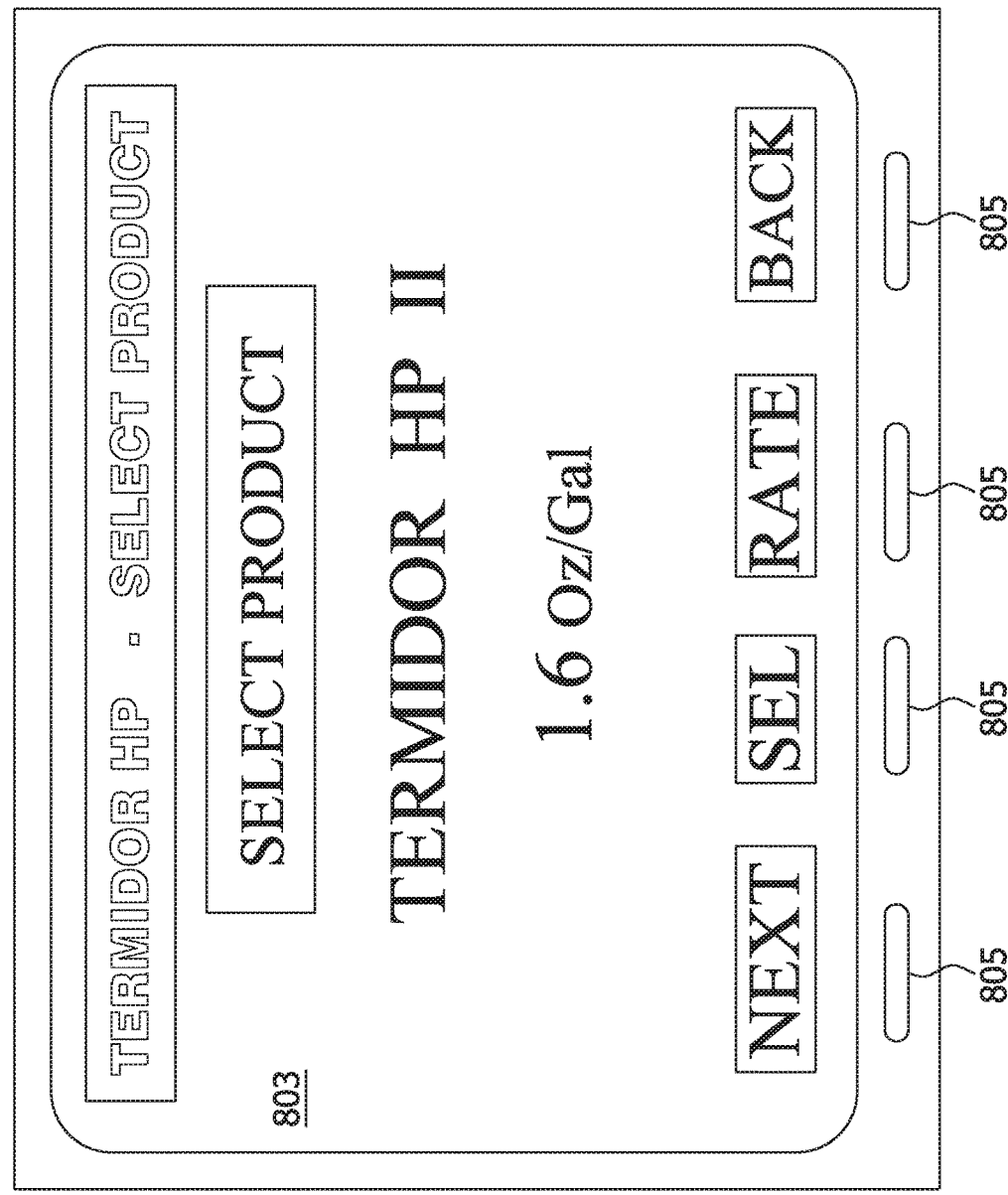
Figure 38:
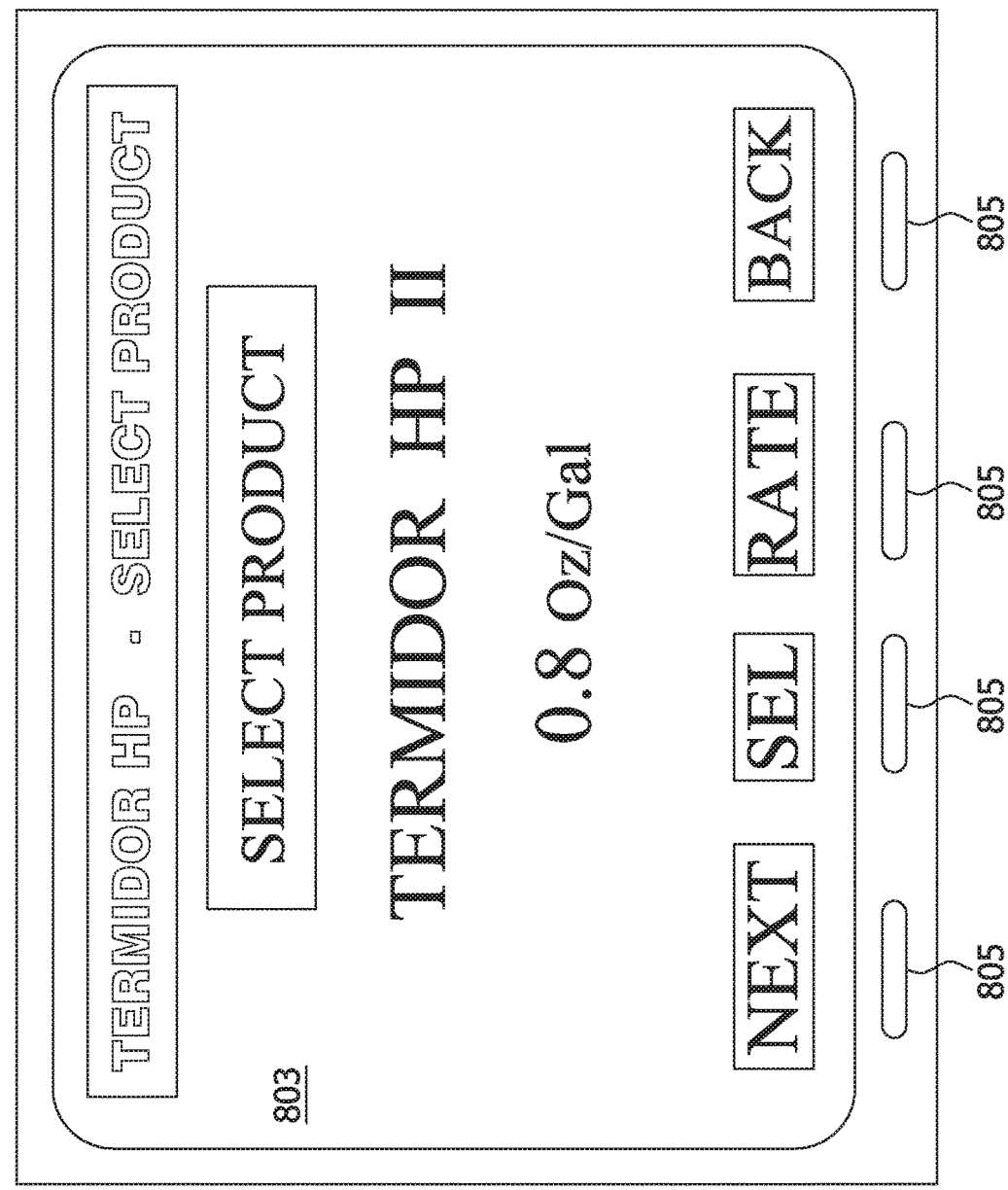
Figure 39:
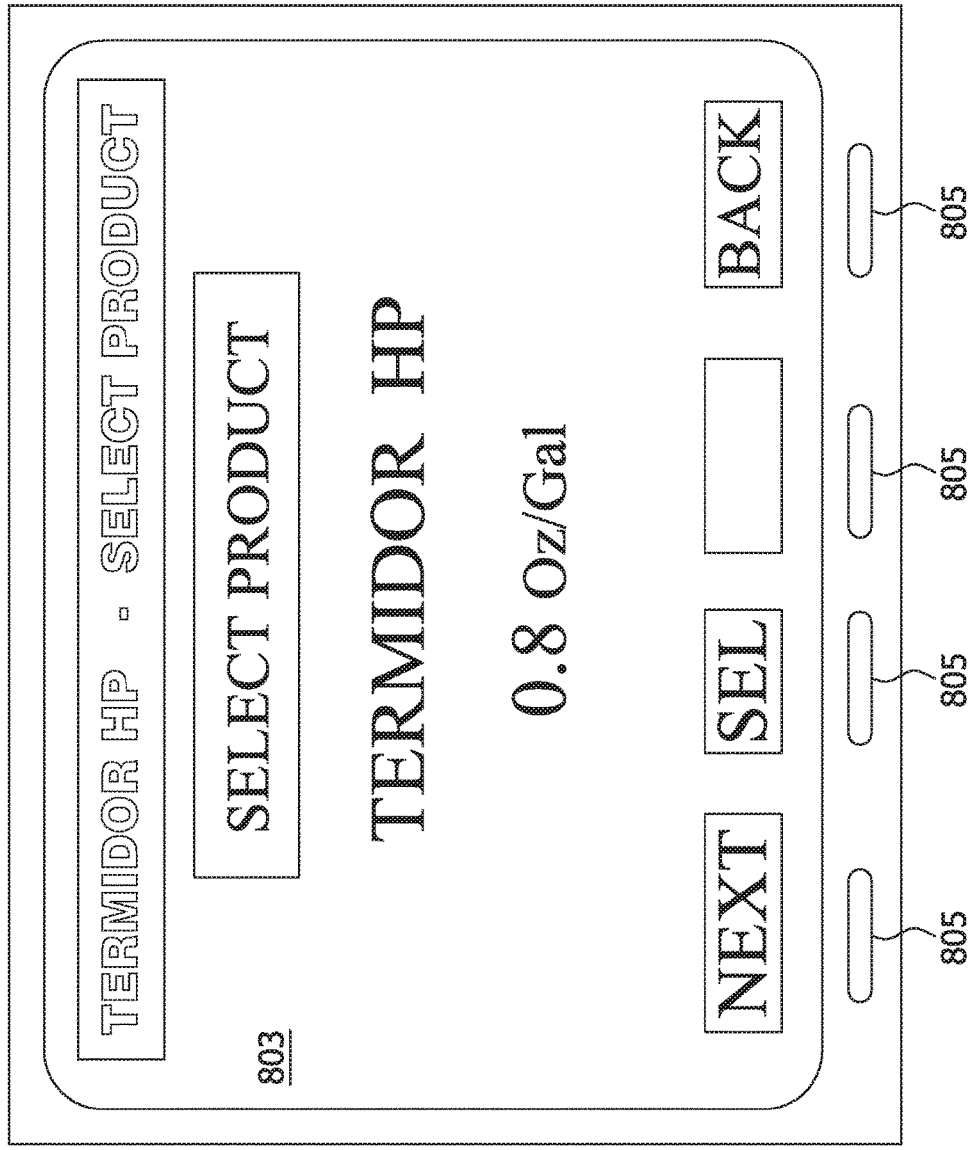

Once the location (i.e., work order identifier) is selected by the operator, a SELECT PRODUCT screen such as that shown in FIG. 37 appears on the display screen 803. This allows the operator to select which of multiple different active ingredients (e.g., concentrated termiticide in the illustrated embodiment) will be used in performing the treatment. On the SELECT PRODUCT screen shown in FIG. 37, the type or name of the active ingredient is displayed, along with a pre-set mixture ratio at which the active ingredient is mixed with carrier liquid (e.g., in the illustrated embodiment, 1.6 oz. of active ingredient per one gallon of water) when operating in the low pressure mode of the apparatus 710. Along the lower edge margin of the SELECT PRODUCT screen are four selection options for the operator, including NEXT, SEL, RATE and BACK. The BACK selection changes the display back to the SET LOCATION screen. The NEXT selection is used by the operator to confirm that the active ingredient displayed on the screen is the product to be used. The SEL selection is used by the operator to cycle the display screen 803 through the other active ingredients from which the operator may choose for the treatment.

The RATE selection is available and displayed on the SELECT PRODUCT screen only when the active ingredient may be used at more than one mixture ratio. Making the RATE selection changes the display screen 803 to display the same active ingredient type or name, but a different mixture ratio. For example, in FIG. 38, 0.8 oz. of active ingredient per one gallon of water is displayed. Where the active ingredient to be used has only one pre-set mixture ratio, the RATE selection is omitted from the SELECT PRODUCT screen. For example, from the screen shown in FIG. 37, if the SEL selection is made the display screen will change to the display screen 803 shown in FIG. 39, which is an active ingredient for which only one pre-set mixture ratio is available.

Figure 40:
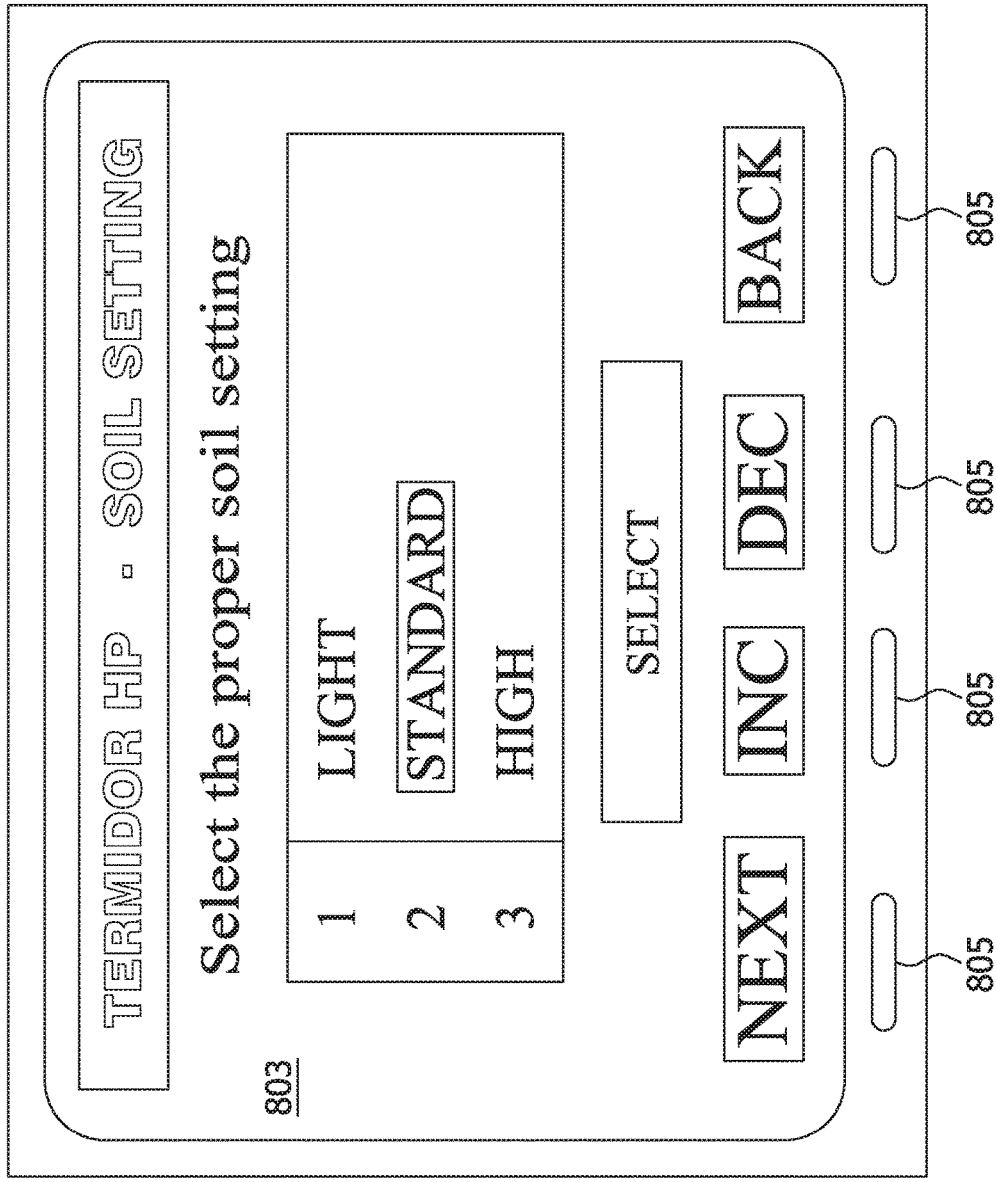

Following selection of the active ingredient to be used, the SOIL SETTING screen appears on the display screen 803 as shown in FIG. 40. This screen allows the operator to select the type of soil that is being treated when the apparatus 710 is operated in its high pressure mode. For example, in the illustrated embodiment the operator may select from a LIGHT soil, a STANDARD soil and a HIGH soil. A LIGHT soil according to one embodiment includes relatively loose soil such as, without limitation, sand, loamy sand and sandy loam. A STANDARD soil in accordance with one embodiment includes a slightly more compact soil such as, without limitation, loam, sandy clay loam, silt loam and silt. And the HIGH soil according to one embodiment includes more heavily compacted soil such as, without limitation, clay, sandy clay, silty clay and silty claim loam. The operator, once at the work site, assesses the soil type and makes the proper selection. The INC and DEC selections are again used to toggle through the soil type options. The NEXT selection is used to confirm the selection of the desired soil type and change the screen to the next parameter selection screen. The BACK selection is used to return to the previous parameter selection screen.

The soil type selection determines, in accordance with one embodiment, the amount of time that the discharge valve 756 of the high pressure application tool 712 remains open during each trigger event, i.e., each injection. This timing is pre-set by the manufacturer or may be changed by a maintenance technician, but otherwise cannot be adjusted by the operator at the work site. The open time of the discharge valve 756 is based on the amount of water, at the operating pressure, needed to inject the soil treatment down into the soil to the desired depth. For example, in the illustrated embodiment, for the LIGHT soil setting the associated open time of the discharge valve 756 is 0.05 seconds, for the STANDARD soil setting the associated open time of the valve 756 is 0.15 seconds and for the HIGH soil setting the associated open time of the valve 756 is 0.35 seconds. It is understood, though, that the discharge valve 756 open times associated with the soil type selections may be other than as set forth above without departing from the scope of this disclosure.

Figure 41:
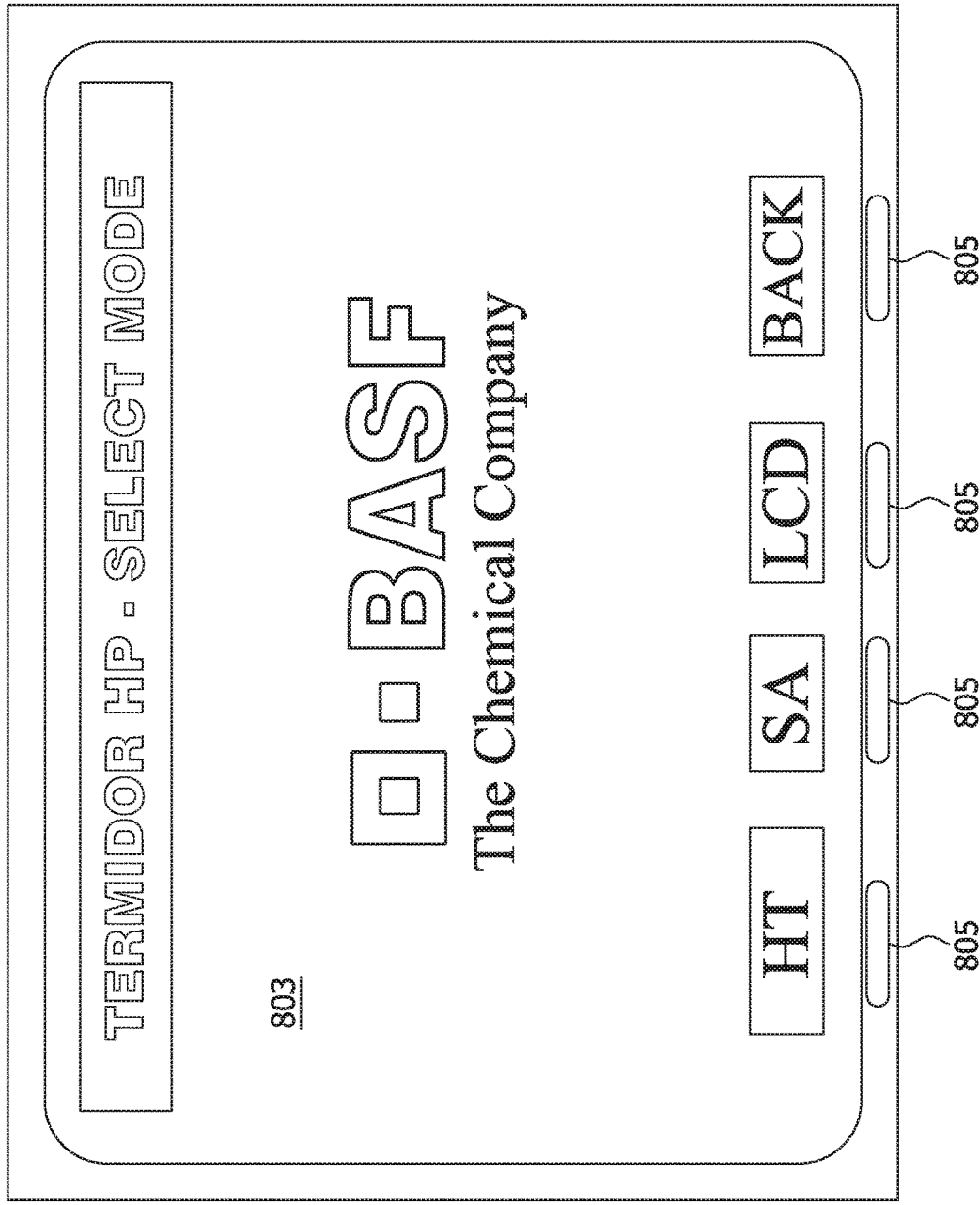

Following selection of the soil type, the SELECT MODE screen appears on the display screen as shown in FIG. 41. As discussed previously, the apparatus 710 is operable in either a high pressure mode or a low pressure mode. In the high pressure mode, the high pressure application tool 712 is releasably connected to the supply cart 714 by the conduit 713 (e.g., the hose) while in the low pressure mode the low pressure application tool 711 is releasably connected to the supply cart by the conduit. The SELECT MODE screen includes an HT selection (e.g., referring to "Hydraulic Trenching") which corresponds to the high pressure mode of operation, an SA selection (e.g., referring to "Standard Application") which corresponds to the low pressure mode of operation, an LCD selection, and a BACK selection. The BACK selection is used to return to the previous parameter selection screen. The operator selects the desired mode by pushing the corresponding button 805 below the display screen 803.

Figure 42:
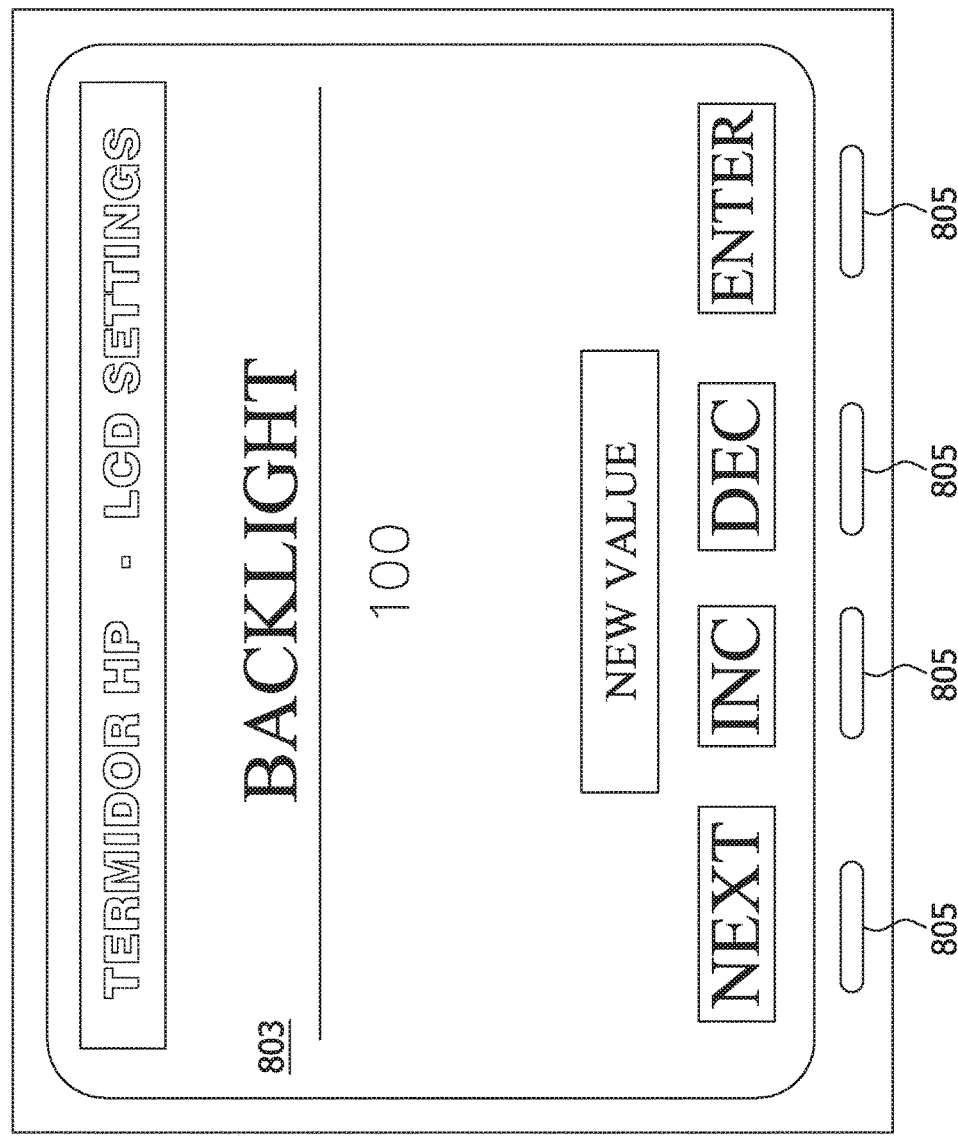
Figure 43:
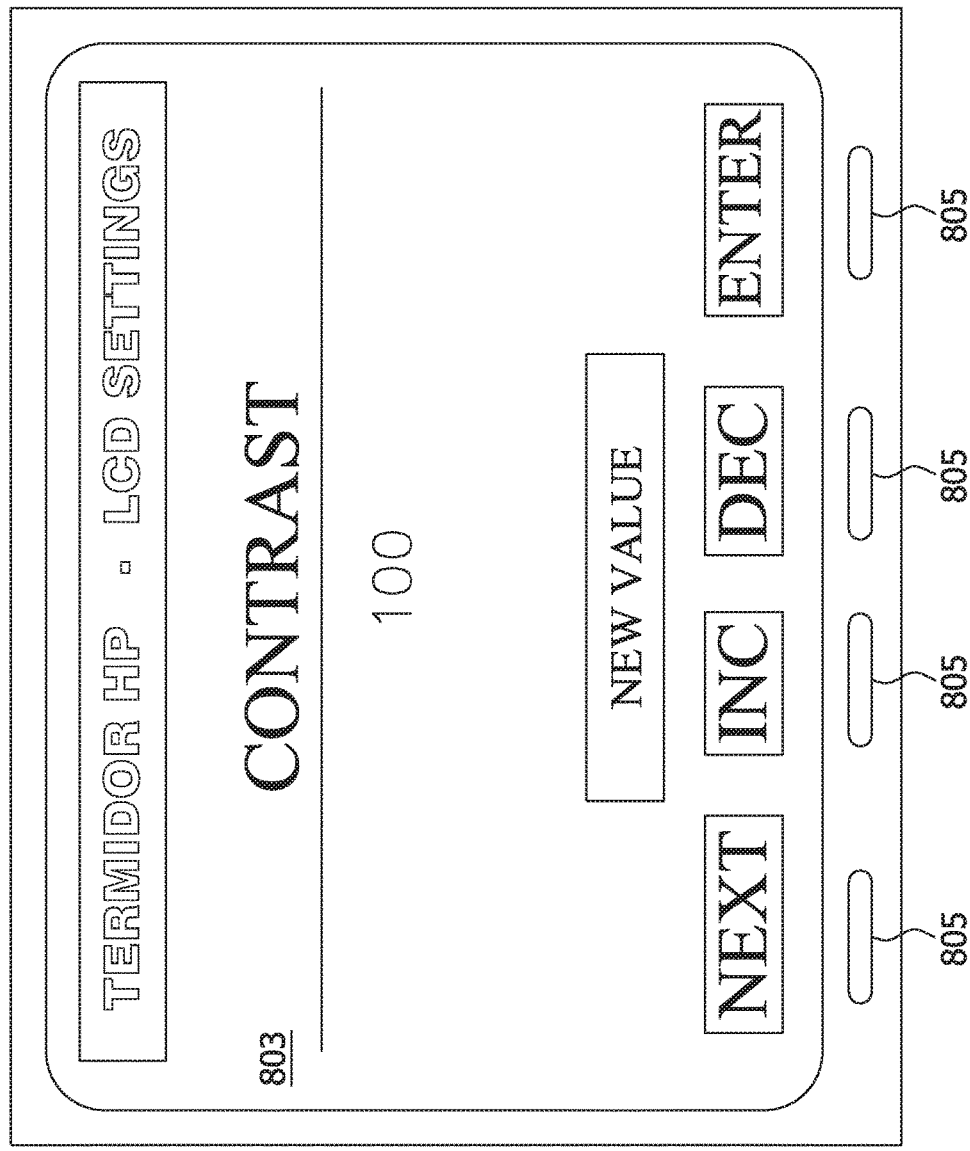

Making the LCD selection from the SELECT MODE screen allows the operator to change one or more display screen settings, such as backlight, contrast, and the like. For example, in one embodiment, pushing button 805 below the LCD selection changes the display screen 803 an LCD SETTINGS screen, as shown in FIGS. 42 and 43. Along the lower edge margin of the LCD SETTINGS screen are the selection options BACK, INC, DEC and NEXT. The NEXT selection is typically used to change between the LCD setting that can be modified, e.g. BACKLIGHT (shown in FIG. 42) and CONTRAST (shown in FIG. 43). Following selection of the LCD setting that the operator wishes to change, the operator pushes the button 805 below the INC and DEC selections to change the value. The INC and DEC selections stand, respectively, for "increase" and "decrease" and are used to toggle through the various values associated with the LCD setting. When the operator has input the desired value, the operator pushes the button 805 below the BACK selection to return to the previous screen shown in FIG. 41.

It is understood, that a single work order (e.g., a single treatment to be conducted at a work site) may entail a first treatment in which the apparatus 710 is operated in its high pressure mode and a second treatment in which the apparatus is operated in its low pressure mode. In particular, the second treatment in which the apparatus 710 is operated in its low pressure mode is suitably applied to a second area of the work site that is different from a first area of the work site to which the first treatment is applied in the high pressure mode of the apparatus. For example, where a work site is a residential property in which the treatment is to be applied about the perimeter of a home, part (a first area) of the perimeter (either a continuous segment of the perimeter, or multiple discrete segments of the perimeter) may be composed of a soil that is suitable for using the high pressure mode of the apparatus 710, while another part (a second area) of the perimeter (continuous, or multiple discrete segments) may not be suitable (such as by being a high compaction soil or by being covered with a hardened surface, e.g., concrete) for using the high pressure mode of the apparatus and thus the low pressure mode of the apparatus must be used to apply the soil treatment. It is understood, however, that other work orders may comprise operating solely in the high pressure mode or operating solely in the low pressure mode.

Figure 44:
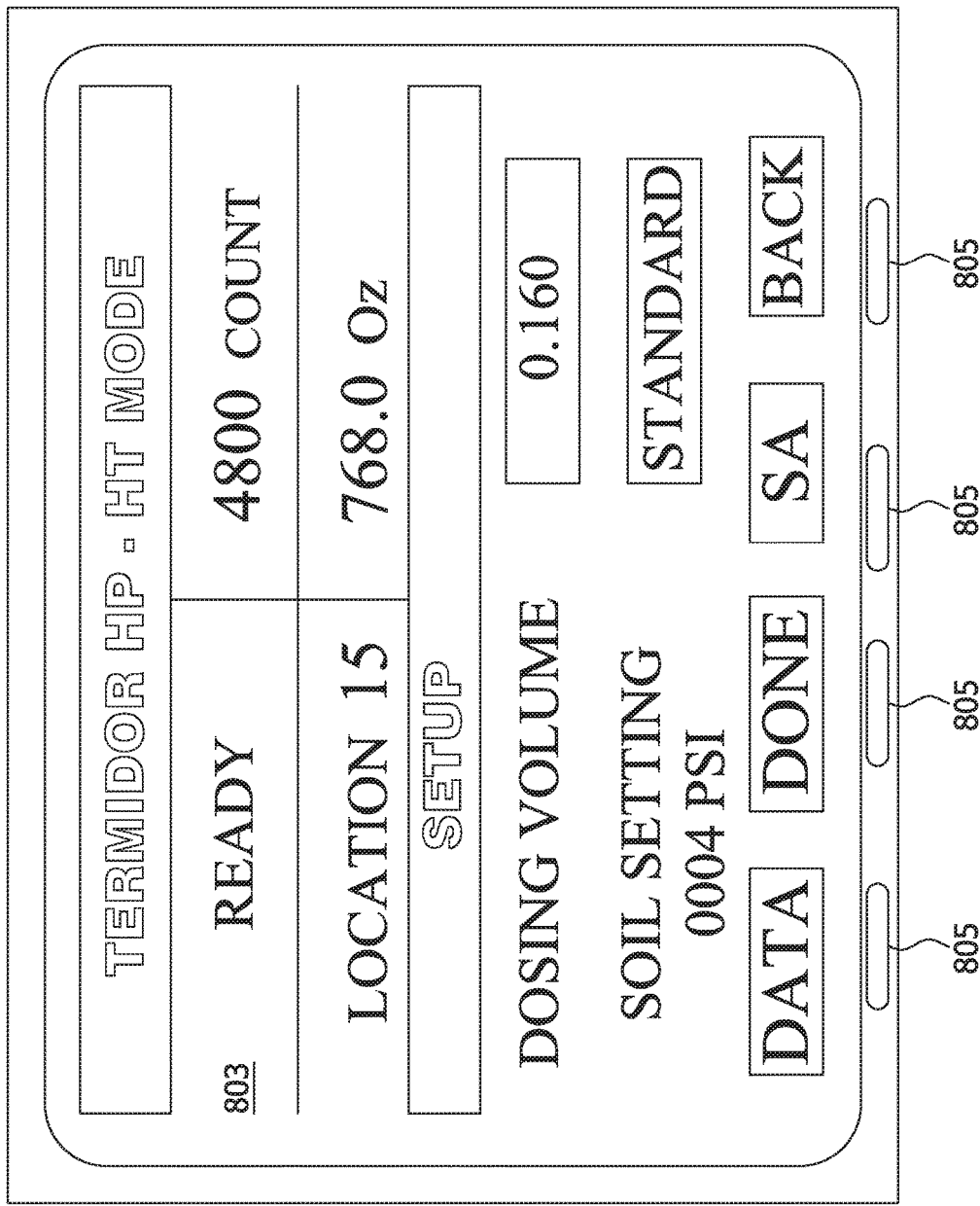
Figure 45:
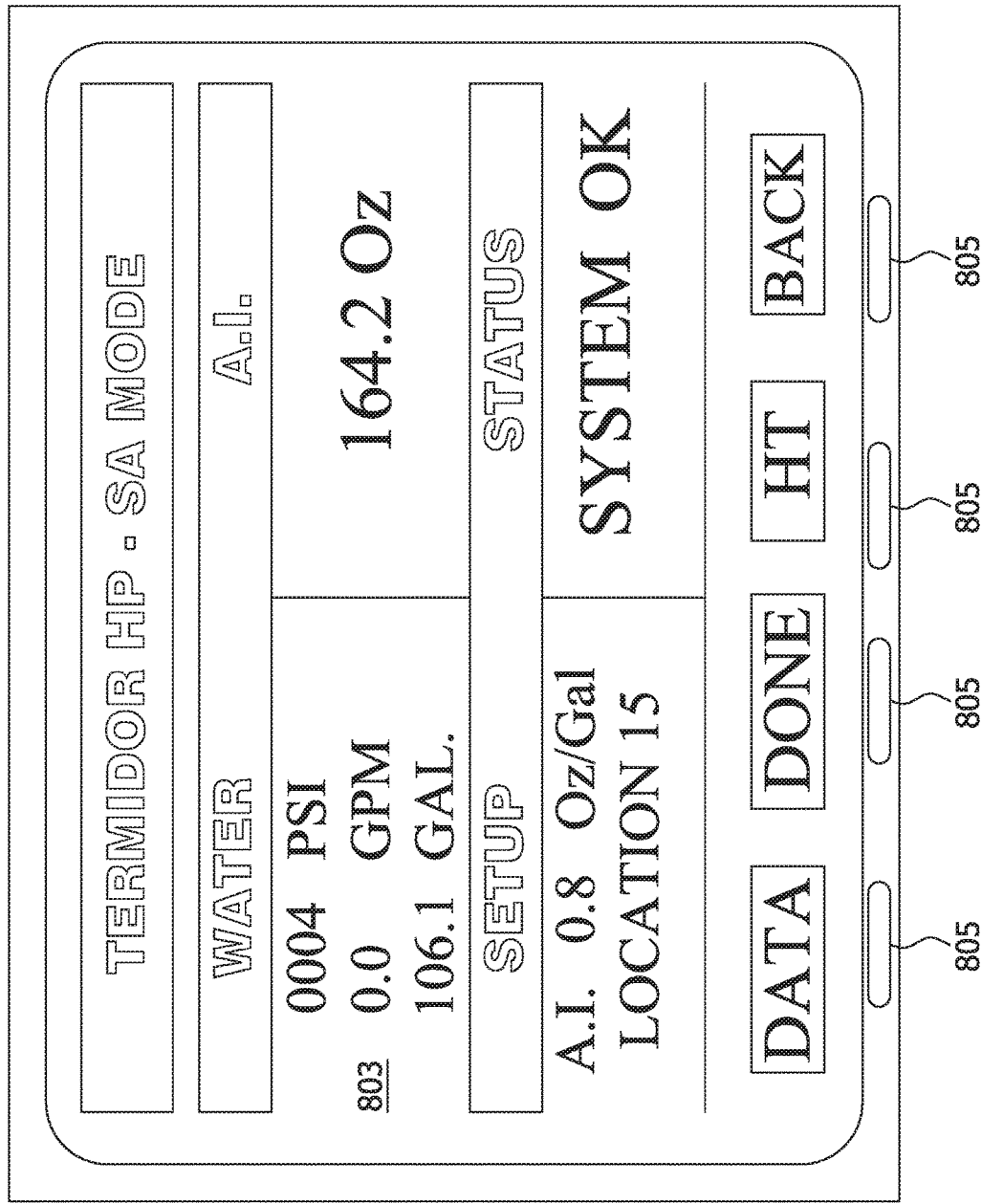

Upon selection of the high pressure mode (e.g., by selecting the HT selection from the SELECT MODE screen), the HT MODE screen shown in FIG. 44 appears on the display screen 803. In a particular embodiment, the HT MODE screen is the screen that the operator sees just before using the high pressure application tool 712 to conduct the soil treatment in the high pressure mode of the apparatus 710. On the lower section of the HT MODE screen, some of the key operating parameters of the apparatus 710 for the high pressure mode are provided, such as, without limitation, the pre-set dosing volume (i.e., the amount of active ingredient, such as the concentrated termiticide, to be delivered per injection in the high pressure mode of the apparatus), the soil type that was selected, and the operating pressure. The operating pressure reading on the HT MODE screen is based on a reading from a suitable transducer (not shown) located on the high pressure application tool 712.

The upper section of the HT MODE screen identifies the location number (in the storage medium of the supply cart control system 792) associated with the work order pursuant to which the present treatment is to be conducted. Also included in the upper section of the HT MODE screen is an injection count that indicates a running total number of injections made up to that point for this particular work order (i.e., at this specific work site). Below the injection count is the amount of active ingredient, e.g., the concentrated termiticide, dispensed up to that point for this particular work order. The amount of active ingredient is a function of the number of injections and the dosing volume. Prior to the first injection conducted at this work site, the count and the amount of active ingredient used should both be zero.

Along the lower edge margin of the display screen are four possible selections that the operator can make, identified as DATA, DONE, SA and BACK. The BACK selection takes the operator to the previous parameter selection screen. The DATA selection takes the operator to a LOCATION DATA screen (discussed in further detail later herein) where the operator can review data recorded in relation to the specific work order (i.e., the location number). The DONE selection allows the operator to indicate to the supply cart control system 792 that the operator has completed operation of the apparatus 710 in the high pressure mode. In particular, the operator holds down the push button 805 that corresponds with the DONE selection for three seconds. In some embodiments, in response to the operator indicating that operation of the apparatus 710 in the high pressure mode is completed, various data collected during such operation is transmitted from the supply cart control system 792 to the remote data management system 801 via the remote communication control system 802. The operator may select the DATA selection either before or after making the DONE selection.

Once the DONE selection is made to indicate completion of operation in the high pressure mode, the operator may select the SA selection to indicate to the supply cart control system 792 that operation in the low pressure mode is to begin. Switching to the low pressure mode cannot be made until the DONE selection is made to indicate completion of operation in the high pressure mode. Upon making the SA selection to switch to the low pressure mode of operation, the high pressure application tool 712 is disconnected from the conduit 713 and the conduit is connected to the low pressure application tool 711. The display screen 803 switches to the SA MODE screen shown in FIG. 45.

The SA MODE screen includes setup information such as, without limitation, the location number and the pre-set delivery rate (as indicated on the previous SELECT PRODUCT screen) of the active ingredient from the concentrate reservoir 784' (e.g., on board the high pressure application tool 712). On the left side of the upper section of the SA MODE screen, the water pressure (in PSI), flow rate (in gallons per minute or GPM) and total amount of water used (in gallons) as of the particular point of operation in the low pressure mode is displayed. The right side of the upper section of the SA MODE screen displays the total amount of active ingredient (e.g., the concentrated termiticide) used up to a particular point during operation of the apparatus 710 in the low pressure mode. The total amount of active ingredient used is a function of the pre-set active ingredient delivery rate and the total amount of water used (as monitored by the supply cart control system 792).

Along the lower edge margin of the SA MODE screen are four possible selections that the operator can make, identified as DATA, DONE, HT and BACK. The BACK selection takes the operator to the previous parameter selection screen. The DATA selection takes the operator to the LOCATION DATA screen (discussed in further detail later herein) where the operator can review data recorded in relation to the specific work order (i.e., the location number). The DONE selection allows the operator to indicate to the supply cart control system 792 that the operator has completed operation of the apparatus 710 in the low pressure mode. In particular, the operator holds down the push button 805 that corresponds with the DONE selection for three seconds. In some embodiments, in response to the operator indicating that operation of the apparatus 710 in the low pressure mode is completed, various data recorded during such operation is transmitted from the supply cart control system 792 to the remote data management system 801. The operator may select the DATA selection either before or after making the DONE selection.

Once the DONE selection is made to indicate completion of operation in the low pressure mode, the operator may select the HT selection to indicate to the supply cart control system 792 that operation in the high pressure mode is to begin (e.g., in the event that the low pressure mode application was conducted first). Switching to the high pressure mode cannot be accomplished until the DONE selection is made to indicate completion of operation in the low pressure mode. Upon making the HT selection to switch to the high pressure mode of operation, the low pressure application tool 711 is disconnected from the conduit 713 and the conduit is connected to the high pressure application tool 712. The display screen 803 switches to the HT MODE screen shown in FIG. 44.

Figure 46:
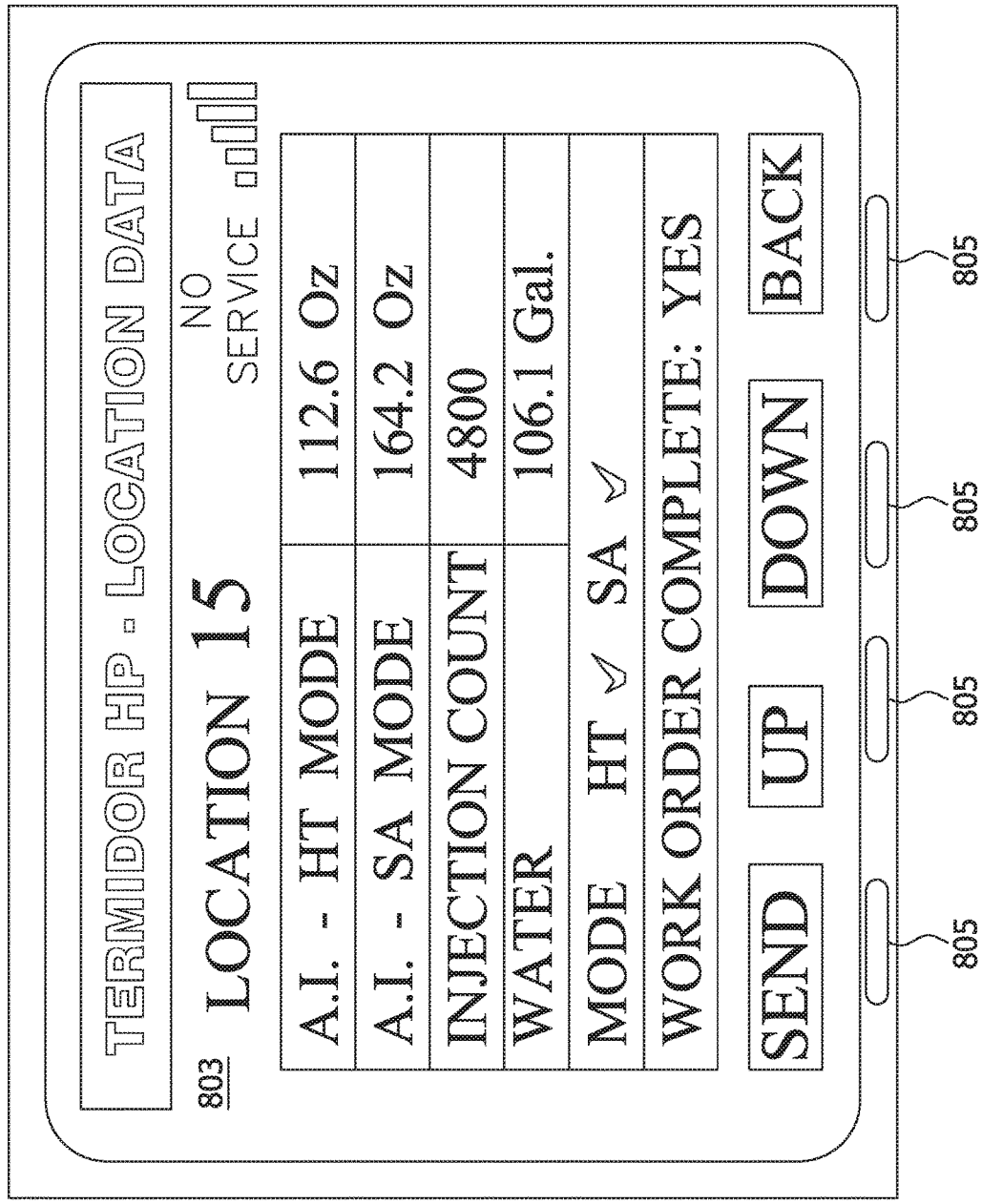

The LOCATION DATA screen that appears on the display screen 803 after making the DONE selection from either the HT MODE screen or the SA MODE screen is shown in FIG. 46. If displayed following selection from either one of the HT MODE screen (FIG. 44) or the SA MODE screen (FIG. 45), the LOCATION DATA screen will display data relating to the specific location number (and hence work order identifier) associated with the treatment that was just performed by the operator. It is also understood that the LOCATION DATA screen may be reached from the SET LOCATION screen shown in FIG. 35. For example, the operator may toggle through the location numbers (using the INC and DEC selections on the SET LOCATION screen) to a particular location number, and then make the DATA selection to bring up the LOCATION DATA screen for any of the particular location numbers (i.e., work orders) stored in the supply cart control system 792.

The LOCATION DATA displays a number of different data associated with the treatment applied for the particular work order identifier. For example, in the illustrated LOCATION DATA screen the total amount of active ingredient used during operation in the high pressure mode is displayed along with the number of injections made. The total amount of active ingredient used during operation in the low pressure mode is also displayed along with the total amount of water used in the low pressure mode. It is understood that in other embodiments more data or less data may be displayed on the LOCATION DATA screen without departing from the scope of this disclosure.

Below the data information is a MODE line, with the HT and SA indicia side-by-side. The check mark next to each of the respective HT and SA indicia indicates that operation in each of the respective high and low pressure modes was completed (as a function of the operator making the DONE selection in each of the HT MODE and SA MODE screens). If the operator has not made the DONE selection in either one of the HT MODE and SA MODE screens, there will not be a check mark next to the corresponding HT or SA indicia on the LOCATION DATA screen. WORK ORDER COMPLETE indicia is also displayed on the LOCATION DATA screen, next to which either a YES or a NO indicia will appear. For example, if a check mark appears next to each of the HT and SA indicia adjacent the MODE indicia, then the work is complete and the YES indicia will appear. But if a check mark is absent next to either one of the HT and SA indicia, the work order is incomplete and the NO indicia will appear, with the absence of a check mark indicating which mode of operation is yet to be completed. In this regard, even if one of the modes of operation is not to be performed for a particular work order, the DONE selection must still be made on the respective one of the HT MODE or SA MODE screens to indicate completion of that mode of operation.

Along the lower edge margin of the LOCATION DATA screen are four possible selections that the operator can make, identified as SEND, UP, DOWN and BACK. The BACK selection changes the display screen 803 to the previous parameter screen. The UP and DOWN selections allow the operator to toggle through the different location numbers (i.e., work orders) stored in the first control system. The SEND selection allows the operator to instruct the cart supply control system 792 to transfer the data relating to the specific location number that appears on the LOCATION DATA screen to the remote data management system 801.

Figure 47:
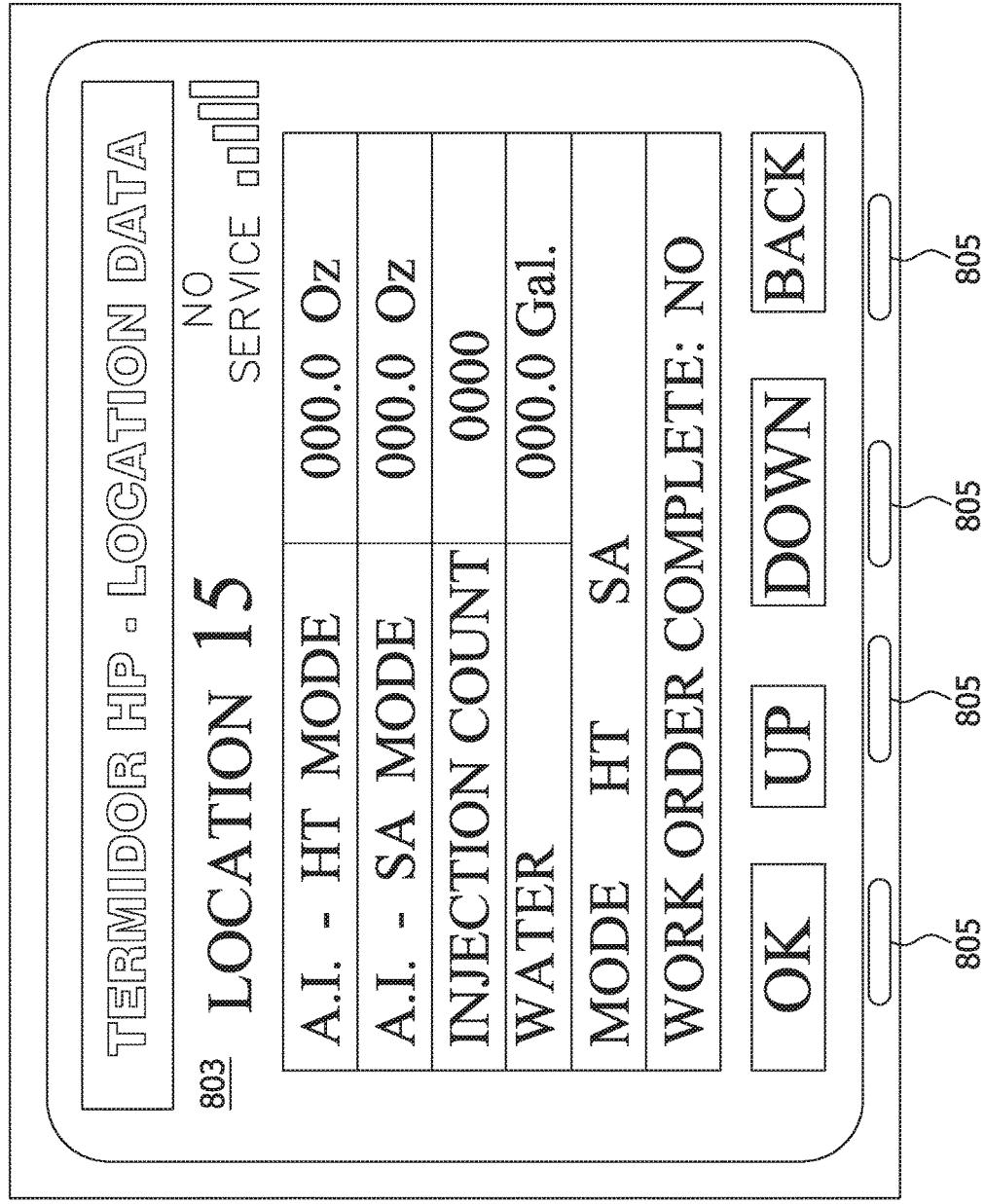

Because the SEND selection is associated only with the specific location number appearing on the LOCATION DATA screen, the operator must make the SEND selection for each location number for which a work order has been completed. For example, in the event that the operator waits until multiple work orders have been completed, such as at the end of a work day, the operator must toggle through each location number for which a work order has been completed and make the SEND selection on each of the respective LOCATION DATA screens to transfer the data for each of the completed work orders. With reference to FIG. 47, when the transfer of data for a particular location number has been successful, the SEND selection on the LOCATION DATA screen changes to an OK indicia. Additionally, all of the data on the LOCATION DATA screen is zeroed, the check marks associated with the HT and SA modes are removed, and the WORK ORDER COMPLETE line indicates NO. This provides an indication to the operator that the information for this location number (e.g., work order) has been sent already should the operator toggle through the location numbers and come back to this particular location number.

It is understood that not all data that is collected by the supply cart control system 792 (e.g., for transmission to the remote data management system 801 via the remote communication control system) may be displayed on the various screens of the supply cart control system. For example, in one embodiment it is contemplated that any one or all of the following data, without limitation, may be collected by the supply cart control system 792: location (and associated work order identifier), the operating software version for each of the supply cart control system and the application tool control system, unit ID (the identifier for the high pressure application tool 712), address of the work site location including city and state, date the treatment was performed, product type applied, soil setting(s) selected, injection volume setting (active ingredient injection volume setting, e.g., for high pressure mode), injection count, injection volume (e.g., total active ingredient used in the high pressure mode), water used (in gallons) in the high pressure mode, total amount of active ingredient used in low pressure mode, water used (in gallons) in low pressure mode, start time of the work performed at each location, the total time (in minutes) elapsed to complete the work at each location, the work order complete signal, which modes (HT and/or SA) were used, and what if any errors/alarms were activated.

Figure 48:
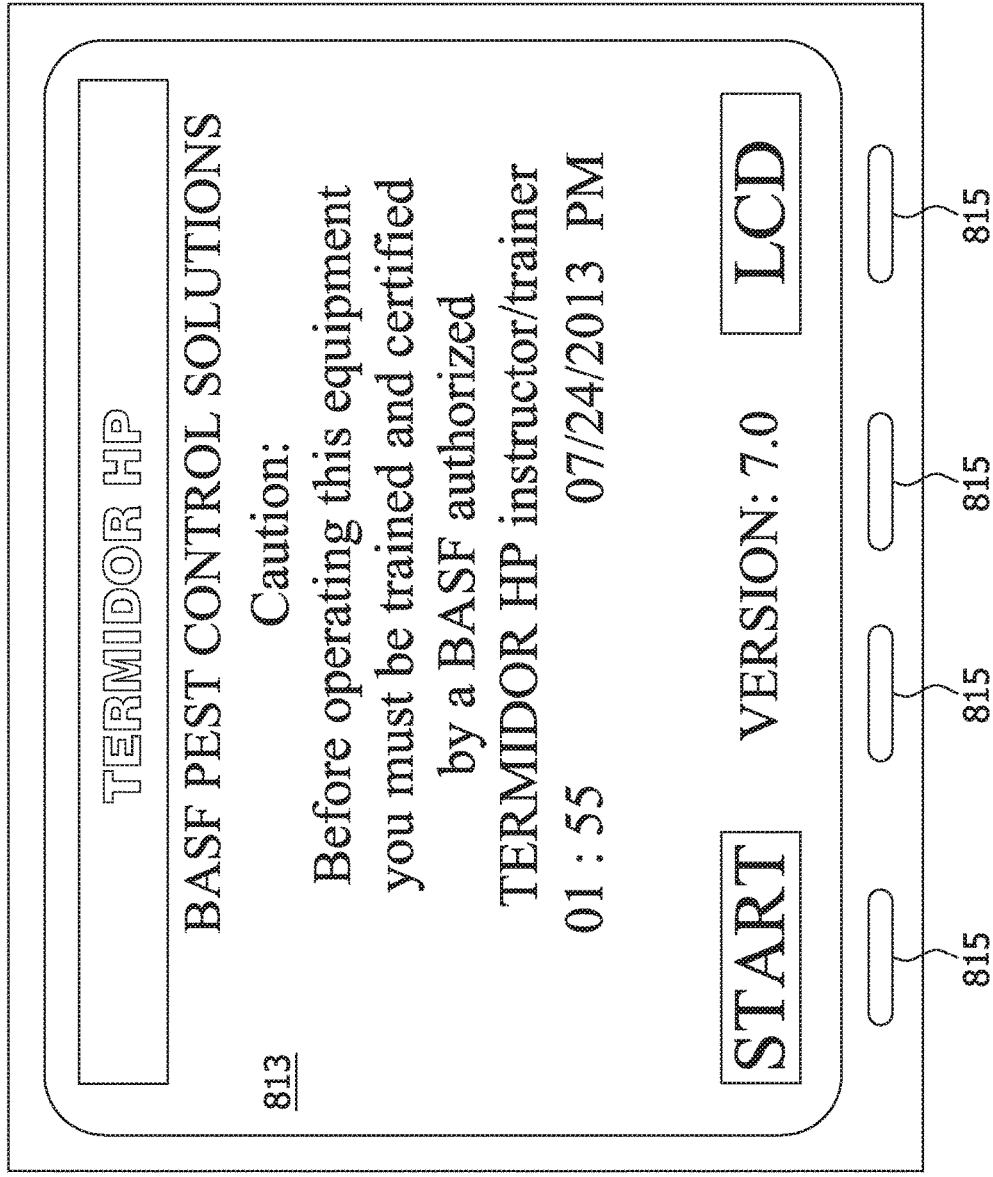
FIGS. 48-50 are screen shots from a display unit of a high pressure application tool control system for the apparatus of FIG. 23.
Figure 49:
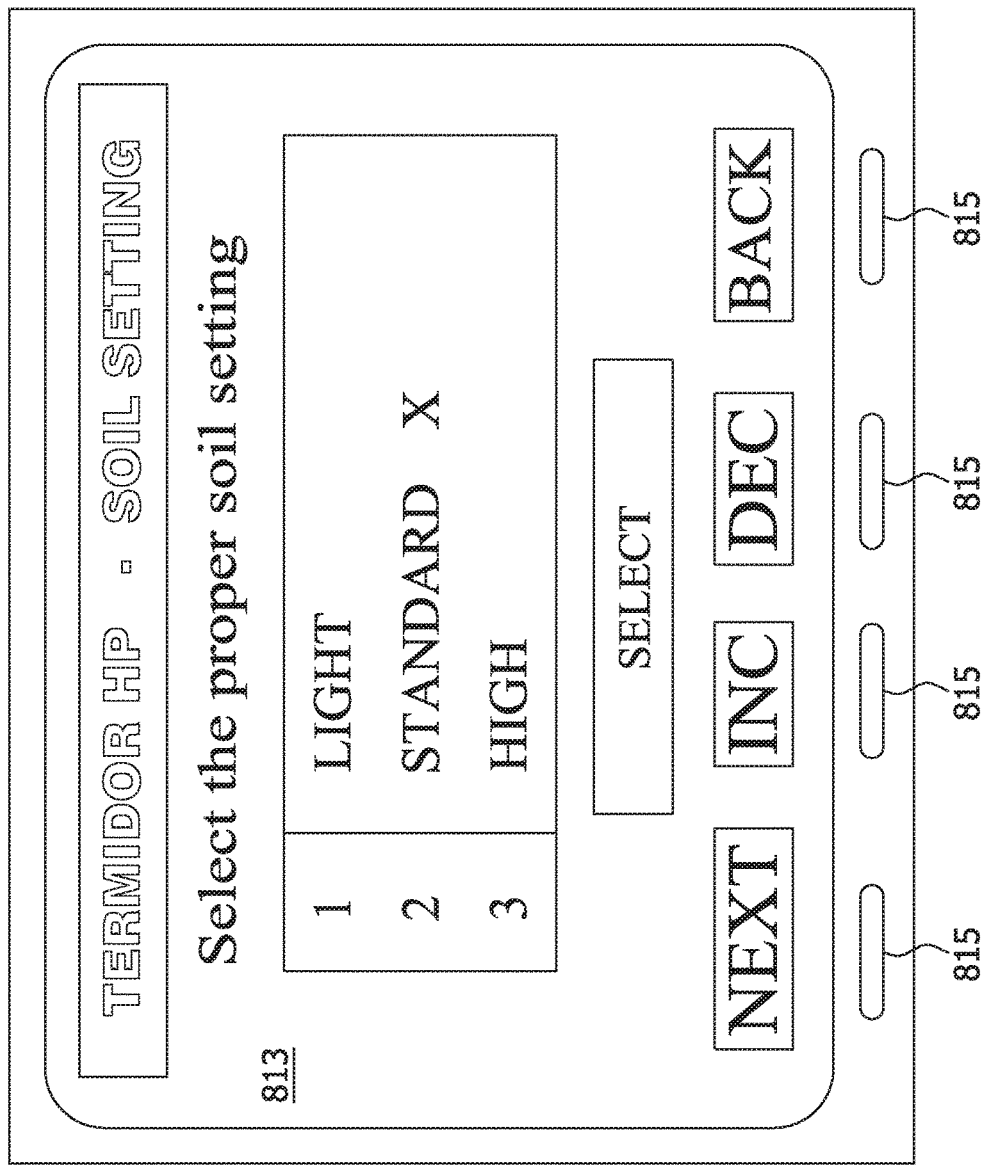
Figure 50:
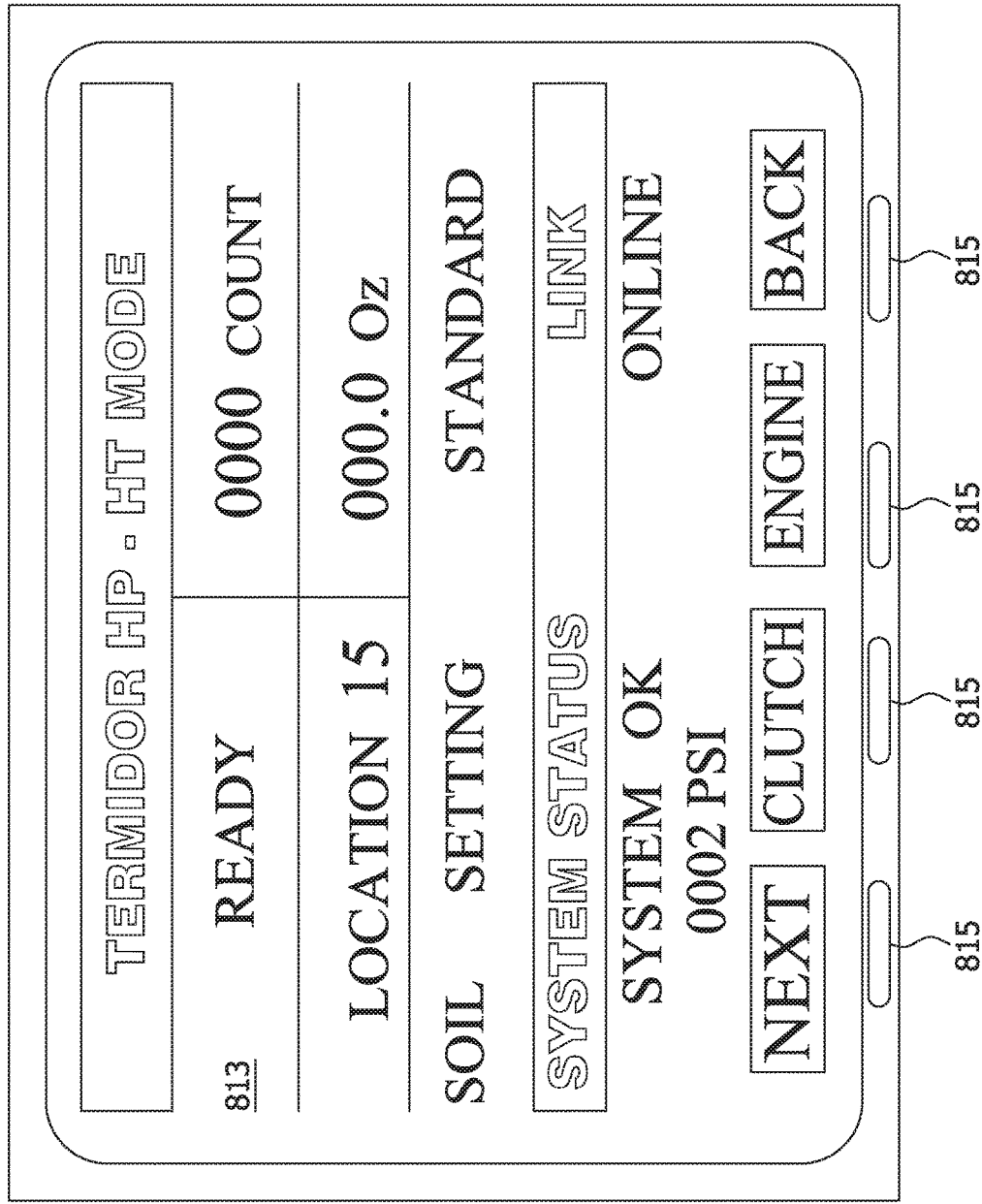

FIGS. 48-50 are screen shots that appear on the display screen 813 of the application tool control system 799 (i.e., the second control system, which is on the high pressure application tool 712) when the apparatus 710 is operated in its high pressure mode. FIG. 48, for example, is the first screen that appears upon powering on the high pressure application tool 712. The display unit of the application tool control system 799 includes a display screen 813 and push buttons 815 similar to the display unit of the supply cart control system 799. It is understood, however, that the display unit may comprise a touch screen or other suitable user interface without departing from the scope of this disclosure. In addition to the time, date and operating software version, this screen includes a START selection and an LCD selection. Making the LCD selection allows the operator to change one or more display screen settings, such as backlight and the like, as discussed above with reference to FIGS. 42 and 43. The operator makes the START selection when operation of the high pressure application tool 712 is ready to commence. As one safety feature, the START selection on the display unit of the application tool control system 799 will not be operational to change the display screen 813 unless setup of the supply cart control system 792 is complete, such as by completing the setup up through and including the SELECT MODE screen (and the operator must have selected the HT selection on the SELECT MODE screen).

When set up of the supply cart control system 792 is completed and the START selection on the display screen 813 of the application tool control system 799 is selected, the display screen of the application tool control system changes to the SOIL SETTING screen shown in FIG. 49. The same selections (LIGHT, STANDARD and HIGH) are displayed on the SOIL SETTING screen of the high pressure application tool 712 as are displayed on the SOIL SETTING screen (FIG. 40) of the supply cart control system 792. As long as a connection is established between the application tool control system 799 and the supply cart control system 792, such as by the wireless connection in the illustrated embodiment, by electrical connection or by other suitable connection, when the operator makes a soil type selection on the SOIL SETTING screen of the application tool control system the soil type setting selected on the SOIL SETTING screen of the cart supply control system is overridden. This allows the operator to reassess the soil type after having moved the high pressure application tool 712 to a location remote from the supply cart 714.

Once the NEXT selection is made to select the soil type on the SOIL SETTING screen, the HT MODE screen of FIG. 50 is displayed indicating that the high pressure application tool 712 is ready for operation in the high pressure mode of the apparatus. The HT MODE screen displays the location number and soil type setting, pressure and the running number of injections and the total amount of active ingredient (e.g., concentrated termiticide) used in performing a treatment in the high pressure mode of the apparatus 710. Also included on the HT MODE screen is a SYSTEM STATUS identifier. If below the SYSTEM STATUS the identifier SYSTEM OK appears, then the high pressure application tool 712 is operationally ready. The SYSTEM STATUS updates after each injection. If the high pressure tool 712 is not operationally ready the identifier will provide an error message and/or alarm to indicate as such. For example, if the concentrate reservoir 784' on the high pressure application tool 712 is empty or otherwise not flowing to the manifold, or if the operating pressure falls below a predetermined minimum pressure, the SYSTEM STATUS will provide an indication of such an issue. A LINK status identifier is also displayed to indicate to the operator whether the application tool control system 799 has an established communication link with the supply cart control system 792. An identifier of ONLINE indicates that the link is established, while an OFFLINE identifier indicates that no link is established.

Along the lower edge margin of the display screen 813 are four selection options, including NEXT, CLUTCH, ENGINE and BACK. The BACK selection changes the display screen back to the SOIL SETTING screen. The CLUTCH selection communicates with the supply cart control system 792 to disengage the clutch mechanism 791 to pause delivery of the pressurized fluid. The ENGINE selection communicates with the supply cart control system 792 to shut off the engine 788 to cease operation of the apparatus 710. Thus, the operator has some control over the supply cart 714 from the remote location of the high pressure application tool 712. The NEXT selection also changes the display screen back to the SOIL SETTING screen.

In one embodiment, the application tool control system 799 includes sufficient memory storage, such as temporary memory storage, so that if the communications link between the application tool control system and the supply cart control system 792 is lost during operation of the apparatus 710 in the high pressure mode, the application tool control system will temporarily store the injection related data displayed on the HT MODE screen (FIG. 50)—e.g., at least the injection count and pressure, and optionally the amount of active ingredient used. When the link is reestablished, the temporarily stored data is automatically transmitted to the supply cart control system 792. It is also contemplated that additionally, or alternatively, the application tool control system 799 may be configured to communicate directly with the remote data management system 801.

With reference again to FIG. 28, in one embodiment a data management system associated with the apparatus 710 generally comprises the remote data management system 801. In the illustrated embodiment, the remote data management system 801 may be used by the pest control company 901 for a number of business operation management related activities including, without limitation, collecting data from the various treatments applied under the work order identifiers, managing each apparatus 710 being used by multiple different operators (as well as multiple different branch locations, where applicable) of the pest control company, tracking servicing and repair of each apparatus 710, tracking the length of treatments applied at work sites under the work order identifiers, tracking active ingredient usage and tracking billing related data. The pest control company 901 includes at least a communication device, such as a computer, wireless phone, or other suitable device capable of transmitting to and receiving data from the remote data management system 801.

In one exemplary embodiment, the remote data management system 801 comprises an internet website accessible by the pest control company 901 and having user input capabilities to allow the pest control company 901 to transmit data (i.e., upload data such as by inputting data or changing data on one or more web pages) to the remote data management system 801 and to receive data from (i.e., to at least review data displayed on one or more pages, and in some embodiments to also download data from the website) the remote data management system 801. In a particularly suitable embodiment, the remote data management system

801 may include a database in which data collected during the various treatments in accordance with work order identifiers, and/or data input by the pest control company 901 (broadly, provided data), is stored and displayed in an organized manner as discussed in further detail later herein and shown in FIGS. 51-68. The remote data management system 801 may also include one or more processors (not shown) for determining one or more metrics or other analytical information based on the collected data, the provided data, or combinations thereof.

Still referring to FIG. 28, the data management system 801 may also be used by an owner 903 of the apparatus 710 (which may be the manufacturer of the apparatus or a purchaser of the apparatus within the scope of this disclosure) wherein the owner leases the apparatus to the pest control company 901 (broadly, a soil treatment business). In such an embodiment, the owner 903 may lease the apparatus to the pest control company 901 under terms that require a lease fee by itself, or alternatively or additionally require a usage fee based on the data collected by the base unit control system 792 and transmitted to the remote data management system 801 upon usage of the apparatus 710 by the pest control company. As illustrated in FIG. 28, data collected during operation of the apparatus 710 is transmitted to the remote data management system 801 via the remote communication control system 802. The data in one embodiment is stored in a database of the remote data management system 801 and is accessible by the apparatus owner 903 in the same manner discussed above in connection with accessibility by the pest control company 901. It is contemplated that in some embodiments the remote data management system 801 may be configured such that the pest control company 901 has limited access to the data stored by the remote data management system, while the apparatus owner 903 may also have limited access to other data or may have access to all of the data. It is also understood that the pest control company 901 may have different (e.g., more restricted) access to the database for inputting data to or making changes to the database than that of the apparatus owner 903.

As one example, the apparatus owner 903 may have sufficient access to the database to set up and enter information (e.g., provided data) relating to the pest control company 901 (i.e., the entity that is licensing the apparatus 710), such as, without limitation, identification information associated with each licensed apparatus 710, contact information, maintenance and servicing data relating to each licensed apparatus, business units (e.g., branch offices and/or operators) of the pest control company, etc. As illustrated in FIG. 28, the collected data is used by the apparatus owner 903 to determine usage fees associated with actual use by the pest control company 901 of the apparatus 710. The apparatus owner 903 then communicates, such as by electronic invoicing, the usage fees and, where applicable, a fixed leasing fee, to the pest control company 901, either by direct electronic communication with the pest control company or via the remote data management system 801. In one embodiment, the usage fees are determined by a suitable processor of the remote data management system 801. In other embodiments, the apparatus owner 903 may download collected data (from the remote data management system 801) and/or data input by the pest control company 901 (and associated with a work order identifier) that is needed for determining the usage fees and the apparatus owner may have its own computer with a suitable processor for determining the usage fees based on the collected data. For example, in one embodiment the usage data may be based on the total linear feet of work site area that was treated at each work site.

Figure 51:
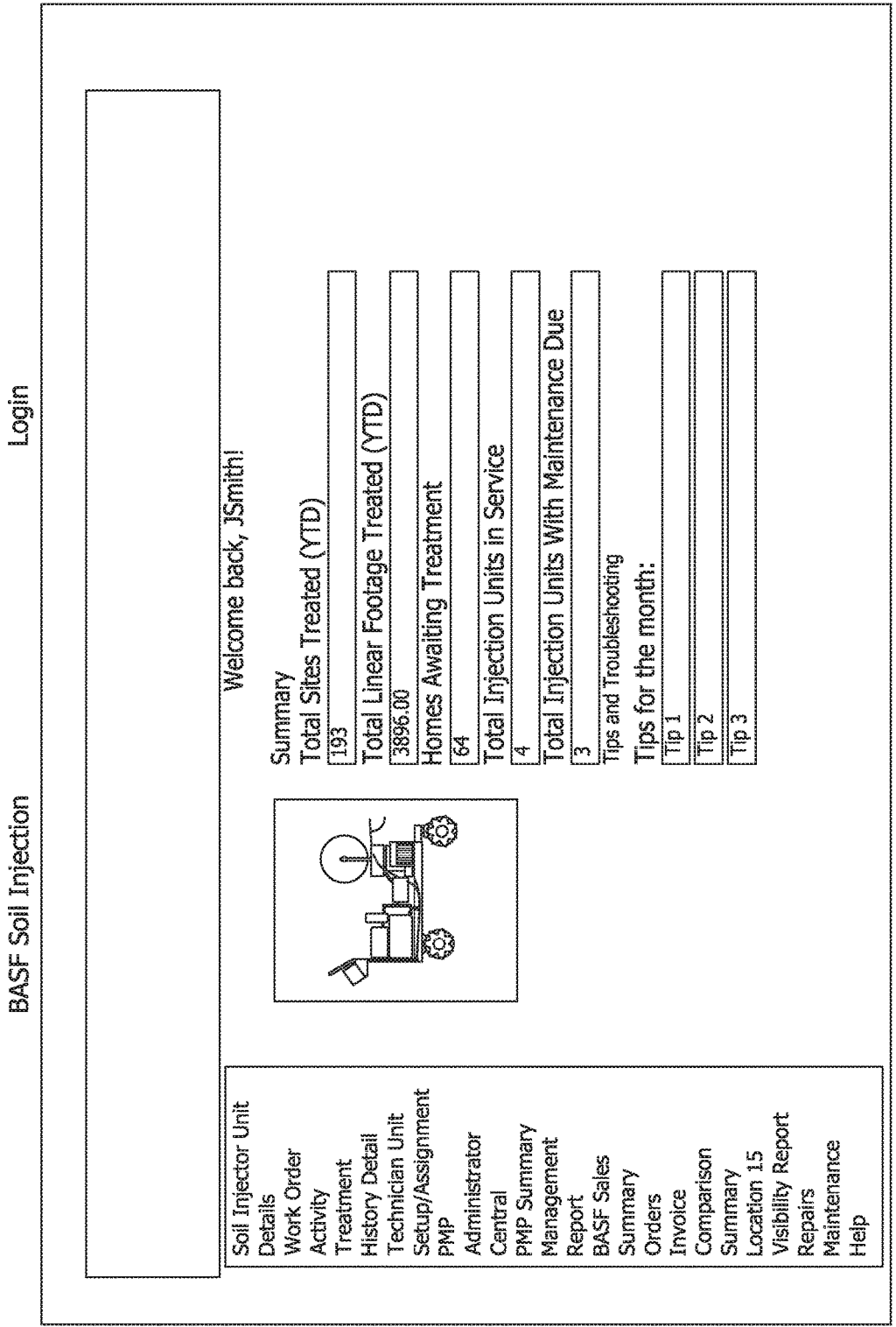

FIGS. 51-68 are screen shots of various display screens accessible by the pest control company 901, by the apparatus owner 903, or both, on the website of the remote data management system 801. FIG. 51 is the first screen that appears upon accessing the system 801. Where the pest control company 901 accesses the system 801, a summary is provided, based on historical collected data as well as data input (i.e., provided data) by either the pest control company or the apparatus owner 903. For example, the illustrated summary includes the total number of work sites treated (year to date); total linear footage treated (year to date); homes (e.g., work orders) awaiting treatment; the total number of apparatus 710 being leased by the pest control company 901; and the total number of injection units with maintenance coming due.

Down the left hand side of the screen of FIG. 51 is a list of selection options, the selection of which allows the user to access additional functions of the remote data management system 801. The list shown in FIG. 51 is an exemplary list of selection options that would appear on the first screen in the event that the apparatus owner 903 accesses the remote data management system 801. In the event that that the pest control company 901 accesses the remote data management system 801, a limited list of the selection options would appear, such as, without limitation, the Soil Injector Unit Details, the Work Order Activity, the Treatment History Detail, the Technician Unit Setup/Assignment, the PMP Administrator Central, the PMP Summary Management Report, the Invoice Comparison Summary, the Maintenance and the Help selection options.

Figure 52A:
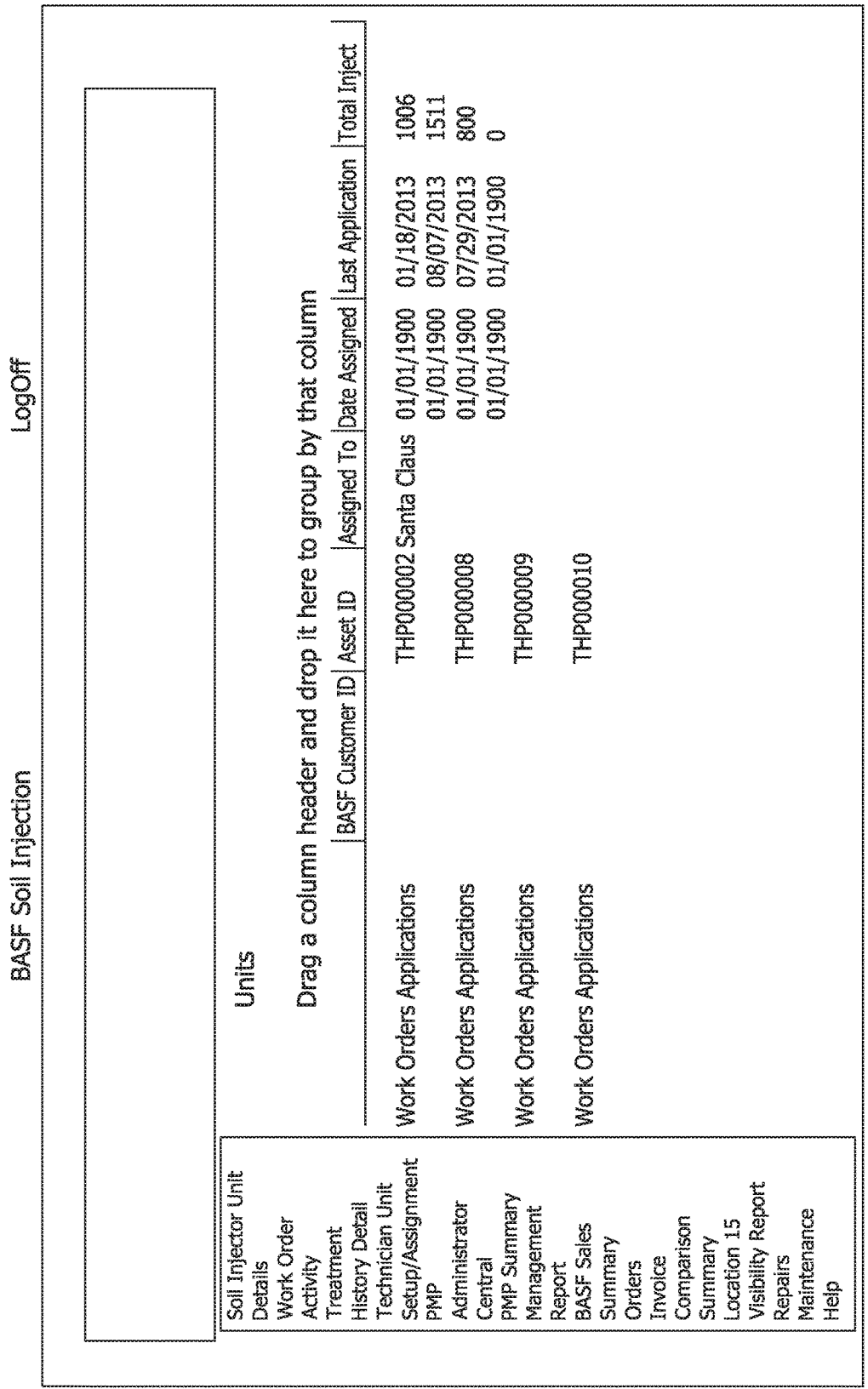

Upon selecting the Soil Injector Unit Details selection option, the screen shown collectively in FIGS. 52a, 52b is displayed. The screen displays, in a table format, information relating to each apparatus 710 (referred to in the remote data management system 801 as a soil injection unit), e.g., each apparatus 710 leased by a pest control company, such as the "Asset ID," which is an identification code assigned to the apparatus; the particular pest control company operator assigned to use the apparatus (under the "Assigned To" column); the date that the Asset ID was assigned to the apparatus; the last date that the apparatus was used to perform a soil treatment ("Last Application"); the total number of injections (based on collected data from the apparatus 710) performed over the lifetime of the apparatus, the total accumulated run time (based on collected data from the apparatus 710) and the next scheduled maintenance due date for the apparatus.

Each column header may be selected to regroup the information based on the information in that column. The default, as shown in FIGS. 52a, 52b, is in order of the Asset ID. To the left of the columns, in each row, are two further selection options, namely, Work Orders and Applications. Selecting the Work Orders option in a particular row (e.g., associated with a particular Asset Id), causes the remote data management system 801 to display the screen shown in FIG. 53. This screen displays, also in table format, information related to each work order under which the apparatus 710 was used to perform a soil treatment at a work site. The information includes (by column, from left to right), the fourteen locations that the base unit control system 792 for the selected apparatus 710 (i.e., the selected Asset ID) is able to temporarily store upon downloading from the remote data management system 801, the work order identifier associated with each location, the geographical address, city and state of the work site associated with the work order identifier, the linear footage (as determined by the pest control company 901), i.e., the work area to be treated at the work site, and an indicator of whether the work order identifier has been transmitted to the base unit control system 792 of the apparatus 710 upon start-up of the base unit control system as described previously herein.

From this screen, a user, and more particularly the pest control company, can edit the work order information, such as when a work order or work orders have been completed and a new work order is to be input and transmitted to the apparatus 710 upon the next start-up of the base unit control system 792. A work order may be edited from this screen, or it may be deleted and either replaced with a new work order or one of the locations may be left with no associated work order identifier. Adjacent the upper left corner of the screen shown in FIG. 48 the selection option Go To Field Unit List allows the user to go back to the Soil Inject Unit Details screen of FIGS. 52a, 52b.

Also adjacent the upper left corner of the screen shown in FIG. 53 is the View Treatments selection option. Selecting the View Treatments selection option transitions the screen to the Application History screen shown collectively in FIGS. 54a and 54b. The Application History screen is also reachable from the Soil Injector Unit Details screen of FIGS. 52a, 52b by selecting the Applications selection option. The Application History screen displays, in table format, a historical record of all soil treatments that have been applied using the particular selected apparatus 710 (i.e., the particular Asset Id). Each row of the table includes information and collected data related to specific soil treatment (e.g., a specific work order identifier). The information and collected data includes, from left to right across the table, the address, city and state of the work site at which the soil treatment was applied; the linear footage treated at the work site; the latitude and longitude coordinates of the work site; the Application ID; the date and time of the application (i.e., the Date Stamp); the product (e.g., active ingredient) selected using the base unit control system 792; the soil type setting selected using the base unit control system; the injection time that was set by the base unit control system upon selecting the soil type setting; and the pre-set dosing volume for the active ingredient in the high pressure mode.

Further along the table is the Total Ounces of active ingredient delivered in the high pressure mode, the total gallons of soil treatment delivered in the high pressure mode; the Flow Rate of the carrier liquid in the low pressure mode of the apparatus 710; the Dosing Volume of the active ingredient (i.e., the selected mixture ratio) in the low pressure mode of the apparatus; the Total Ounces of active ingredient delivered in the low pressure mode; the Total Gallons of soil treatment delivered in the low pressure mode; the sum of the Total Ounces of active ingredient in the high pressure mode and the low pressure mode; the sum of the Total Gallons of soil treatment delivered in the high pressure mode and the low pressure mode; the Start Time of the soil treatment performed at the work site pursuant to the specific work order identifier; and the Total Minutes (e.g., the total time, in minutes) needed to complete the soil treatment at the work site in accordance with the specific work order identifier.

While not shown in the drawings, additional screens that may be reached solely by the apparatus owner 903 upon selecting the Soil Injector Unit Details selection option include, without limitation, a Deactivate Unit screen at which the apparatus owner can deactivate the status of a particular apparatus 710, such as where the apparatus is to be taken out of service, or where the pest control company 901 has failed to make payments under the lease arrangement with the apparatus owner 903; and a Reactivate screen at which the status of a particular apparatus 710 may be reactivated by the apparatus owner. A Lease Billing screen (not shown) at which the apparatus owner 903 can update the status of a particular apparatus 710 as being the subject of a lease arrangement in which the pest control company 901 is billed a monthly lease fee along with the usage fees may also be selected under the Soil Injector Unit Details selection option. The Lease Billing screen in one embodiment is also accessible by the pest control company 901.

With reference back to FIG. 51, selecting the Work Order Activity selection option causes the screen shown in FIG. 55 to be displayed. This screen is similar to the Soil Injector Unit Details screen of FIGS. 42a, 42b, with the exception that from this screen a user (e.g., the pest control company 901) can search for particular apparatus 710 information using the Asset ID, the name of the operator assigned to the apparatus, or other information stored in the database in association with a particular apparatus. A Select option appears at the beginning of the row of information displayed for the apparatus located as a result of the search. Selecting the Select option causes the Work Order information screen of FIG. 53 to be displayed.

From the Treatment History Detail selection option of FIG. 51, two further selection options are available, including a Summary of Treatments by Site selection option and a Search for a Site selection option. Selecting the Summary of Treatments by Site selection displays the screen shown in FIG. 56. This screen displays the same information as in the screen of FIGS. 54a, 54b (with only the left side of the screen being shown in FIG. 51), with the exception that all of the work orders performed by the pest control company 901 are displayed, arranged by the address of the work site. The upper left corner of the screen of FIG. 56 provides the apparatus owner 903 the ability to select which treatment history to review from among the different pest control companies 901 that lease apparatus 710 from the apparatus owner. This selection option is not displayed when the pest control company 901 itself accesses the Treatments by Site screen. The Search for a Site selection option displays the screen of FIG. 57, which is substantially the same as the screen of FIG. 56, but with the added ability to search for treatments performed at a particular work site.

Selecting the Technician Unit Setup/Assignment selection option from the screen of FIG. 51 causes the Change Unit Tech Assignment Wizard screen of FIG. 58 to be displayed. At this screen, the user, and more particularly the pest control company 901, can select a particular one of its operators to be assigned to a particular apparatus 710 (i.e., associated with a particular Asset ID). This allows the pest control company 901 to consider various soil treatment metrics (e.g., time of treatment, efficiency, apparatus operation, etc.) on a per operator basis.

Selecting the PMP Administrator Central selection option from the screen of FIG. 51 displays the screen of FIG. 59, which is accessible by both the apparatus owner 903 and the pest control company 901. This screen allows the user to input and edit customer contact information and other lease information (i.e., for each pest control company that leases apparatus 710 from the apparatus owner). For example, in the illustrated embodiment of FIG. 59 the user (e.g., the apparatus owner 903 or a designated administrator for the pest control company 901) can input and edit information including the name of the pest control company and the address thereof. In the lower right corner of the screen of FIG. 59 is a table that identifies each of the apparatus 710 (e.g., by Asset ID, or Name as it appears in the table of FIG. 54) leased by the particular pest control company 901; the Active Since date from which each particular apparatus 710 was leased to the particular pest control company 901; the particular operator to whom the particular apparatus 710 is assigned to; and a View selection option for viewing the Lease History of each particular apparatus 710. Upon selecting the View selection option for a particular apparatus 710, the pop-up screen shown in FIG. 60 is displayed to provide lease information for that particular apparatus including, without limitation, the most recent Bill Date under the lease arrangement; the Billing Period covered by the Bill Date; the Lease Month covered by the Billing Period; and the Remaining Months left under the lease arrangement.

Figure 61:
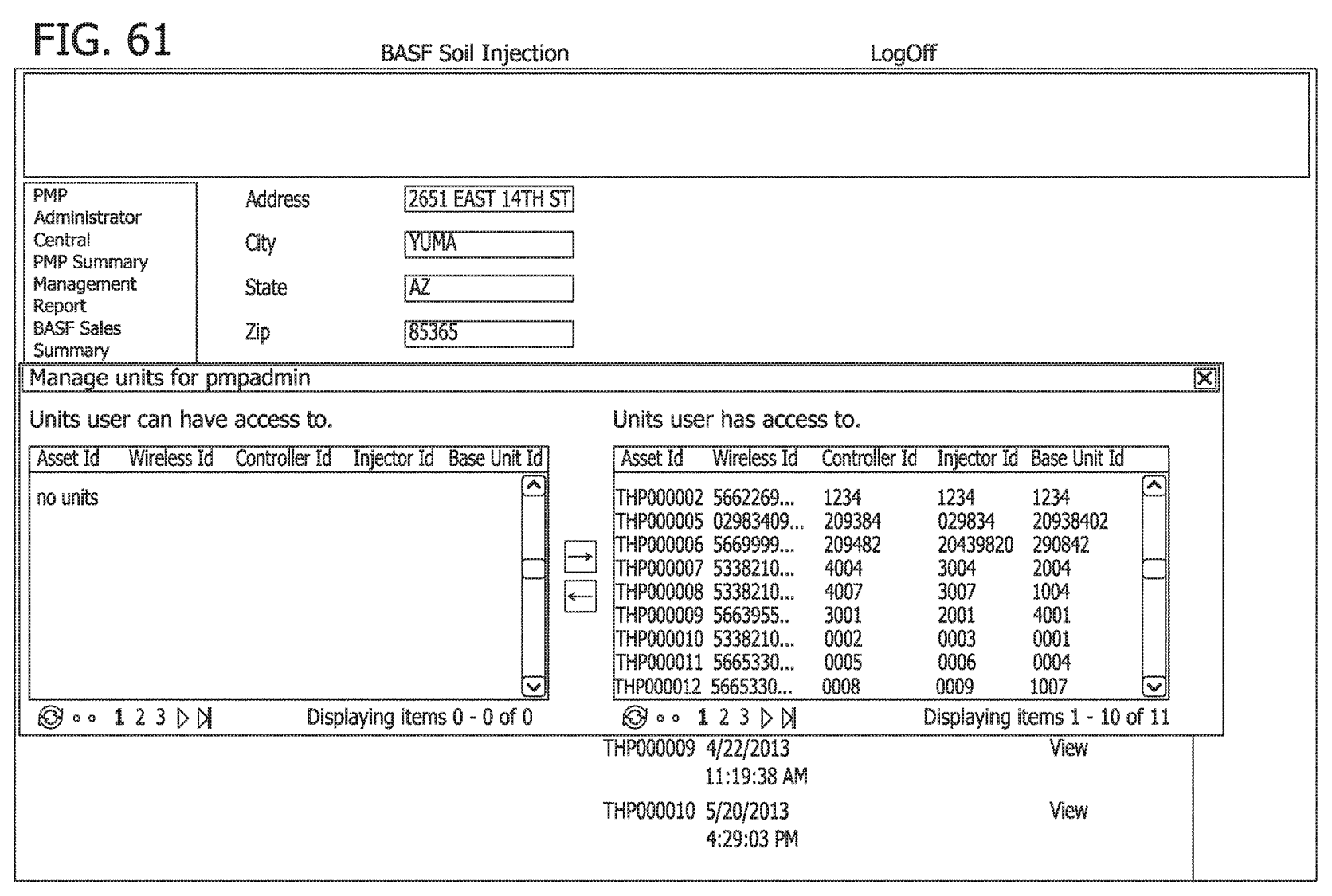

In the lower left corner of the screen of FIG. 59 is a second table that identifies three levels of administration for the pest control company 901, namely, the Technician role (i.e., the operator of apparatus 710), the PMP Admin (i.e., the administrator for the pest control company 901, and the Branch Office (i.e., the administrator of a particular branch office of the pest control company). Each can be edited by selecting the Edit selection option to the right of each respective administration level. For example, FIG. 61 illustrates a pop-up screen that is displayed upon selecting the Edit selection option adjacent the PMP Admin administration level. The PMP Admin administration level is the highest level, and thus the pop-up screen identifies the pest control company administrator as having access to a list of all of the apparatus 710 (i.e., Asset IDs) leased by the pest control company 901.

The pop-up screen of FIG. 61, for each of the listed apparatus 710 (i.e., Asset IDs), further includes a Wireless ID (i.e., an identification code for the wireless communication used between the base unit control system 792 and the high pressure application tool control system 799). A Controller ID, an Injector ID (i.e., an identification number for the high pressure application tool), and a Base Unit ID are also provided.

By using the Edit selection option adjacent the Branch Office, the pop-up screen of FIG. 62 is displayed. This screen identifies 1) a table (on the left side of the screen) indicating which of the apparatus leased by the pest control company the branch office may have access to, and 2) a second table (on the right side of the screen) indicating which of the apparatus leased by the pest control company the branch office currently has access to. The administrator of the pest control company 901 can edit this screen and reassign access rights to the branch office for various ones of the apparatus 710 leased to the pest control company. The administrator can also shift accessibility of the apparatus 710 between the two tables of the pop-up screen of FIG. 62 using the arrow selection options disposed between the two tables. In one embodiment, an administrator of the branch office that accesses the remote data management system 801 may be granted access rights only to modify the branch office level information.

Referring back to FIG. 59, upon placing the cursor over the name adjacent in the Technician administrative level, e.g., in the Name column, causes a pop-up window (not shown) displaying the various operators that may be assigned to the one or more apparatus 710 leased by the pest control company 901. A particular operator can be selected and the name of the operator appears in the table. By selecting the Edit selection option adjacent the Technician administrative level, the pop-up screen of FIG. 63 is displayed. This screen includes two tables, with the table on the left identifying all apparatus 710 (i.e., Asset IDs) that the operator can have assigned to him or her, and the table on the right identifying all apparatus that the operator has been already assigned. The listed apparatus 710 may be switched, e.g., by the pest control company administrator or branch office administrator from one table to the other on this pop-up screen using the arrow selection options disposed between the two tables.

From the screen shown in FIG. 51, selecting the PMP Summary Management Report causes the screen collectively shown in FIGS. 64a and 64b to be displayed. This screen provides a table, for a particular pest control company, with analytical information determined using collected data (i.e., data collected during operation of the apparatus 710 to complete work orders), using provided data (i.e., data that is input by the pest control company and/or by the apparatus owner), or by using a combination of both collected data and provided data. The information provided in the table includes, on a month-to-month basis (and from left to right across the table), the Total Linear Feet Treated, e.g., as a basis of the linear feet input (i.e., provided data) by the pest control company 901 for each work order identifier; Average Linear Feet Treated Per Site, e.g. as determined by the remote data management system 801 processor as a function of the Total Linear Feet Treated (i.e., provided data) and the number of work sites treated (also provided data); the Total Number of HT Injections (i.e., the total number of injections (based on collected data) using the high pressure application tool in the high pressure mode); and Average HT Injections Per Site (i.e., determined by the processor of the remote data management system 801 as the total number of injections divided by the total number of work sites treated).

Further provided in the table of the display collectively shown in FIGS. 64a and 64b is the Total SA Gallons (collected data; the total volume in gallons of soil treatment delivered in the low pressure mode); the Total SA Gallons Per Site (collected data and provided data; determined by the processor as the total volume of the soil treatment delivered in low pressure mode divided by the total number of work sites treated); the Total Ounces of Active Ingredient Applied (which is based solely on collected data and is based on active ingredient applied in both the high pressure mode and the low pressure mode); the Average Ounces of Active Ingredient Applied Per Site (based on collected data and provided data; determined by the processor as the total ounces of active ingredient applied divided by the total number of work sites treated); the Total Sites Treated (i.e., the total number of work sites treated); the Average Sites Treated Per Day; the Average Time Per Site (based on collected data; determined by the processor as the total time, in minutes, spent at all work sites divided by the number of work sites); and the Total Hours of Use (based on collected data, i.e., on the start time and completed time tracked by the base unit control system 792). The pest control company 901 can use this information to assess things such as the rate at which it uses active ingredient (e.g., to make sure that it purchases sufficient quantities of active ingredient); efficiency, such as based on the average time it takes to treat each work site; how much effort is expended in the high pressure mode versus the low pressure mode; which months are busier than other; and other information of interest.

The Sales Summary screen, which is displayed as a result of selecting the Sales Summary selection option on the screen of FIG. 51, is shown in FIG. 65. This screen is accessible solely by the apparatus owner 903 and displays, for a particular selected customer (i.e., a particular pest control company 901 selected from among the various pest control companies leasing apparatus 710 from the apparatus owner), the Total HP Units (i.e., the total number of apparatus leased by the pest control company 901); the Total Lease Dollars Billed to the pest control company 901 (year to date); the Total Linear Feet Treated (year to date) by the pest control company 901; the Operational Use Fees Billed (year to date) to the pest control company 901; the total active ingredient Ounces Applied (year to date) by the pest control company 901; the Total Revenue Billed; the Average Billing Per Site; the Average Billing Per Linear Foot; and the Average Jobs (i.e., work sites) Treated Per Day. In the illustrated embodiment, the operational use fees billed to the pest control company 901 are based solely on the total linear feet treated by the pest control company, i.e., based solely on provided data (e.g., data provided by the pest control company 901 and/or the apparatus owner 903). It is understood, however, that in other embodiments the usage fees may additionally or alternatively be based on any of the collected data, such as the number of injections, gallons of soil treatment applied or other suitable collected data.

The Invoice Comparison Summary selection option of the screen of FIG. 51 causes the screen of FIG. 66 to be displayed. The Invoice Comparison Summary screen is accessible by the pest control company 901 and provides information to the pest control company for use in comparing the information to the information used by the apparatus owner 903 as the basis for billing the pest control company. For example, in the illustrated embodiment the information is provided in a table displayed on the Invoice Comparison Summary screen and includes, without limitation, the Date of Service (that a particular soil treatment was performed pursuant to a work order identifier); the Customer Name (i.e., the pest control company 901); the GPS coordinates of the work site location; the Linear Feet that was treated; the Billing Period covered by the invoice in which the pest control company 901 was billed for the usage fees relating to the particular soil treatment); the Operation Usage (e.g., the basis—such as the linear feet of treatment—for the amount billed); and the Work Order identifier. At the top of the screen of FIG. 66, the pest control company 901 administrator may select a particular Technician (i.e., operator), so as to review the basis for invoices received on soil treatments rendered by a particular operator. The pest control company 901 administrator may also Select a Billing Period to review invoice information for that particular time period.

The Repairs selection option on the screen of FIG. 51 is accessible only by the apparatus owner 903 and upon selection causes the screen of FIG. 67 to be displayed. In particular, this screen displays an editable table with information relating to the repair status of apparatus 710 that are being serviced by the apparatus owner. The information includes, without limitation, the Asset ID of the apparatus; an RMA number; the Repair Status (such as, e.g., "Working", "Received" or "Completed"); the Repair Type (e.g., the nature of the repair); the Repair Time; whether a repair has been Completed; Notes; and Diagnosis. As an alternative to viewing all of the apparatus 710 in for servicing, the apparatus owner 903 may search for a particular apparatus, and more particularly a specific Asset ID.

The Maintenance selection option on the screen of FIG. 51 is accessible for editing by the apparatus owner 903 or for viewing by the pest control company 910 and upon selection allows the apparatus owner to 1) select a particular apparatus 710 (e.g., by Asset ID) to identify as having had its maintenance completed; 2) view a maintenance log for a particular apparatus 710 (e.g., by Asset ID); and 3) view a Completion History Report as shown in FIG. 68. The Completion History Report identifies, by Asset Id, information relating to completed maintenance actions (on a per maintenance action basis). For example, in the illustrated embodiment, for each maintenance action, the Report (in table form) provides the Asset ID of the apparatus 710; the Component requiring the maintenance; the Last Maintenance Usage (in hours); the Next Maintenance Usage (e.g., the number of hours of usage before the next maintenance should be scheduled); the Last Maintenance Date; and the Next Maintenance Date.

A Help selection option is also available on the screen of FIG. 46, which causes one or more Help screens (not shown) to be displayed for guidance on using the remote data management system 801. It is also to be understood that the selection options available, for example, down the left side of the screen of FIG. 51 are in one embodiment available on every screen so that the user may select any of the selection options at any time during usage of the remote data management system 801.

The methods, apparatus, and systems described herein facilitate applying soil treatment to the ground. In particular, in one suitable embodiment, a system for managing a soil treatment business is described. The system includes an injection apparatus operable to inject soil treatment under high pressure down into soil. The system also includes a control system associated with the injection apparatus and configured to collect data during operation of the injection apparatus. The system further includes a data management system configured for receiving the data collected by the injection apparatus control system. The data management system includes a database for storing the collected data. The data management system is accessible by the business for reviewing the collected data.

In another suitable embodiment, the data management system is configured for remote communication with the injection apparatus control system. In another embodiment, the data management system is accessible by the business from a location remote from the data management system.

In another suitable embodiment, the data management system further includes at least one processor configured to determine at least one characteristic of the soil treatment based at least in part on the data collected by the injection apparatus control system.

In still another embodiment of the system, the collected data includes one or more of the number of injections performed by the injection apparatus, the amount of active ingredient delivered by the apparatus, the amount of soil treatment delivered by the apparatus, the type of soil into which the apparatus injected the soil treatment, the pressure at which the apparatus was operated to perform the injections, and the time needed to complete a soil treatment using the injection apparatus.

In yet another embodiment, the data management system is further configured to receive data provided by the business and associated with the injection apparatus. The provided data includes at least one work order associated with a soil treatment to be applied by the injection apparatus at a work site. The control system associated with the injection apparatus is configured to receive the at least one work order and is further configured to inhibit operation of the injection apparatus in the absence of a work order being received by the control system.

In another suitable embodiment, the data management system is further configured to receive data provided by the business and associated with the injection apparatus. The provided data includes at least one work order associated with a soil treatment to be applied by the injection apparatus at a respective work site. The data management system further includes at least one processor configured to determine based on the collected data, for each apparatus, one or more of the total number of injections performed by the apparatus for one or more of a single work order and a plurality of work orders, the total amount of active ingredient delivered by the apparatus for one or more of a single work order and a plurality of work orders, the total amount of soil treatment delivered by the apparatus for one or more of a single work order and a plurality of work orders, the total number of work sites treated by the apparatus, the operating time for the apparatus for each work order, and the cumulative operating time for the apparatus for all work orders.

In addition, in another embodiment, the at least one processor is configured to determine for the injection apparatus, based on the collected data and provided data, one or more of the average number of injections per work site, the average amount of active ingredient delivered per work site, the average amount of soil treatment delivered per work site, and the average time to complete each work order. In a further embodiment, the provided data further includes the linear feet of the work site to which the soil treatment is to be applied for each corresponding work order. The at least one processor is further configured to determine one or more of the average number of injections per linear foot, the average amount of active ingredient delivered per linear foot, and the average linear feet per work site.

In another embodiment, the data management system includes data indicative of a time period of interest to the business. The at least one processor is operable to determine one or more of the following: the total number of injections performed by the apparatus for one or more of a single work order and a plurality of work orders completed during said time period; the total amount of active ingredient delivered by the apparatus for one or more of a single work order and a plurality of work orders completed during said time period; the total amount of soil treatment delivered by the apparatus for one or more of a single work order and a plurality of work orders completed during said time period; the total number of work sites treated by the apparatus during said time period; the operating time for the apparatus for each work order completed during said time period; and the cumulative operating time for the apparatus for all work orders completed during said time period. In addition, in another embodiment, the time period is one month.

In still another embodiment, the system includes a plurality of the injection apparatus and a plurality of control systems. Each control system is associated with a corresponding injection apparatus. The data management system is configured for communication with each control system to receive data collected by each respective control system in response to operation of the corresponding injection apparatus. The at least one processor is configured to determine, based on the collected data, one or more of the total number of injections performed by all apparatus, the total amount of active ingredient delivered by all apparatus, the total amount of soil treatment delivered all apparatus, and the total number of work sites treated by all apparatus. Furthermore, in another embodiment, the at least one processor is further configured to determine, based on the collected data and provided data, one or more of the average number of injections per work site, the average amount of active ingredient delivered per work site, the average amount of soil treatment delivered per work site, and the average time to complete each work order.

Still, in another embodiment, the system further includes a low pressure application tool separate from the injection apparatus and operable to apply soil treatment one or more of on and in the soil under pressure substantially less than the pressure at which the injection apparatus is operated. The control system is further associated with operation of the low pressure application tool and further configured to collect data during operation of the low pressure application tool. The at least one processor is configured to determine, based on the collected data and provided data, one or more of the following: the total number of hours of operation of the injection apparatus and low pressure application tool; the total number of hours of operation of the injection apparatus; the total number of hours of operation of the low pressure application tool; and the difference between the total number of hours operated and a predetermined number of hours after which one or more of maintenance, inspection, and calibration is recommended.

In another suitable embodiment of the system described above, the data management system is one of hardwire connected to the injection apparatus control system for transferring the collected data from the control system to the data management system, configured for releasable hardwire connection to the injection apparatus control system for transferring the collected data from the control system to the data management system, and configured for receiving a transportable data storage media containing the collected data from the control system.

In one suitable embodiment, a lease management system for managing a lease arrangement pursuant to which a soil treatment system is leased by the owner of the soil treatment system to a soil treatment business is described. The soil treatment system includes an application tool operable to apply an active ingredient to soil. The lease management system includes a control system associated with the application tool and configured to collect data during operation of the application tool. The lease management system also includes a data management system configured for receiving owner provided data including at least the identification of the soil treatment business that is leasing the application tool from the owner, and business provided data including at least a work order for a soil treatment to be performed at a work site. The data management system is configured for communication with the control system of the application tool to receive the data collected by the application tool in performing the soil treatment at the work site pursuant to the work order. The data management system includes at least one processor configured to determine a usage fee to be charged to the business by the owner as a function of one or more of the business provided data and the data collected by the application tool control system.

In another suitable embodiment of the lease management system, the owner provided data received by the data management system further includes at least a lease fee to be charged to the business by the owner for each of a plurality of lease periods. The at least one processor of the data management system is configured to determine a total fee to be charged to the business by the owner as a function of the lease fee and the usage fee.

In another embodiment, the business provided data received by the data management system includes a plurality of work orders. Each work order is for a soil treatment to be performed using the application tool at a work site. The data management system is configured for communication with the control system of the application tool to receive the data collected by the application tool in performing each soil treatment at each respective work site pursuant to each respective work order. The at least one processor of the data management system is configured to determine a total usage fee to be charged to the business by the owner for operating the application tool pursuant to all of the work orders. In addition, in one embodiment, the business provided data includes a billing period. The at least one processor is further configured to determine a total usage fee to be charged to the business by the owner for operating the application pursuant to soil treatments applied pursuant to work orders within the billing period.

In still another suitable embodiment of the lease management system, the business provided data further includes the total linear feet of area treated at a work site pursuant to the work order. The at least one processor of the data management system is configured to determine the usage fee at least in part as a function of the total linear feet of area treated at the work site.

In yet another embodiment, a plurality of application tools may be leased by the application tool owner to the soil treatment business. The owner provided data further includes at least an asset identification for each application tool. The data management system is configured for communication with the control system of each application tool to receive data collected by the respective application tool in performing a respective soil treatment at a respective work site pursuant to a corresponding work order. The data management system is accessible by the business for one or more of viewing the collected data associated with each application tool leased by the business and downloading collected data associated with each application tool leased by the business.

Moreover, in another suitable embodiment, the owner provided data further includes at least data indicative of maintenance to be performed on the application tool. The data is indicative of maintenance including one or more of a maintenance schedule, the date of the next scheduled maintenance, and the status of maintenance being performed on the application tool. The data management system is accessible by the business for accessing said data indicative of maintenance.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A system for managing a soil treatment business, the system comprising:
   an injection apparatus operable to inject soil treatment under pressure down into soil;
   a control system associated with the injection apparatus and configured to collect data during operation of the injection apparatus; and
   a data management system configured for receiving the data collected by the injection apparatus control system, the data management system comprising a database for storing the collected data, the data management system being accessible by the business for reviewing the collected data, wherein the data management system is further configured to receive data provided by the business and associated with the injection apparatus, the provided data comprising at least one work order associated with a soil treatment to be applied by the injection apparatus at a work site.

2. The system set forth in claim 1 wherein the data management system is configured for remote communication with the injection apparatus control system.

3. The system set forth in claim 1 wherein the data management system further comprises at least one processor configured to determine at least one characteristic of the soil treatment based at least in part on the data collected by the injection apparatus control system.

4. The system set forth in claim 1 wherein the collected data comprises one or more of the number of injections performed by the injection apparatus, the amount of active ingredient delivered by the apparatus, the amount of soil treatment delivered by the apparatus, the type of soil into which the apparatus injected the soil treatment, the pressure at which the apparatus was operated to perform the injections, and the time needed to complete a soil treatment using the injection apparatus.

5. The system set forth in claim 1, the control system associated with the injection apparatus is configured to receive the at least one work order and is further configured to inhibit operation of the injection apparatus in the absence of a work order being received by the control system.

6. The system set forth in claim 1 wherein the data management system further comprises at least one processor configured to determine based on the collected data, for each apparatus, one or more of: the total number of injections performed by the apparatus for one or more of a single work order and a plurality of work orders; the total amount of active ingredient delivered by the apparatus for one or more of a single work order and a plurality of work orders; the total amount of soil treatment delivered by the apparatus for one or more of a single work order and a plurality of work orders; the total number of work sites treated by the apparatus; the operating time for the apparatus for each work order; and the cumulative operating time for the apparatus for all work orders.

7. The system set forth in claim 6 wherein the at least one processor is configured to determine for the injection apparatus, based on the collected data and provided data, one or more of the average number of injections per work site, the average amount of active ingredient delivered per work site, the average amount of soil treatment delivered per work site, and the average time to complete each work order.

8. The system set forth in claim 7 wherein the provided data further comprises the linear feet of the work site to which the soil treatment is to be applied for each corresponding work order, the at least one processor being further configured to determine one or more of the average number of injections per linear foot, the average amount of active ingredient delivered per linear foot, and the average linear feet per work site.

9. The system set forth in claim 6 wherein the data management system includes data indicative of a time period of interest to the business, the at least one processor being operable to determine, one or more of the following: the total number of injections performed by the apparatus for one or more of a single work order and a plurality of work orders completed during said time period; the total amount of active ingredient delivered by the apparatus for one or more of a single work order and a plurality of work orders completed during said time period; the total amount of soil treatment delivered by the apparatus for one or more of a single work order and a plurality of work orders completed during said time period; the total number of work sites treated by the apparatus during said time period; the operating time for the apparatus for each work order completed during said time period; and the cumulative operating time for the apparatus for all work orders completed during said time period.

10. The system set forth in claim 6 comprising a plurality of the injection apparatus and a plurality of control systems, each control system being associated with a corresponding injection apparatus, the data management system being configured for communication with each control system to receive data collected by each respective control system in response to operation of the corresponding injection apparatus, the at least one processor being configured to determine, based on the collected data, one or more of the total number of injections performed by all apparatus, the total amount of active ingredient delivered by all apparatus, the total amount of soil treatment delivered all apparatus, and the total number of work sites treated by all apparatus.

11. The system set forth in claim 10 wherein the at least one processor is configured to determine, based on the collected data and provided data, one or more of the average number of injections per work site, the average amount of active ingredient delivered per work site, the average amount of soil treatment delivered per work site, and the average time to complete each work order.

12. The system set forth in claim 10 further comprising a pressure application tool separate from the injection apparatus and operable to apply soil treatment one or more of on and in the soil under pressure substantially less than the pressure at which the injection apparatus is operated, the control system being further associated with operation of the pressure application tool and further configured to collect data during operation of the pressure application tool, the at least one processor being configured to determine, based on the collected data and provided data, one or more of the following: the total number of hours of operation of the injection apparatus and pressure application tool; the total number of hours of operation of the injection apparatus; the total number of hours of operation of the pressure application tool; and the difference between the total number of hours operated and a predetermined number of hours after which one or more of maintenance, inspection, and calibration is recommended.

13. The system set forth in claim 1 wherein the data management system is one of 1) hardwire connected to the injection apparatus control system for transferring the collected data from the control system to the data management system, 2) configured for releasable hardwire connection to the injection apparatus control system for transferring the collected data from the control system to the data management system and 3) configured for receiving a transportable data storage media containing the collected data from the control system.

14. A lease management system for managing a lease arrangement pursuant to which a soil treatment system is leased by the owner of the soil treatment system to a soil treatment business, the soil treatment system comprising an application tool operable to apply an active ingredient to soil, the lease management system comprising:
a control system associated with the application tool and configured to collect data during operation of the application tool; and
a data management system configured for receiving 1) owner provided data including at least the identification of the soil treatment business that is leasing the application tool from the owner, and 2) business provided data including at least a work order for a soil treatment to be performed at a work site, the data management system being configured for communication with the control system of the application tool to receive the data collected by the application tool in performing the soil treatment at the work site pursuant to the work order, the data management system including at least one processor configured to determine a usage fee to be charged to the business by the owner as a function of one or more of the business provided data and the data collected by the application tool control system.

15. The system set forth in claim 14 wherein the owner provided data received by the data management system further comprises at least a lease fee to be charged to the business by the owner for each of a plurality of lease periods, the at least one processor of the data management system being configured to determine a total fee to be charged to the business by the owner as a function of the lease fee and the usage fee.

16. The system set forth in claim 14 wherein the business provided data received by the data management system includes a plurality of work orders, each work order being for a soil treatment to be performed using the application tool at a work site, the data management system being configured for communication with the control system of the application tool to receive the data collected by the application tool in performing each soil treatment at each respective work site pursuant to each respective work order, the at least one processor of the data management system being configured to determine a total usage fee to be charged to the business by the owner for operating the application tool pursuant to all of the work orders.

17. The system set forth in claim 16 wherein the business provided data comprises a billing period, the at least one processor being configured to determine a total usage fee to be charged to the business by the owner for operating the application pursuant to soil treatments applied pursuant to work orders within the billing period.

18. The system set forth in claim 14 wherein the business provided data further comprises the total linear feet of area treated at a work site pursuant to the work order, the at least one processor of the data management system being configured to determine the usage fee at least in part as a function of the total linear feet of area treated at the work site.

19. The system set forth in claim 14 wherein a plurality of application tools may be leased by the application tool owner to the soil treatment business, the owner provided data further including at least an asset identification for each application tool, the data management system being configured for communication with the control system of each application tool to receive data collected by the respective application tool in performing a respective soil treatment at a respective work site pursuant to a corresponding work order, the data management system being accessible by the business for one or more of viewing the collected data associated with each application tool leased by the business and downloading collected data associated with each application tool leased by the business.

20. The system set forth in claim 14 wherein the owner provided data further includes at least data indicative of maintenance to be performed on the application tool, said data indicative of maintenance comprising one or more of 1) a maintenance schedule, 2) the date of the next scheduled maintenance and 3) the status of maintenance being performed on the application tool, the data management system being accessible by the business for accessing said data indicative of maintenance.

* * * * *